United States Patent
Fukai et al.

(10) Patent No.: US 11,676,547 B2
(45) Date of Patent: Jun. 13, 2023

(54) DISPLAY SYSTEM AND OPERATION METHOD OF THE DISPLAY SYSTEM

(71) Applicant: SEMICONDUCTOR ENERGY LABORATORY CO., LTD., Atsugi (JP)

(72) Inventors: Shuji Fukai, Kanagawa (JP); Takayuki Ikeda, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 258 days.

(21) Appl. No.: 16/628,059

(22) PCT Filed: Jun. 29, 2018

(86) PCT No.: PCT/IB2018/054838
§ 371 (c)(1),
(2) Date: Jan. 2, 2020

(87) PCT Pub. No.: WO2019/008482
PCT Pub. Date: Jan. 10, 2019

(65) Prior Publication Data
US 2021/0150994 A1 May 20, 2021

(30) Foreign Application Priority Data
Jul. 7, 2017 (JP) .............................. JP2017-133458

(51) Int. Cl.
*G09G 3/34* (2006.01)
*G09G 5/10* (2006.01)
(Continued)

(52) U.S. Cl.
CPC ............. *G09G 3/3413* (2013.01); *G06N 3/08* (2013.01); *G06T 5/009* (2013.01); *G06T 5/40* (2013.01);
(Continued)

(58) Field of Classification Search
CPC .......... G09G 3/20; G09G 3/34; G09G 3/2003; G09G 3/3413; G09G 5/10;
(Continued)

(56) References Cited

U.S. PATENT DOCUMENTS 5,305,012 A 4/1994 Faris
5,808,697 A * 9/1998 Fujimura ................. H04N 5/57
348/E5.119
(Continued)

FOREIGN PATENT DOCUMENTS

CN 101312532 A 11/2008
CN 103843058 A 6/2014
(Continued)

OTHER PUBLICATIONS

International Search Report (Application No. PCT/IB2018/054838) dated Oct. 23, 2018.
(Continued)

*Primary Examiner* — Amare Mengistu
*Assistant Examiner* — Jennifer L Zubajlo
(74) *Attorney, Agent, or Firm* — Fish & Richardson P.C.

(57) ABSTRACT

Provided is a display system with which visibility can be improved.
The display system includes an imaging device, a control device, and a display device. The imaging device includes first pixels arranged in a matrix, and the display device includes second pixels arranged in a matrix. The imaging device has a function of generating first image data on the basis of the illuminance of light emitted to the first pixels. The control device has a function of forming a histogram on the basis of the first image data and dividing the histogram into two or more illuminance ranges. The control device has a function of converting the gray levels which are included in the first image data as information and correspond to the
(Continued)

illuminance of the light emitted to the first pixels, thereby generating second image data obtained by performing dynamic range compression on the first image data. The compressibility for the dynamic range compression is calculated for each illuminance range by the control device on the basis of the value of integral in each illuminance range of the histogram.

7 Claims, 25 Drawing Sheets

(51) Int. Cl.
    G09G 3/20    (2006.01)
    G06N 3/08    (2023.01)
    G06T 5/00    (2006.01)
    G06T 5/40    (2006.01)

(52) U.S. Cl.
    CPC .............. *G09G 3/2003* (2013.01); *G09G 5/10* (2013.01); *G09G 2320/0666* (2013.01); *G09G 2340/06* (2013.01)

(58) Field of Classification Search
    CPC ....... G09G 2320/0666; G09G 2340/06; G06N 3/08; G06T 5/00; G06T 5/009; G06T 5/40
    See application file for complete search history.

(56) References Cited

U.S. PATENT DOCUMENTS

| | | | |
|---|---|---|---|
| 7,134,707 B2 | 11/2006 | Isaac | |
| 7,675,432 B2 | 3/2010 | Leicht | |
| 8,013,910 B2 | 9/2011 | Kato et al. | |
| 8,140,219 B2 | 3/2012 | Cernasov | |
| 8,143,563 B2 | 3/2012 | Broude | |
| 8,154,628 B2 | 4/2012 | Ishida et al. | |
| 9,098,906 B2 | 8/2015 | Bruls et al. | |
| 9,538,091 B2* | 1/2017 | Maeyama | H04N 25/59 |
| 9,630,477 B2 | 4/2017 | Ro | |
| 9,654,701 B2 | 5/2017 | Kunkel | |
| 9,811,742 B2 | 11/2017 | Ogata et al. | |
| 9,894,281 B2 | 2/2018 | Nishi | |
| 10,089,936 B2 | 10/2018 | Han et al. | |
| 10,106,018 B2 | 10/2018 | Martens et al. | |
| 10,142,563 B2 | 11/2018 | Shionoya et al. | |
| 10,377,212 B2 | 8/2019 | Glatfelter | |
| 10,469,756 B2 | 11/2019 | Nishi | |
| 10,582,131 B2 | 3/2020 | Nakayama | |
| 10,841,512 B2 | 11/2020 | Shionoya et al. | |
| 10,896,923 B2 | 1/2021 | Ohmaru et al. | |
| 10,917,597 B2 | 2/2021 | Ohmaru et al. | |
| 10,958,848 B2 | 3/2021 | Kinoshita | |
| 2003/0169213 A1 | 9/2003 | Spero | |
| 2004/0174571 A1 | 9/2004 | Sobol | |
| 2005/0047650 A1* | 3/2005 | Kagaya | H04N 19/98 |
| | | | 382/254 |
| 2006/0158715 A1 | 7/2006 | Furusawa et al. | |
| 2009/0263037 A1* | 10/2009 | Qiu | G06T 5/009 |
| | | | 382/254 |
| 2010/0020205 A1* | 1/2010 | Ishida | G06T 5/20 |
| | | | 348/241 |
| 2012/0146026 A1* | 6/2012 | Nagi | H01L 31/102 |
| | | | 257/53 |
| 2013/0107956 A1 | 5/2013 | Muijs et al. | |
| 2014/0210847 A1* | 7/2014 | Knibbeler | G11B 27/329 |
| | | | 345/589 |
| 2014/0225941 A1* | 8/2014 | Van der Vleuten | H04N 7/00 |
| | | | 345/690 |
| 2015/0172528 A1* | 6/2015 | Maeyama | H04N 25/59 |
| | | | 348/362 |
| 2015/0279884 A1 | 10/2015 | Kusumoto | |
| 2015/0365580 A1* | 12/2015 | Kunkel | G06T 5/50 |
| | | | 348/234 |
| 2016/0104438 A1 | 4/2016 | Han et al. | |
| 2016/0216536 A1 | 7/2016 | Hue et al. | |
| 2016/0260835 A1* | 9/2016 | Yamazaki | H01L 27/1225 |
| 2016/0284095 A1 | 9/2016 | Chalom et al. | |
| 2016/0295152 A1* | 10/2016 | Kurokawa | H04N 5/38 |
| 2016/0364619 A1 | 12/2016 | Ogata et al. | |
| 2017/0063351 A1* | 3/2017 | Kurokawa | G06N 3/065 |
| 2017/0278973 A1* | 9/2017 | Ando | H01L 27/1222 |
| 2018/0184123 A1* | 6/2018 | Terada | H04N 19/11 |
| 2019/0027100 A1 | 1/2019 | Han et al. | |
| 2019/0057509 A1* | 2/2019 | Lv | G06N 3/08 |
| 2019/0092221 A1 | 3/2019 | Kimura et al. | |
| 2019/0342606 A1* | 11/2019 | Kurokawa | G06N 3/08 |
| 2020/0029022 A1 | 1/2020 | Nishi | |
| 2020/0412978 A1 | 12/2020 | Shionoya et al. | |
| 2021/0051291 A1 | 2/2021 | Ohmaru et al. | |

FOREIGN PATENT DOCUMENTS

| | | |
|---|---|---|
| CN | 103971340 A | 8/2014 |
| CN | 104956670 A | 9/2015 |
| CN | 105075234 A | 11/2015 |
| CN | 105324985 A | 2/2016 |
| CN | 105684421 A | 6/2016 |
| CN | 106796775 A | 5/2017 |
| EP | 2061233 A | 5/2009 |
| EP | 2745507 A | 6/2014 |
| EP | 2949120 A | 12/2015 |
| EP | 3007446 A | 4/2016 |
| EP | 3018893 A | 5/2016 |
| EP | 3054664 A | 8/2016 |
| EP | 3054667 A | 8/2016 |
| EP | 3093820 A | 11/2016 |
| EP | 3588940 A | 1/2020 |
| JP | 06-004795 A | 1/1994 |
| JP | 09-065252 A | 3/1997 |
| JP | 2002-132243 A | 5/2002 |
| JP | 2003-299107 A | 10/2003 |
| JP | 2007-060511 A | 3/2007 |
| JP | 2008-172566 A | 7/2008 |
| JP | 2014-531821 | 11/2014 |
| JP | 2015-115789 A | 6/2015 |
| JP | 2016-511871 | 4/2016 |
| JP | 2017-005678 | 1/2017 |
| KR | 2014-0066771 A | 6/2014 |
| KR | 2015-0103119 A | 9/2015 |
| KR | 2016-0040981 A | 4/2016 |
| KR | 2017-0034342 A | 3/2017 |
| WO | WO-2012/004709 | 1/2012 |
| WO | WO-2012/004741 | 1/2012 |
| WO | WO-2013/046095 | 4/2013 |
| WO | WO-2014/116715 | 7/2014 |
| WO | WO-2015/104898 | 7/2015 |
| WO | WO-2016/056787 | 4/2016 |
| WO | WO-2016199330 A1 * | 12/2016 ............. G06T 9/002 |

OTHER PUBLICATIONS

Written Opinion (Application No. PCT/IB2018/054838) dated Oct. 23, 2018.
Hua.S et al., "Constructing high dynamic range image based on photographs with different amounts of exposure", Journal of Dalian University of Technology, 2007, vol. 47, No. 5, pp. 678-682.
Chinese Office Action (Application No. 201880044619.9) dated Oct. 8, 2021.

* cited by examiner

FIG. 4A1
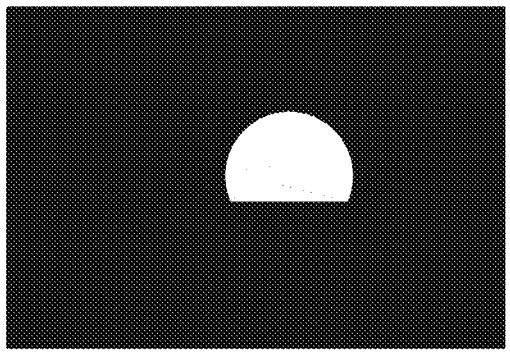
FIG. 4A2
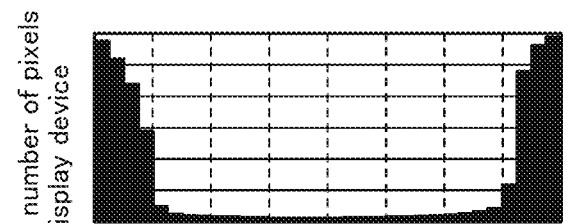
Illuminance of light emitted from pixels included in display device
FIG. 4B1
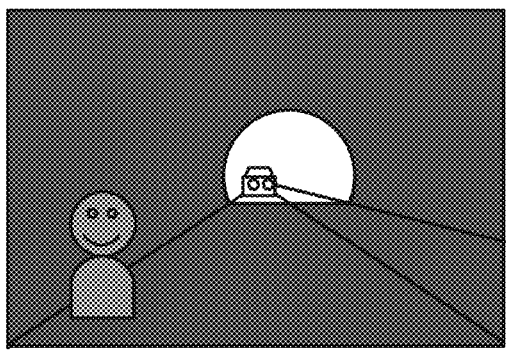
FIG. 4B2
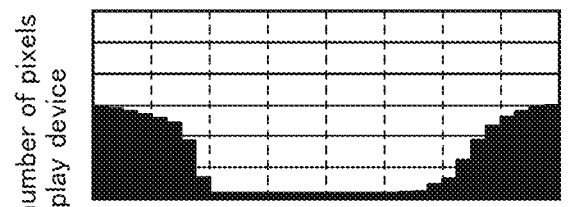
Illuminance of light emitted from pixels included in display device FIG. 14A1
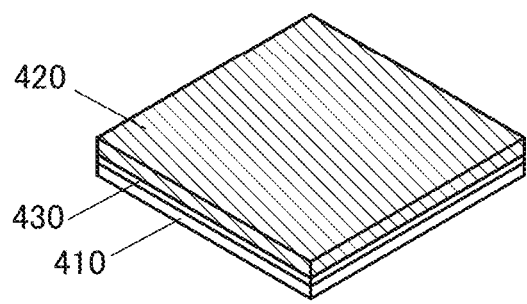
FIG. 14B1
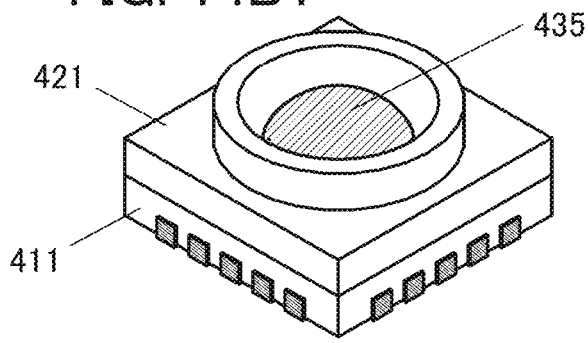
FIG. 14A2
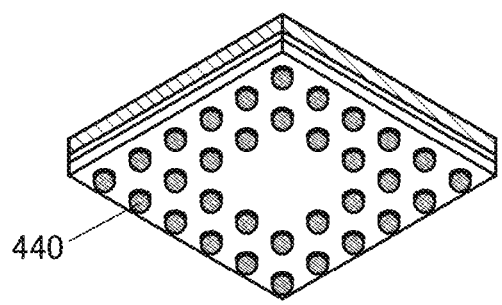
FIG. 14B2
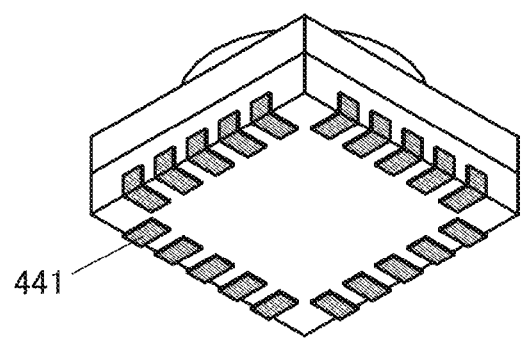
FIG. 14A3
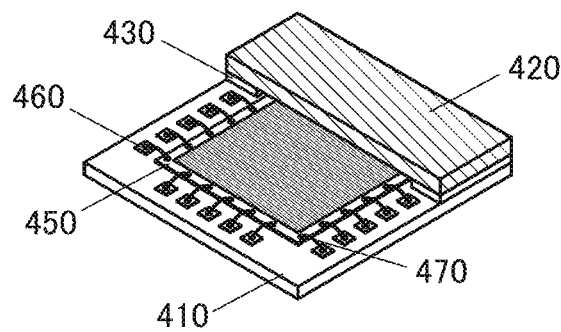
FIG. 14B3
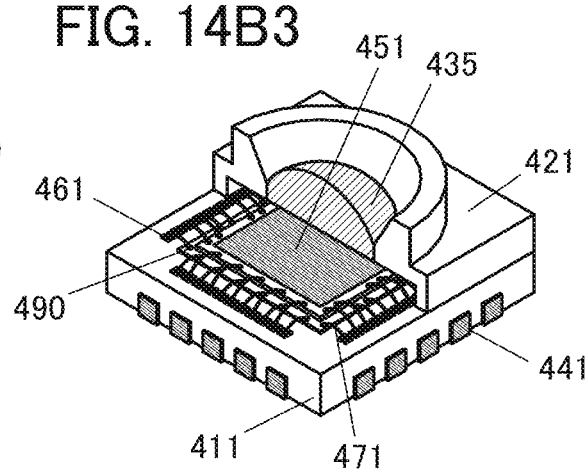

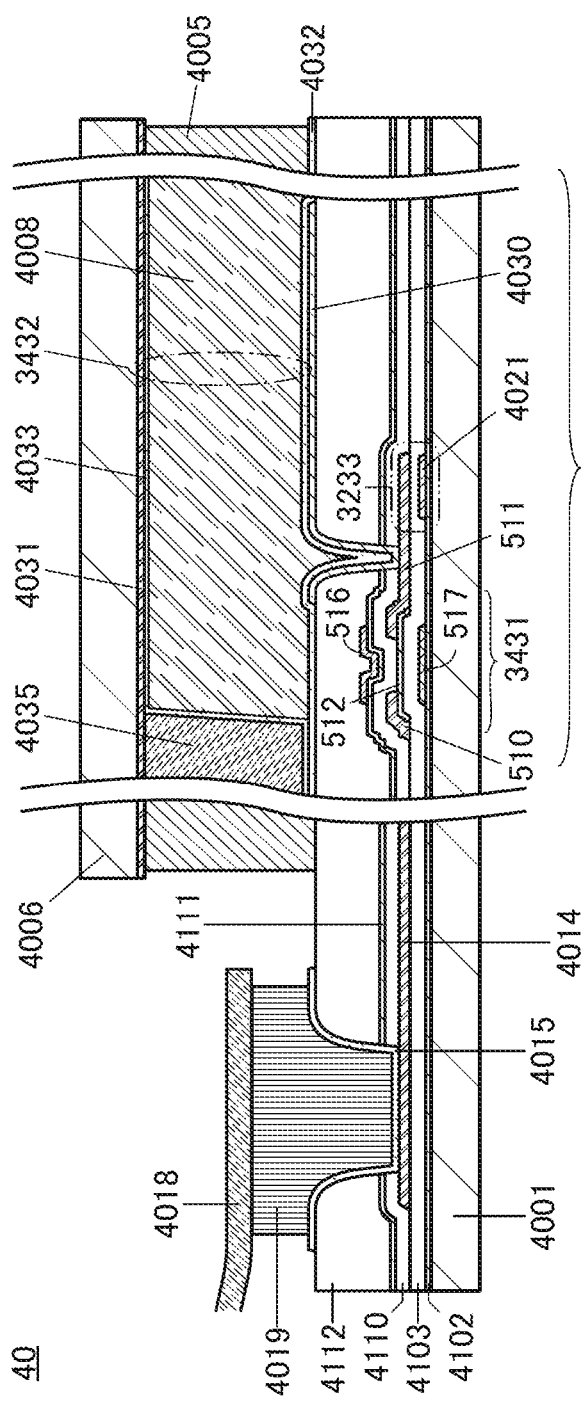
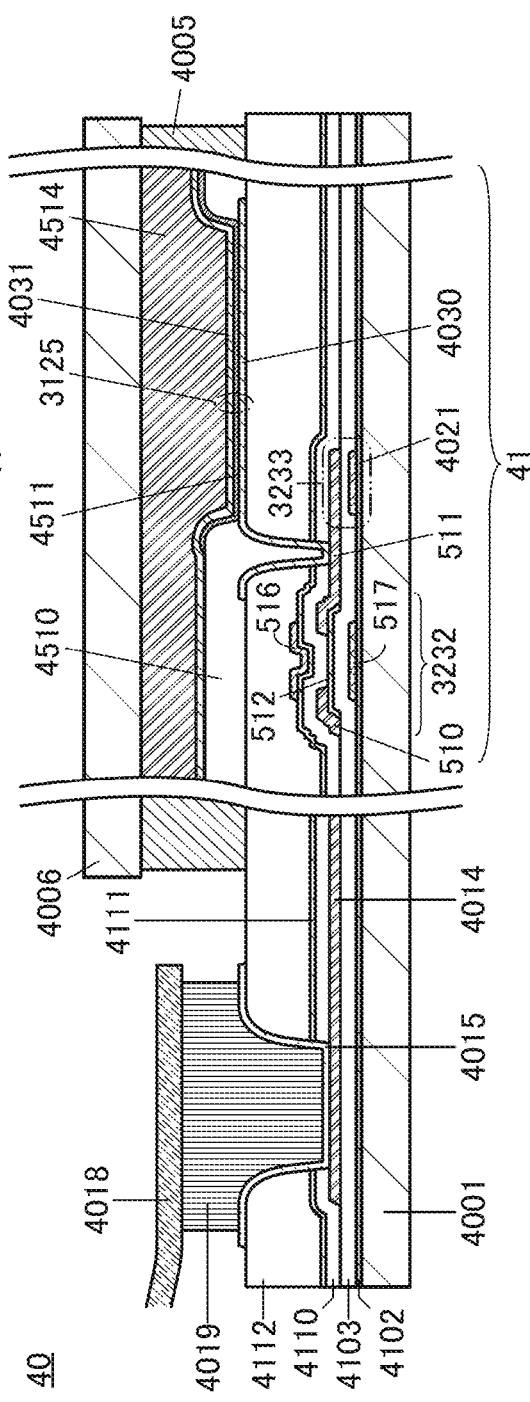
FIG. 16A
FIG. 16B $a = x_1 w_1 + x_2 w_2 + b$

301

302

303

304

DISPLAY SYSTEM AND OPERATION METHOD OF THE DISPLAY SYSTEM

CROSS REFERENCE TO RELATED APPLICATIONS

This application is a U.S. National Phase Application under 35 U.S.C. § 371 of International Application PCT/IB2018/054838, filed on Jun. 29, 2018, which is incorporated by reference, and which claims the benefit of a foreign priority application filed in Japan on Jul. 7, 2017, as Application No. 2017-133458.

TECHNICAL FIELD

One embodiment of the present invention relates to a display system and an operation method of the display system.

Note that one embodiment of the present invention is not limited to the above technical field. The technical field of one embodiment of the invention disclosed in this specification and the like relates to an object, a method, or a manufacturing method. Another one embodiment of the present invention relates to a process, a machine, manufacture, or a composition of matter. Thus, more specifically, a semiconductor device, a display device, a liquid crystal display device, a light-emitting device, a lighting device, a power storage device, a memory device, an imaging device, a driving method thereof, or a manufacturing method thereof can be given as an example of the technical field of one embodiment of the present invention disclosed in this specification.

Note that in this specification and the like, a semiconductor device refers to all devices that can function by utilizing semiconductor characteristics. A transistor and a semiconductor circuit are embodiments of semiconductor devices. Furthermore, in some cases, a memory device, a display device, an imaging device, or an electronic device includes a semiconductor device.

BACKGROUND ART

A vehicle provided with an imaging device for capturing information around the vehicle and a display device for displaying the captured information becomes common (e.g., Patent Document 1).

PRIOR ART DOCUMENT

Patent Document

[Patent Document 1] Japanese Published Patent Application No. 2017-5678

SUMMARY OF THE INVENTION

Problems to be Solved by the Invention

An imaging device for capturing information around a vehicle needs to take an image of an object with a large difference in brightness. For example, an image of the vicinity of an end of a tunnel is data with a large difference in brightness because the illuminance of the inside of the tunnel is low and the illuminance of the outside of the tunnel is high. For this reason, the imaging device for capturing information around a vehicle needs to have a high dynamic range. When the dynamic range of the display device for displaying captured information is lower than the dynamic range of the imaging device, dynamic range compression needs to be performed by converting the gray level of imaging data into a gray level that can be expressed by the display device. However, the dynamic range compression might make displayed image unsharp and sometimes generates blocked up shadows and blown-out highlights.

An object of one embodiment of the present invention is to provide a display system capable of performing dynamic range compression while a displayed image is prevented from being unsharp. Another object of one embodiment of the present invention is to provide a display system capable of performing dynamic range compression while generation of blocked up shadows and blown-out highlights are prevented. Another object of one embodiment of the present invention is to provide a display system with which visibility can be improved. Another object of one embodiment of the present invention is to provide a display system that operates at high speed. Another object of one embodiment of the present invention is to provide a novel display system.

An object of one embodiment of the present invention is to provide an operation method of a display system capable of performing dynamic range compression while a displayed image is prevented from being unsharp. Another object of one embodiment of the present invention is to provide an operation method of a display system capable of performing dynamic range compression while generation of blocked up shadows and blown-out highlights are prevented. Another object of one embodiment of the present invention is to provide an operation method of a display system with which visibility can be improved. Another object of one embodiment of the present invention is to provide an operation method of a display system that operates at high speed. Another object of one embodiment of the present invention is to provide an operation method of a novel display system.

Note that the description of these objects does not disturb the existence of other objects. One embodiment of the present invention does not need to achieve all of these objects. Other objects will be apparent from and can be derived from the description of the specification, the drawings, the claims, and the like.

One embodiment of the present invention is a display system including an imaging device, a control device, and a display device; in the imaging device, the imaging device includes first pixels arranged in a matrix, the display device includes second pixels arranged in a matrix, the imaging device has a function of generating first image data on the basis of the illuminance of light emitted to the first pixel, the control device has a function of forming a histogram on the basis of the first image data, the control device has a function of dividing the histogram into two or more illuminance ranges, the control device has a function of converting gray levels, which are included in the first image data as information and correspond to the illuminance of the light emitted to the first pixel, to generate second image data obtained by performing dynamic range compression on the first image data, and the control device has a function of calculating a compressibility of the dynamic range compression for each of the illuminance ranges on the basis of a value of integral in the histogram.

Alternatively, in the above embodiment, the compressibility in the illuminance range in which the value of integral is large may be smaller than the compressibility in the illuminance range in which the value of integral is small.

Alternatively, in the above embodiment, the control device may include a neural network, and the neural network may have a function of predicting, on the basis of the first image data, third image data that is to be acquired by the imaging device in a frame period after a frame period when the first image data is acquired.

Alternatively, in the above embodiment, the control device may have a function of determining whether the compressibility is updated, on the basis of the third image data.

Alternatively, one embodiment of the present invention is an operation method of a display system including an imaging device in which first pixels are arranged in a matrix, a control device, and a display device in which second pixels are arranged in a matrix; in the display system, the imaging device generates first image data on the basis of the illuminance of light emitted to the first pixel, the control device forms a histogram on the basis of the first image data, the control device divides the histogram into two or more illuminance ranges, and the control device has a function of converting gray levels, which are included in the first image data as information and correspond to the illuminance of the light emitted to the first pixel, to generate second image data obtained by performing dynamic range compression on the first image data, using compressibility calculated for each of the illuminance ranges on the basis of a value of integral in the histogram.

Alternatively, in the above embodiment, dynamic range compression may be performed on the first image data so that the compressibility in the illuminance range in which the value of integral is large is smaller than the compressibility in the illuminance range in which the value of integral is small.

Alternatively, in the above embodiment, the control device may include a neural network, the neural network may predict, on the basis of the first image data, third image data that is to be acquired by the imaging device in a frame period after a frame period when the first image data is acquired, and whether the compressibility is updated may be determined on the basis of the third image data.

One embodiment of the present invention can provide a display system capable of performing dynamic range compression while a displayed image is prevented from being unsharp. One embodiment of the present invention can provide a display system capable of performing dynamic range compression while generation of blocked up shadows and blown-out highlights are prevented. One embodiment of the present invention can provide a display system with which visibility can be improved. One embodiment of the present invention can provide a display system that operates at high speed. One embodiment of the present invention can provide a novel display system.

One embodiment of the present invention can provide an operation method of a display system capable of performing dynamic range compression while a displayed image is prevented from being unsharp. One embodiment of the present invention can provide an operation method of a display system capable of performing dynamic range compression while generation of blocked up shadows and blown-out highlights are prevented. One embodiment of the present invention can provide an operation method of a display system with which visibility can be improved. One embodiment of the present invention can provide an operation method of a display system that operates at high speed. One embodiment of the present invention can provide an operation method of a novel display system.

Note that one embodiment of the present invention is not limited to these effects. One embodiment of the present invention might produce effects other than these effects, depending on the case, or according to the circumstances, for example. Furthermore, one embodiment of the present invention does not necessarily produce any of these effects, depending on the case, or according to the circumstances, for example.

BRIEF DESCRIPTION OF DRAWINGS

FIGS. 4A1, 4A2, 4B1, and 4B2 Diagrams illustrating a display system.

FIGS. 14A1, 14A2, 14A3, 14B1, 14B2, and 14B3 Perspective diagrams of packages and modules in which imaging devices are placed.

FIGS. 16A and 16B Diagrams illustrating configuration examples of a display device.

MODE FOR CARRYING OUT THE INVENTION

Figure 1:
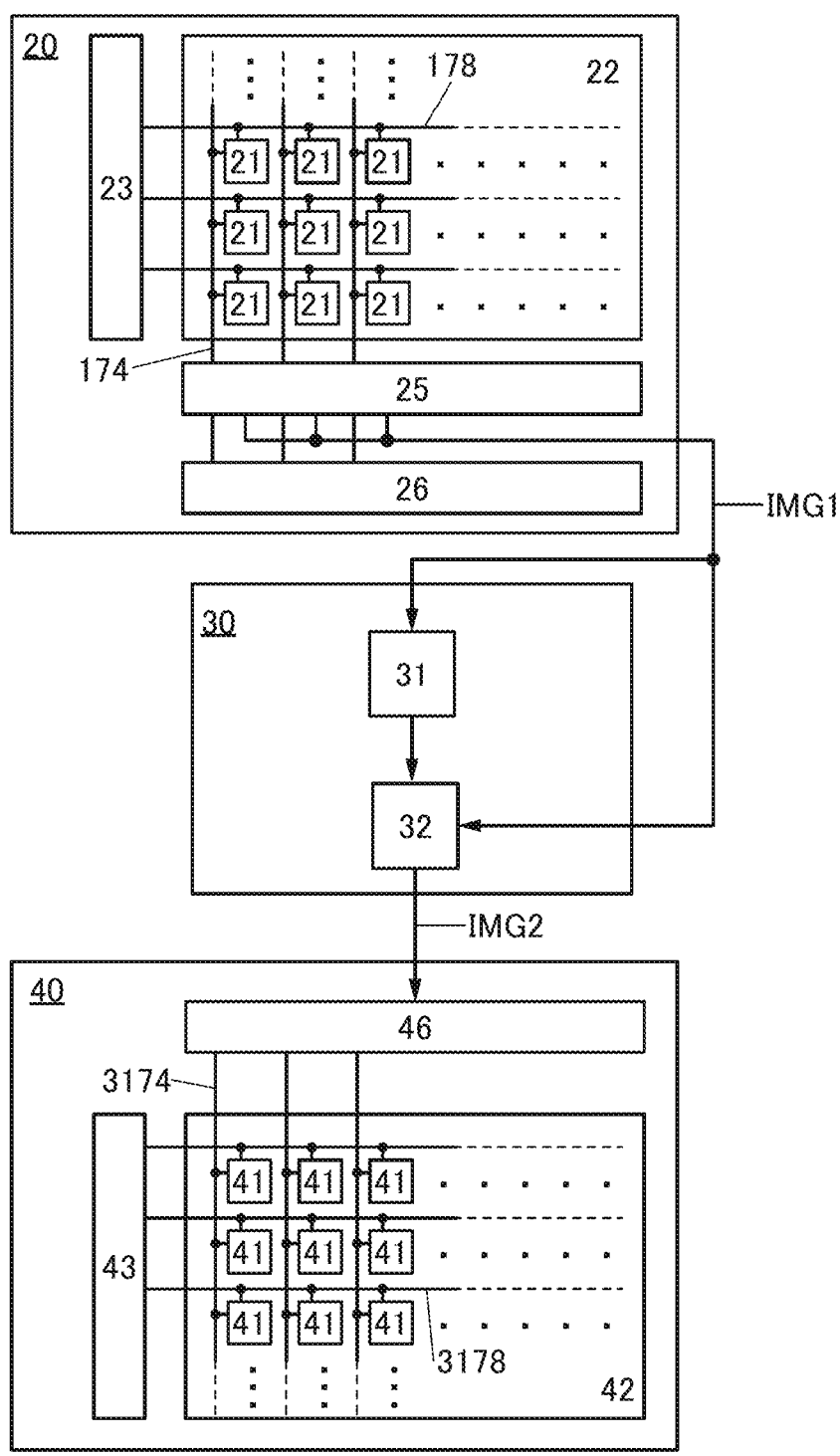
FIG. 1 A block diagram illustrating a configuration example of a display system.

Embodiments of the present invention will be described below in detail with reference to the drawings. Note that the present invention is not limited to the following description, and it will be readily understood by those skilled in the art that modes and details of the present invention can be modified in various ways without departing from the spirit and scope. Therefore, the present invention should not be interpreted as being limited to the description of embodiments below.

In the drawings, the size, the layer thickness, or the region is exaggerated for clarity in some cases. Therefore, the size, the layer thickness, or the region is not limited to the illustrated scale. Note that the drawings are schematic views showing ideal examples, and embodiments of the present invention are not limited to shapes, values, or the like shown in the drawings. For example, variation in signal, voltage, or current due to noise or variation in signal, voltage, or current due to a difference in timing, or the like can be included.

In this specification and the like, terms for describing arrangement, such as "over" and "under", are used for convenience to describe the positional relation between components with reference to drawings in some cases. Furthermore, the positional relation between components is changed as appropriate in accordance with a direction in which each component is described. Thus, terms for the description are not limited to those used in this specification, and the description can be changed appropriately depending on the situation.

The positional relations of circuit blocks in a block diagram shown in the drawing are specified for description; even when different circuit blocks are illustrated to achieve individual functions, one circuit block may be actually configured to achieve different functions. Functions of circuit blocks are specified for description, and the circuit blocks may be provided so that processing performed in one actual circuit block is performed in the plurality of circuit blocks even when they are illustrated as one circuit block.

In this specification and the like, a semiconductor device refers to a device that utilizes semiconductor characteristics, and means a circuit including a semiconductor element (a transistor, a diode, and the like), a device including the circuit, and the like. The semiconductor device also means all devices that can function by utilizing semiconductor characteristics. For example, an integrated circuit (IC) and a chip with an IC are examples of the semiconductor device. Moreover, a memory device, a display device, a light-emitting device, a lighting device, an electronic device, and the like themselves are semiconductor devices in some cases, or include a semiconductor device in some cases.

When this specification and the like explicitly states that X and Y are connected, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or texts, a connection relation other than one shown in drawings or texts is regarded as being described in the drawings or the texts. Each of X and Y denotes an object (e.g., a device, an element, a circuit, a wiring, an electrode, a terminal, a conductive film, or a layer).

A transistor includes three terminals called a gate, a source, and a drain. The gate is a node that functions as a control node for controlling the conduction state of the transistor. In the two input/output nodes functioning as a source or a drain, depending on the type of the transistor and the level of potential supplied to each of the terminals, one of the two input/output nodes functions as the source and the other functions as the drain. Therefore, the terms source and drain can be used interchangeably in this specification and the like.

A node can be referred to as a terminal, a wiring, an electrode, a conductive layer, a conductor, an impurity region, or the like depending on the circuit configuration, the device structure, or the like. Furthermore, a terminal, a wiring, or the like can be referred to as a node.

A voltage usually refers to a potential difference between a given potential and a reference potential (e.g., a ground potential (GND) or a source potential). Thus, a voltage can be replaced with a potential. Note that a potential is relative. Thus, the expression "ground potential" does not necessarily mean 0 V.

Note that in this specification and the like, the terms such as "film" and "layer" can be interchanged with each other depending on the case or circumstances. For example, the term "conductive layer" can be changed into the term "conductive film" in some cases. Also, for example, the term "insulating film" can be changed into the term "insulating layer" in some cases.

In this specification and the like, ordinal numbers such as "first," "second," and "third" are used to avoid confusion among components in some cases, and do not limit the components numerically or do not limit the order.

In this specification and the like, an artificial neural network (ANN, hereinafter referred to as neural network) generally means a model that imitates a biological neural network. In general, a neural network has a structure in which units that imitate neurons are connected to each other through a unit that imitates a synapse.

The strength of connection between synapses (connection between neurons), (also referred to as a weight coefficient), can be changed when the neural network is provided with existing information. The processing for determining the connection strength by providing a neural network with existing information is called "learning" in some cases.

Furthermore, when a neural network in which "learning" is performed (connection strength is determined) is provided with any type of information, new information can be output on the basis of the connection strength. The processing for output of new information on the basis of information provided and the connection strength in a neural network is called "inference" or "recognition" in some cases.

Examples of a neural network model include a Hopfield type, a hierarchical neural type, and the like. In particular, a neural network with a multilayer structure is referred to as a "deep neural network" (DNN), and machine learning using the deep neural network is referred to as "deep learning".

In this specification and the like, a metal oxide means an oxide of a metal in a broad expression. Metal oxides are classified into an oxide insulator, an oxide conductor (including a transparent oxide conductor), an oxide semiconductor (also simply referred to as an OS), and the like. For example, when a metal oxide is used in an active layer of a transistor, the metal oxide is referred to as an oxide semiconductor in some cases. In the case where a metal oxide is included in a channel formation region of a transistor having at least one of an amplifying function, a rectifying function, and a switching function, the metal oxide can be referred to as a metal oxide semiconductor, or OS for short. In addition, in the case where an OS FET (or OS transistor) is mentioned, the OS FET can also be referred to as a transistor including a metal oxide or an oxide semiconductor.

In this specification and the like, CAAC (c-axis aligned crystal) and CAC (Cloud-Aligned Composite) are stated in some cases. Note that CAAC refers to an example of a crystal structure, and CAC refers to an example of a function or a material composition.

In this specification and the like, a CAC-OS or a CAC-metal oxide has a conducting function in part of the material and has an insulating function in another part of the material; as a whole, the CAC-OS or the CAC-metal oxide has a function of a semiconductor. In the case where the CAC-OS or the CAC-metal oxide is used in an active layer of a transistor, the conducting function is a function of allowing electrons (or holes) serving as carriers to flow, and the insulating function is a function of not allowing electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

In this specification and the like, the CAC-OS or the CAC-metal oxide includes conductive regions and insulating regions. The conductive regions have the above-described conducting function, and the insulating regions have the above-described insulating function. Furthermore, in some cases, the conductive regions and the insulating regions in the material are separated at the nanoparticle level. Furthermore, in some cases, the conductive regions and the insulating regions are unevenly distributed in the material. Furthermore, the conductive regions are observed to be coupled in a cloud-like manner with their boundaries blurred, in some cases.

Furthermore, in the CAC-OS or the CAC-metal oxide, the conductive regions and the insulating regions each have a size greater than or equal to 0.5 nm and less than or equal to 10 nm, preferably greater than or equal to 0.5 nm and less than or equal to 3 nm, and are dispersed in the material, in some cases.

Furthermore, the CAC-OS or the CAC-metal oxide includes components having different bandgaps. For example, the CAC-OS or the CAC-metal oxide includes a component having a wide gap due to the insulating region and a component having a narrow gap due to the conductive region. In the case of the structure, when carriers flow, carriers mainly flow in the component having a narrow gap. Furthermore, the component having a narrow gap complements the component having a wide gap, and carriers also flow in the component having a wide gap in conjunction with the component having a narrow gap. Therefore, in the case where the above-described CAC-OS or the CAC-metal oxide is used in a channel region of a transistor, high current drive capability in the on state of the transistor, that is, a high on-state current and high field-effect mobility, can be obtained.

In other words, the CAC-OS or the CAC-metal oxide can also be referred to as a matrix composite or a metal matrix composite.

(Embodiment 1)

In this embodiment, a display system which is one embodiment of the present invention will be described with reference to drawings.

One embodiment of the present invention relates to a display system including an imaging device, a control device, and a display device and an operation method of the display system. Pixels are arranged in a matrix in the imaging device and the display device. In addition, an A/D converter circuit is provided in the imaging device and a D/A converter circuit is provided in the display device.

Analog imaging data is obtained by the pixels included in the imaging device and the imaging data is converted into digital image data by the A/D converter circuit provided in the imaging device. Dynamic range compression is performed on the image data by the control device. The image data after being subject to the dynamic range compression is converted into analog display data by the D/A converter circuit included in the display device. Thus, even in the case where the display device has a lower dynamic range than the imaging device, the display device can display an image corresponding to the imaging data.

In this specification and the like, image data before being subject to the dynamic range compression is referred to as first image data in some cases. The image data after being subject to the dynamic range compression is referred to as second image data in some cases.

In one embodiment of the present invention, the dynamic range compressibility of the first image data is changed depending on the illuminance range. Specifically, in an illuminance range in which a large number of pixels included in the imaging device are irradiated with light, the dynamic range compressibility is set low; in an illuminance range in which only a small number of pixels are irradiated with light, the dynamic range compressibility is set high. In this way, an image displayed by the display device can be prevented from being unsharp even when the dynamic range compression is performed. Furthermore, generation of blocked up shadows and blown-out highlights can be prevented. Thus, the visibility of an image displayed by the display device can be improved.

The control device may include a neural network. The neural network can predict the first image data in a subsequent frame on the basis of the first image data. The control device can determine the frequency of updating the dynamic range compressibility, for example, depending on the prediction result. For example, when a change in illuminance of the first image data is predicted to be small, the frequency of updating the dynamic range compressibility can be decreased; when the change in illuminance of the first image data is predicted to be large, the frequency of updating the dynamic range compressibility can be increased. Alternatively, when generation of blocked up shadows or blown-out highlights is predicted, the dynamic range compressibility can be updated. In the above manner, it is unnecessary to update the dynamic range compressibility for every frame period, for example, and the display system can be operated at a higher speed. Furthermore, the dynamic range compressibility can be updated at an appropriate timing; thus, the visibility of an image displayed by the display device can be prevented from decreasing while the frequency of updating the dynamic range compressibility can be decreased.

When an imaging device is mounted in a moving vehicle such as an automobile, the imaging device needs to have a high dynamic range. Therefore, it is particularly preferable to apply the display system of one embodiment of the present invention to a moving vehicle such as an automobile.

<Configuration Example 1 of Display System>

FIG. 1 is a block diagram illustrating a configuration example of a display system 10 that is the display system of one embodiment of the present invention. The display system 10 includes an imaging device 20, a control device 30, and a display device 40.

The imaging device 20 includes a pixel array 22 including pixels 21 arranged in a matrix, a row driver 23, an A/D converter circuit 25, and a column driver 26. Note that a CDS circuit or the like may be provided.

In the imaging device 20, a wiring 178 is provided for each row of the pixel array 22, and one wiring 178 is electrically connected to the pixels 21 in one row and the row driver 23. In the imaging device 20, a wiring 174 is provided for each column of the pixel array 22, and one wiring 174 is electrically connected to the pixels 21 in one column, the A/D converter circuit 25, and the column driver 26.

The imaging device 20 has a function of acquiring analog imaging data corresponding to the illuminance of light emitted to the pixel 21. In the imaging device 20 with the configuration illustrated in FIG. 1, the row driver 23 has a function of selecting a row of the pixel array 22. The column driver 26 has a function of selecting a column of the pixel array 22. The A/D converter circuit 25 has a function of converting imaging data into digital image data IMG1 and outputting the image data IMG1 corresponding to a column selected by the column driver 26 to the control device 30. In the image data IMG1, the illuminance of light emitted to the pixel 21 is expressed as gray level.

Specifically, the imaging device 20 is a camera module which is attached to a moving vehicle such as an automobile, for example. Therefore, the imaging device 20 preferably includes an imaging element with a high dynamic range. For example, by providing an imaging element including selenium in the pixel 21, the number of unsharp portions in an imaging data can be reduced when an image of an object with a large difference in brightness is taken.

The control unit 30 includes an analysis circuit 31 and a gray level determination circuit 32. The control device 30 has a function of converting the gray level, which is included in the image data IMG1 as information and corresponds to the illuminance of light emitted to the pixel 21, to a gray level that can be expressed by pixels 41 included in the display device 40. Here, the image data after being subject to the gray level conversion by the control device 30 is referred to as image data IMG2. By converting the image data IMG1 into the image data IMG2, dynamic range compression can be performed.

In the control device 30 with the configuration illustrated in FIG. 1, the analysis circuit 31 has functions of counting the number of pixels 21 irradiated with emitted light with the same illuminance and forming a histogram on the basis of the image data IMG1.

The gray level determination circuit 32 has a function of determining the dynamic range compressibility of the image data IMG1 on the basis of the histogram. Although details are described later, the histogram is divided into two or more illuminance ranges and the dynamic range compressibilities of the illuminance ranges are made different. Specifically, in an illuminance range in which a large number of the pixels 21 are irradiated with light, the dynamic range compressibility is set low; in an illuminance range in which only a small number of the pixels 21 are irradiated with light, the dynamic range compressibility is set high.

The gray level determination circuit 32 has a function of, after determining the dynamic range compressibility of the image data IMG1, converting the gray level of the image data IMG1 in accordance with the determined dynamic range compressibility to generate the image data IMG2.

The display device 40 includes a pixel array 42 including the pixels 41 arranged in a matrix, a row driver 43, and a column driver 46. Here, the column driver 46 is provided with a D/A converter circuit.

In the display device 40, a wiring 3178 is provided for each row of the pixel array 42, and one wiring 3178 is electrically connected to the pixels 41 in one row and the row driver 43. In the display device 40, a wiring 3174 is provided for each column of the pixel array 42, and one wiring 3174 is electrically connected to the pixels 41 in one column and the column driver 46.

The display device 40 has a function of displaying an image by controlling the illuminance of light emitted from the pixels 41. In the display device 40 with the configuration illustrated in FIG. 1, the row driver 43 has a function of selecting a row of the pixel array 42. The column driver 46 has a function of generating analog display data by performing D/A conversion on the digital image data IMG2. The column driver 46 has a function of writing the generated display data to the pixels 41. Thus, the display device 40 can display an image corresponding to the display data.

In the display system 10, the control device 30 performs dynamic range compression on the image data IMG1 generated by the imaging device 20 in order to generate the image data IMG2 which is expressed as a gray level of the illuminance of light emitted from the pixel 41 included in the display device 40. The display device 40 displays an image corresponding to the image data IMG2. As described above, the imaging device 20 preferably has a high dynamic range. Thus, even when the dynamic range of the display device 40 is lower than the dynamic range of the imaging device 20, the display device 40 can display an image through the dynamic range compression.

Figure 2:
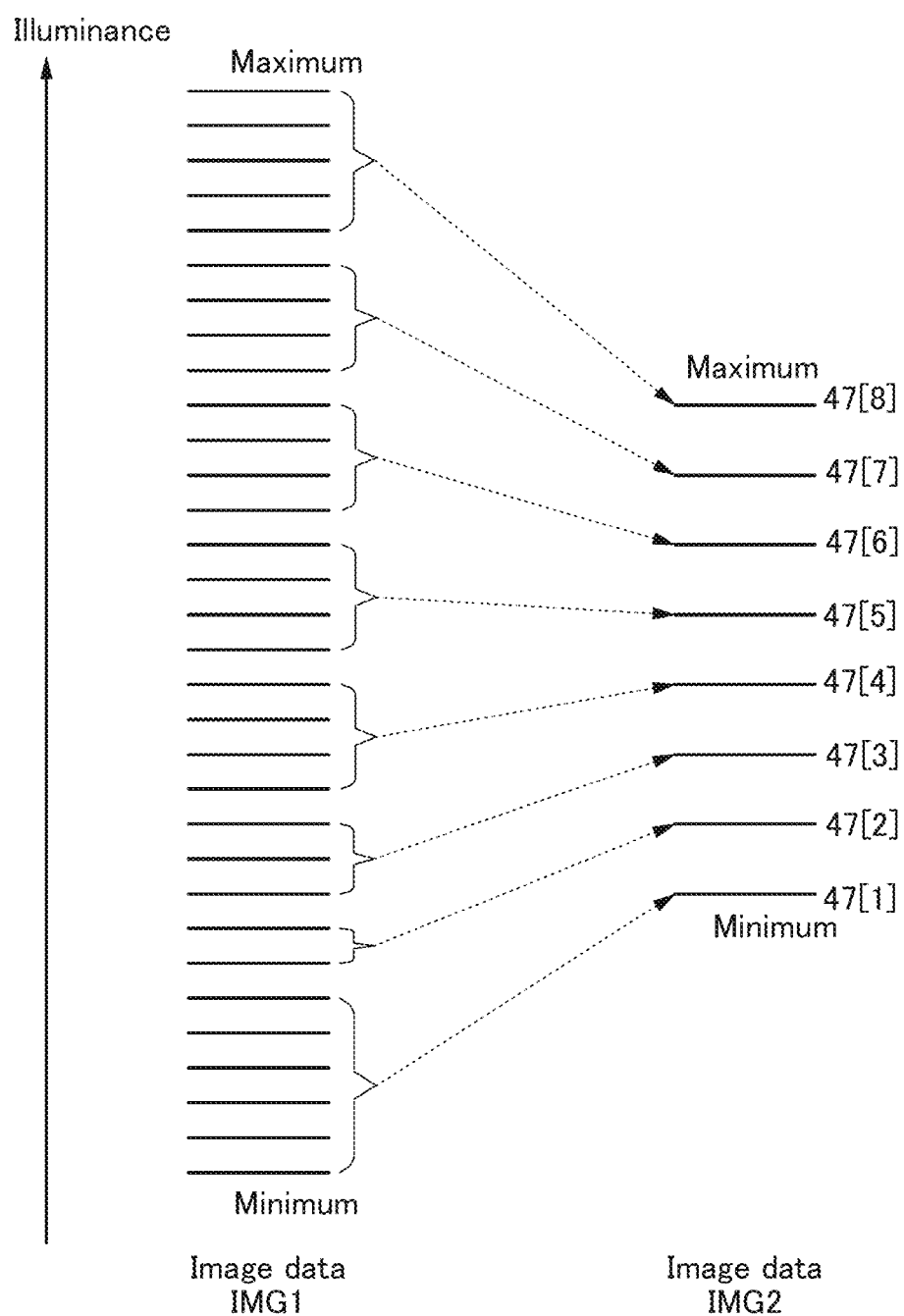
FIG. 2 A diagram illustrating a display system.

The function of the control device 30 will be described in detail with reference to FIG. 2 to FIG. 4. FIG. 2 illustrates conversion from the image data IMG1 into the image data IMG2. FIG. 2 illustrates the case where the illuminance scope that can be expressed by the image data IMG2 is narrower than the illuminance scope that can be expressed by the image data IMG1, that is, the dynamic range of the display device 40 is narrower than the dynamic range of the imaging device 20. FIG. 2 illustrates the case where the image data IMG1 can express 32 gray levels and the image data IMG2 can express 8 gray levels, as an example. Note that the gray levels expressed by the image data IMG2 are sequentially represented by a gray level 47[1] to a gray level 47[8] in order from the lower illuminance.

In this specification and the like, a gray level that expresses a high illuminance has a larger value than a gray level that expresses a low illuminance. For example, in the case of the gray levels 47[1] to 47[8] shown in FIG. 2, the gray level 47[1] has the smallest value and the gray level 47[8] has the largest value.

As shown in FIG. 2, six gray levels of the image data IMG1 are expressed by the gray level 47[1], for example. That is, the dynamic range of the six gray levels can be compressed to one gray level. In contrast, the gray level 47[2] expresses two gray levels of the image data IMG1. That is, the dynamic range of the two gray levels is compressed to one gray level. Here, the dynamic range compressibility can be expressed by "the number of gray levels of the image data IMG2/the number of gray levels of the image data IMG1"; it can be said that the smaller this value is, the higher the dynamic range compressibility is. In the case of FIG. 2, when the gray level of the image data IMG1 is converted into the gray level 47[1], the dynamic range compressibility is ⅙, and when the gray level of the image data IMG2 is converted into the gray level 47[2], the dynamic range compressibility is ½. Therefore, it can be said that the dynamic range compressibility for converting the gray level of the imaging data into the gray level 47[1] is higher than the dynamic range compressibility for converting the gray level of the imaging data into the gray level 47[2].

In one embodiment of the present invention, at the time of converting the image data IMG1 into the image data IMG2 for dynamic range compression, the dynamic range compressibility can be changed for each illuminance range, as shown in FIG. 2.

Note that FIG. 2 shows the case where the lower limit of illuminance that can be expressed by the image data IMG2 is higher than the lower limit of illuminance that can be expressed by the image data IMG1 and the upper limit of illuminance that can be expressed by the image data IMG2 is lower than the upper limit of illuminance that can be expressed by the image data IMG1; however, one embodiment of the present invention is not limited thereto. For example, the lower limit of illuminance that can be expressed by the image data IMG2 may be lower than or equal to the lower limit of illuminance that can be expressed by the image data IMG1. Alternatively, the upper limit of illuminance that can be expressed by the image data IMG2 may be higher than or equal to the upper limit of illuminance that can be expressed by the image data IMG1.

FIG. 2 shows the case where the number of gray levels that can be expressed by the image data IMG2 is smaller than the number of gray levels that can be expressed by the image data IMG1; however, one embodiment of the present invention is not limited thereto. For example, the number of gray levels that can be expressed by the image data IMG2 may be the same as the number of gray levels that can be expressed by the image data IMG1.

Figure 3:
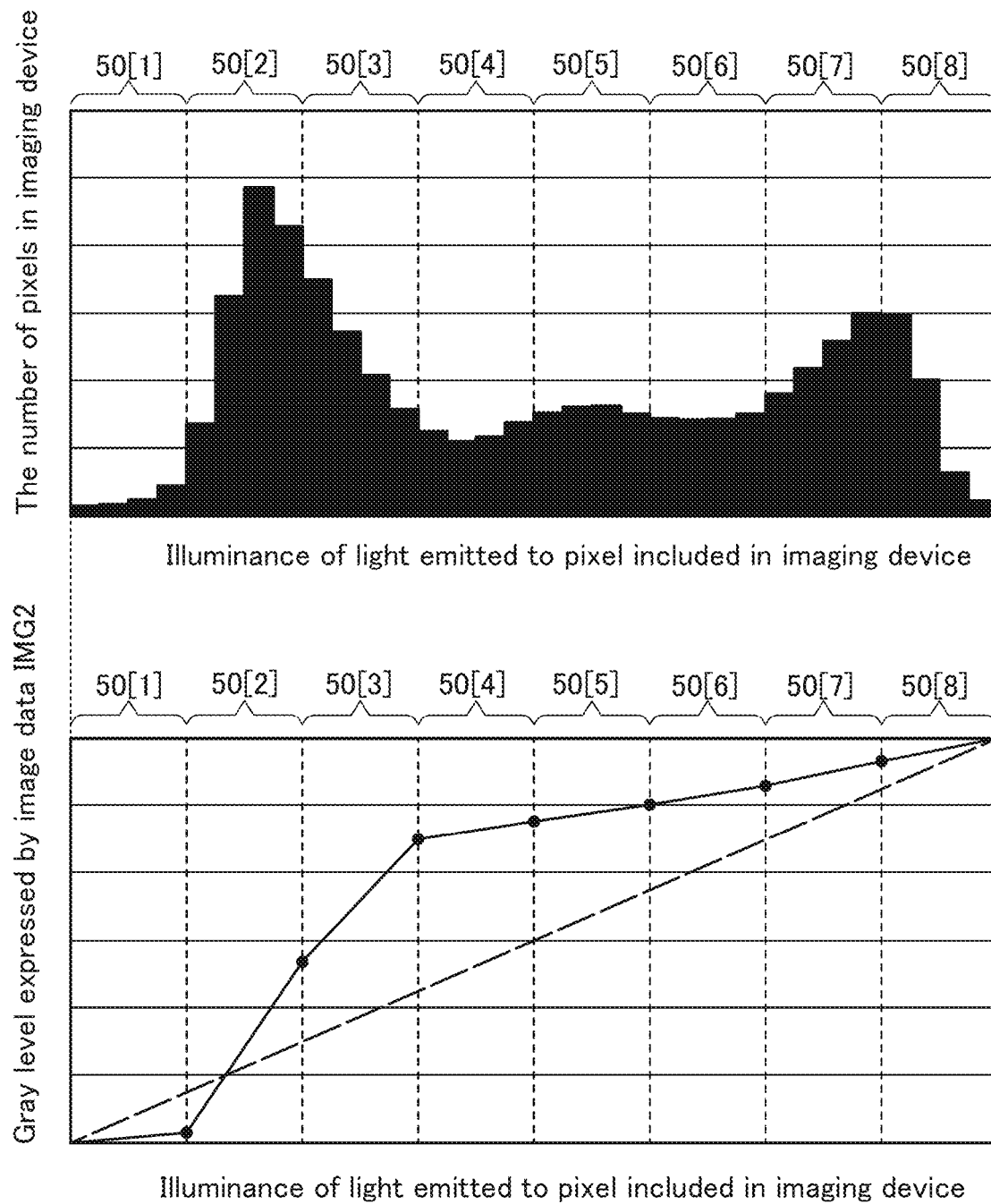
FIG. 3 A diagram illustrating a display system.

The upper side in FIG. 3 is a histogram obtained by the analysis circuit 31; the vertical axis represents the number of pixels 21 and the horizontal axis represents the illuminance of light emitted to the pixel 21. The lower side in FIG. 3 is a graph showing the relation between gray levels expressed by the image data IMG2 corresponding to an image displayed by the display device 40 and the illuminance of light emitted to the pixel 21 included in the imaging device 20. That is, the vertical axis of the graph in the lower side in FIG. 3 represents the illuminance of light emitted from the pixel 41 included in the display device 40, and indicates a higher illuminance upward the top.

In the graph in the lower side in FIG. 3, a solid line shows the case where the gray level determination circuit 32 determines the dynamic range compressibility using the histogram shown in the upper side in FIG. 3, and a dashed line shows the case where the dynamic range compressibility is constant regardless of the illuminance of light emitted to the pixel 21.

In FIG. 3, the illuminance of light emitted to the pixels 21 is divided into illuminance range 50[1] to illuminance range 50[8]. Note that in the histogram in the upper side and the graph in the lower side in FIG. 3, the horizontal axes represent the same, the left ends of the horizontal axes represent the lower limit of illuminance of light that can be detected by the pixel 21, and the right ends of the horizontal axes represent the upper limit of the illuminance.

As shown by the solid line of the graph in the lower side in FIG. 3, among the illuminance range 50[1] to the illuminance range 50[8], in the illuminance range 50 in which light is emitted to only a small number of the pixels 21, that is, in the illuminance range 50 with a small value of integral in the histogram shown in the upper side in FIG. 3, the amount of an increase in the gray level expressed by the image data IMG2 is small even when the illuminance of light emitted to the pixel 21 is increased. In other words, the dynamic range compressibility can be said to be high in conversion from the image data IMG1 to the image data IMG2 as in conversion to the gray level 47[1] shown in FIG. 2. In contrast, in the illuminance range 50 in which light is emitted to a large number of the pixels 21, that is, in the illuminance range 50 with a large value of integral in the histogram shown in the upper side in FIG. 3, when the illuminance of light emitted to the pixel 21 is increased, the value of gray level of display data is largely increased. In other words, the dynamic range compressibility is low in conversion from the image data IMG1 to the image data IMG2 as in conversion to the gray level 47[2] shown in FIG. 2. As described above, in the graph in the lower side in FIG. 3, the dynamic range compressibility for conversion from the image data IMG1 to the image data IMG2 is expressed by a slope; it can be said that the steeper the slope is, the lower the dynamic range compressibility for conversion from the imaging data to the display data is.

The gray level determination circuit 32 performs dynamic range compression on the image data IMG1 for each illuminance range 50 using the compressibility shown in the lower side in FIG. 3, so that the image data IMG2 can be generated.

An example of a method for calculating the dynamic range compressibility will be described with reference to FIG. 3. Note that the pixels 41 included in the display device 40 can express 100 gray levels.

First, the proportion of the pixels 21 to which light with illuminance corresponding to the illuminance range 50[1] to the illuminance range 50[8] is emitted to all of the pixels 21 is calculated. Next, the gray levels of the image data IMG2 assigned to the illuminance range 50[1] to the illuminance range 50[8] are determined in accordance with the calculated proportion. For example, when light with illuminance corresponding to the illuminance range 50[1] is emitted to 2% of the pixels 21, two gray levels of the image data IMG2 are assigned to the illuminance range 50[1]. For example, when light with illuminance corresponding to the illuminance range 50[2] is emitted to 24% of the pixels 21, 24 gray levels of the image data IMG2 are assigned to the illuminance range 50[2]. The above is performed on all the illuminance range 50[1] to the illuminance range 50[8], so that the dynamic range compressibility for each of the illuminance range 50[1] to the illuminance range 50[8] can be calculated.

FIG. 4(A1) shows an image displayed by the display device 40 in the case where the dynamic range compressibility is constant regardless of the illuminance of light emitted to the pixels 21 included in the imaging device 20 as shown by the dashed line in the lower side in FIG. 3. FIG. 4(A2) is a histogram in the case where the display device 40 displays the image shown in FIG. 4(A1); the vertical axis represents the number of pixels 41 included in the display device 40 and the horizontal axis represents the illuminance of light emitted from the pixel 41.

FIG. 4(B1) shows an image displayed by the display device 40 in the case where the dynamic range compressibility for each illuminance range is determined using the histogram shown in the upper side in FIG. 3, as shown in the solid line in the graph in the lower side in FIG. 3. FIG. 4(B2) is a histogram in the case where the display device 40 displays the image shown in FIG. 4(B1).

Note that in FIGS. 4(A2) and 4(B2), the left ends of the horizontal axes represent the lower limit of illuminance of light that the pixel 41 can emit, and the right ends of the horizontal axes represent the upper limit of the illuminance.

In the case of FIGS. 4(A1) and 4(A2), the number of pixels 41 which emit light with illuminance around the lower limit and the number of pixels 41 which emit light with illuminance around the upper limit are large. Thus, blocked up shadows and blown-out highlights occur, so that the image displayed by the display device 40 is unsharp. In contrast, in the case of FIGS. 4(B1) and 4(B2), the number of pixels 41 for each illuminance range is smoothed as compared with the case of FIGS. 4(A1) and 4(A2). Accordingly, blocked up shadows and blown-out highlights are less likely to occur as compared with the case of FIGS. 4(A1) and 4(A2), so that the image displayed by the display device 40 can be sharp; therefore, the visibility of the image can be increased.

<Configuration Example 2 of Display System>

Figure 5:
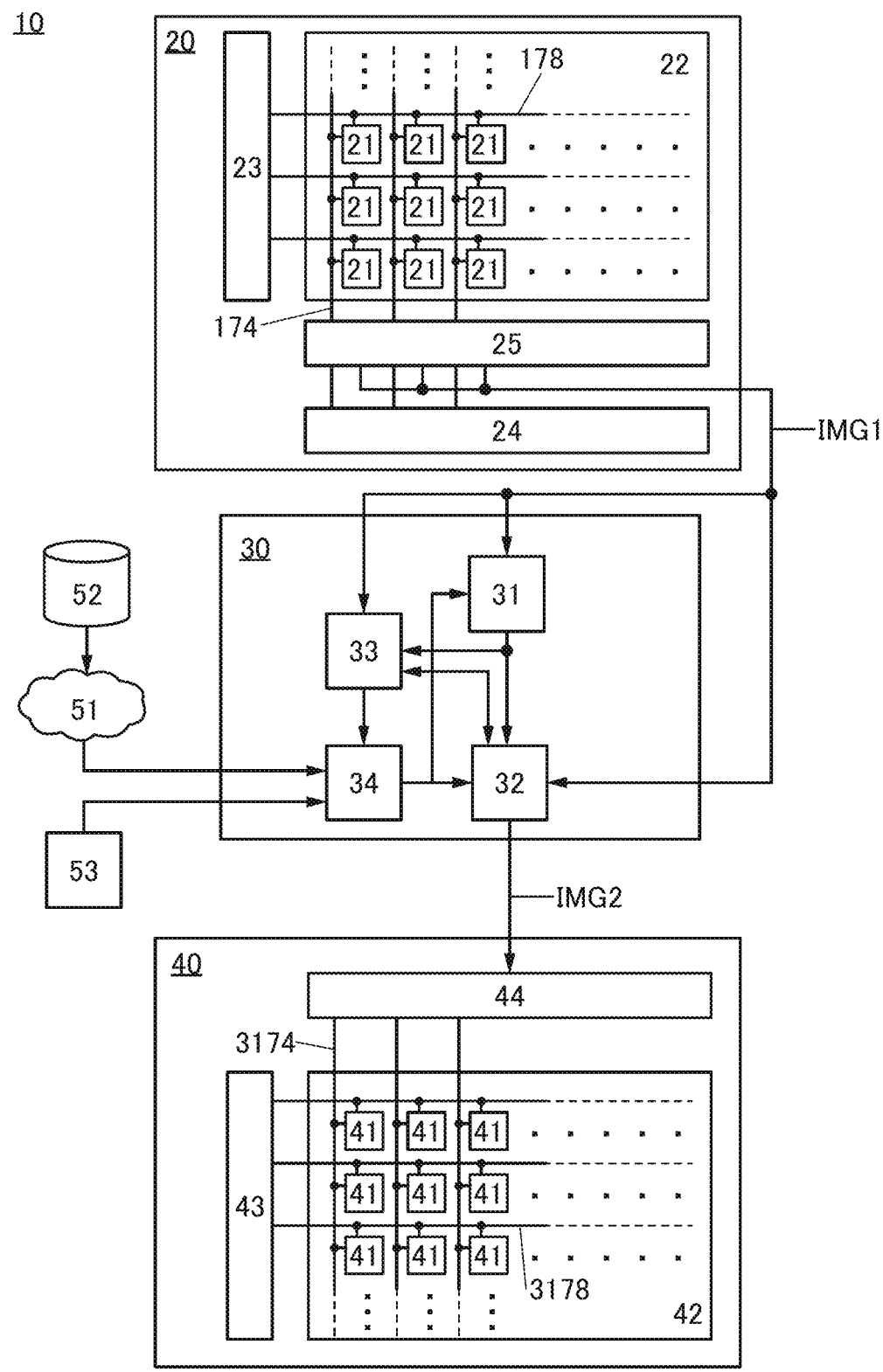
FIG. 5 A block diagram illustrating a configuration example of a display system.

FIG. 5 is a block diagram showing a modification example of the display system 10 shown in FIG. 1. The display system 10 with the configuration illustrated in FIG. 5 is different from the display system 10 with the configuration shown in FIG. 4 in that a memory circuit 33 and a prediction circuit 34 are included in addition to the analysis circuit 31 and the gray level determination circuit 32.

The memory circuit 33 has a function of storing the image data IMG1 generated by the imaging device 20, the histogram formed by the analysis circuit 31, the dynamic range compressibility calculated by the gray level determination circuit 32, and the like. The prediction circuit 34 has a function of predicting the image data IMG1 in subsequent frames after the reception of the image data IMG1. For example, the prediction circuit 34 has a function of predicting the image data IMG1 in a frame one frame or two or more frames after from the received image data IMG1.

The prediction circuit 34 has a function of predicting the image data IMG1 on the basis of the image data IMG1, the histogram, and the dynamic range compressibility which are stored in the memory circuit 33, information stored in a server 52, information obtained by a device 53, and the like, for example. Note that the server 52 is connected to the prediction circuit 34 through a network 51.

The prediction circuit 34 has functions of performing image recognition on, for example, the image data IMG1 stored in the memory circuit 33 and acquiring data on positions of a car ahead, an oncoming car, a pedestrian, and the like, illuminance of sun light, a street light, a head light, and the like, and other external environment. Furthermore, the prediction circuit 34 has a function of acquiring information on the current time and the like from the server 52, for example. The device 53 can be, for example, a GPS (Global Positioning System), and has a function of acquiring information on a position, a direction, and the like of a moving vehicle including the imaging device 20 and a function of outputting the information to the prediction circuit 34. The prediction circuit 34 can predict the image data IMG1 on the basis of the aforementioned information and the like. Note that the device 53 may consist of two or more devices.

The prediction circuit 34 can determine the timing, frequency, and the like of updating the dynamic range compressibility, depending on the prediction result. For example, when generation of blocked up shadows or blown-out highlights is predicted, the dynamic range compressibility can be updated. Alternatively, when a change in illuminance of the image data IMG1 is predicted to be small, the frequency of updating the dynamic range compressibility can be decreased; when the change in illuminance of the image data IMG1 is predicted to be large, the frequency of updating the dynamic range compressibility can be increased. In the above manner, it is unnecessary to update the dynamic range compressibility for every frame period, for example, and the display system 10 can be operated at a higher speed. Furthermore, the dynamic range compressibility can be updated at an appropriate timing; thus, the visibility of an image displayed by the display device 40 can be prevented from decreasing while the frequency of updating the dynamic range compressibility can be decreased.

Here, the prediction circuit 34 can include a neural network. The prediction circuit 34 with such a configuration can predict the image data IMG1 with high accuracy.

The neural network has the aforementioned functions by learning. For the learning, first, the image data IMG1, information acquired from the server 52 and the device 53, and the like are input to the neural network. After that, the neural network performs learning using the image data IMG1 in a frame one frame or two or more frames after the input image data IMG1 as teacher data. Specifically, a weight coefficient of a neural network is updated, for example. By repeating this operation, the neural network can predict the image data IMG1 with high accuracy.

Operation Method Example of Display System

Figure 6:
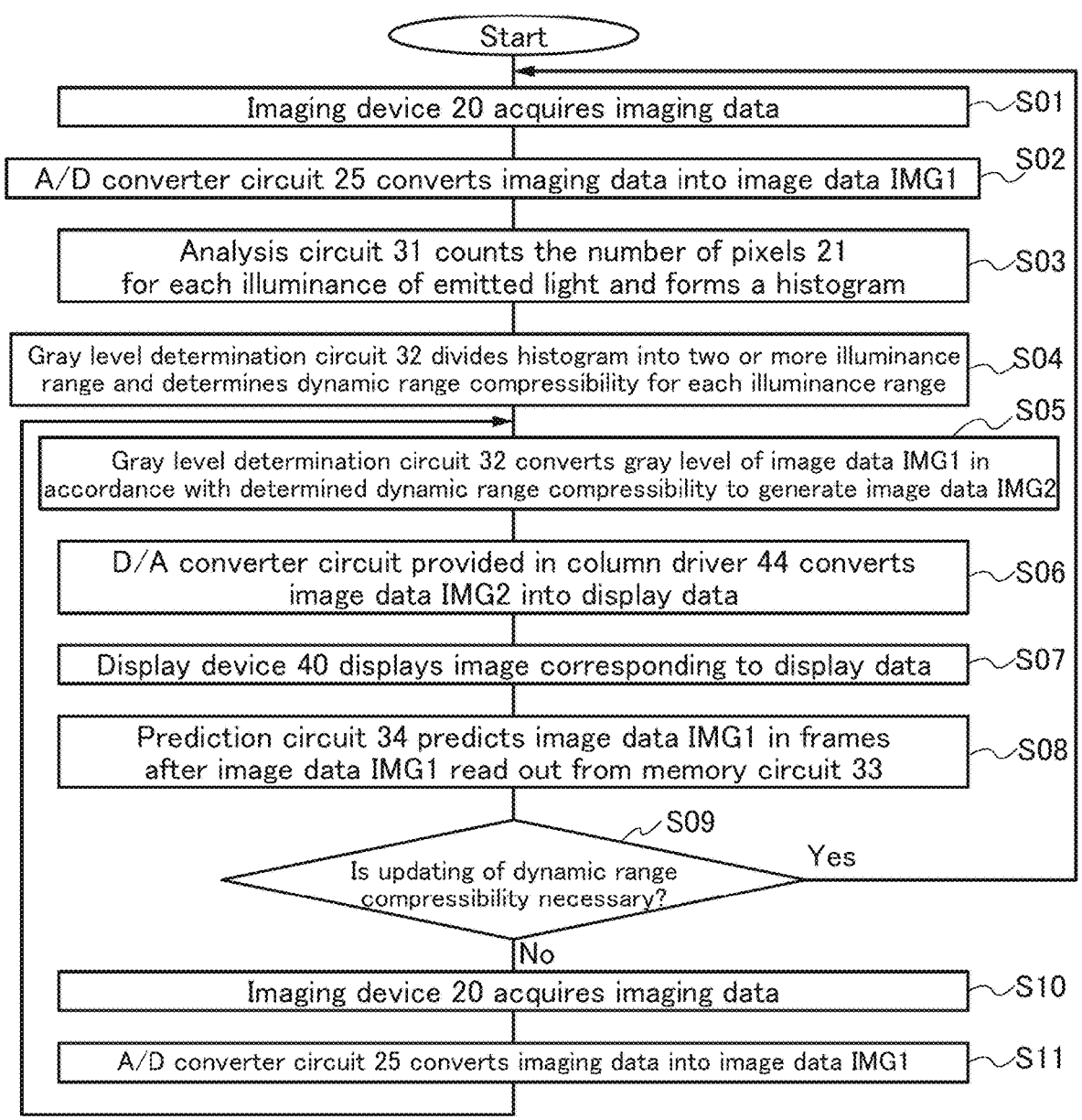
FIG. 6 A flow chart illustrating an example of an operation method of a display system.

Next, an example of an operation method of the display system 10 with the configuration illustrated in FIG. 5 will be described with reference to FIG. 6 and FIG. 7. FIG. 6 is a flow chart illustrating an example of the operation method.

First, the imaging device 20 acquires analog imaging data corresponding to the illuminance of light emitted to the pixels 21 (Step S01). Next, the A/D converter circuit 25 provided in the imaging device 20 converts the imaging data acquired in Step S01 into the digital image data IMG1 (Step S02). Then, the image data IMG1 is transmitted to circuits included in the control device 30, specifically, the analysis circuit 31, the gray level determination circuit 32, the memory circuit 33, and the like.

Next, the analysis circuit 31 counts the number of pixels 21 for each illuminance of emitted light on the basis of the image data IMG1 received from the A/D converter circuit 25 and forms a histogram as shown in the upper side in FIG. 3 (Step S03). The formed histogram is transmitted to the gray level determination circuit 32, the memory circuit 33, and the like.

After that, the gray level determination circuit 32 determines the dynamic range compressibility of the image data IMG1 on the basis of the histogram received from the analysis circuit 31. Specifically, as shown in the upper side in FIG. 3, the histogram is divided into two or more illuminance ranges and the dynamic range compressibilities of the illuminance ranges are made different (Step S04). As shown in the graph in the lower side in FIG. 3, in an illuminance range in which light is emitted to a large number of the pixels 21, that is, in an illuminance range with a large value of integral in the histogram, the dynamic range compressibility is set low. In contrast, in an illuminance range in which light is emitted to only a small number of the pixels 21, that is, in an illuminance range with a small value of integral in the histogram, the dynamic range compressibility is set high.

Next, the gray level determination circuit 32 converts the gray levels of the image data IMG1 into the ones as shown in FIG. 2 in accordance with the determined dynamic range compressibility, so that the image data IMG2 is generated through the dynamic range compression (Step 505).

Next, the D/A converter circuit provided in the column driver 46 included in the display device 40 converts the digital image data IMG2 into analog display data (Step S06). After that, the column driver 46 writes the display data to the pixels 41, and thus the display device 40 displays an image corresponding to the display data (Step S07).

Then, the prediction circuit 34 reads out necessary information among the image data IMG1, the histogram, the dynamic range compressibility, and the like stored in the memory circuit 33. In addition, necessary information is acquired from the server 52 through the network 51. Moreover, the device 53 acquires necessary information and transmits the acquired information to the prediction circuit 34. On the basis of the acquired information described above, the prediction circuit 34 predicts the image data IMG1 in subsequent frames after the image data IMG1 read out from the memory circuit 33 (Step S08). For example, the prediction circuit 34 predicts the image data IMG1 in a frame one frame or two or more frames after from the image data IMG1 read out from the memory circuit 33.

Next, whether updating of the dynamic range compressibility is needed is determined from the prediction result by the prediction circuit 34 (Step S09). For example, in the case where the predicted image data IMG1 is converted into the image data IMG2 on the basis of the predicted image data IMG1 and the dynamic range compressibility read out by the prediction circuit 34, the prediction circuit 34 predicts whether blocked up shadows or blown-out highlights occur. In the case where the prediction circuit 34 predicts that blocked up shadows or blown-out highlights occur, it is determined that updating of the dynamic range compressibility is necessary, and the operation returns to Step S01. In the case where the prediction circuit 34 predicts that blocked up shadows or blown-out highlights do not occur, it is determined that updating of the dynamic range compressibility is unnecessary. In that case, the imaging device 20 acquires imaging data (Step S10) in a manner similar to that in Step S01, and then the A/D converter circuit 25 converts the imaging data acquired in Step S10 into the image data IMG1 (Step S11) in a manner similar to that in Step S02, and the image data IMG1 is transmitted to circuits included in the control device 30. After that, Step S03 and Step S04 are omitted, and the operation returns to Step 505. The above is an example of the operation method of the display system 10 with the configuration illustrated in FIG. 5.

Here, in the case where it is determined that updating of the dynamic range compressibility is unnecessary in Step S09, the dynamic range compressibility stored in the memory circuit 33 is read out, and the gray levels of the image data IMG1 are converted using the dynamic range compressibility in Step 505.

Note that information on the determination result in Step S09 is transmitted from the prediction circuit 34 to, for example, the analysis circuit 31 and the gray level determination circuit 32. The information on the determination result can be transmitted by, for example, transmitting a signal, which is a high potential when it is determined that updating of the dynamic range compressibility is necessary or is a low potential when it is determined that updating of the dynamic range compressibility is unnecessary, to the analysis circuit 31, the gray level determination circuit 32, and the like. The logic of the signal may be inverted.

Figure 7:
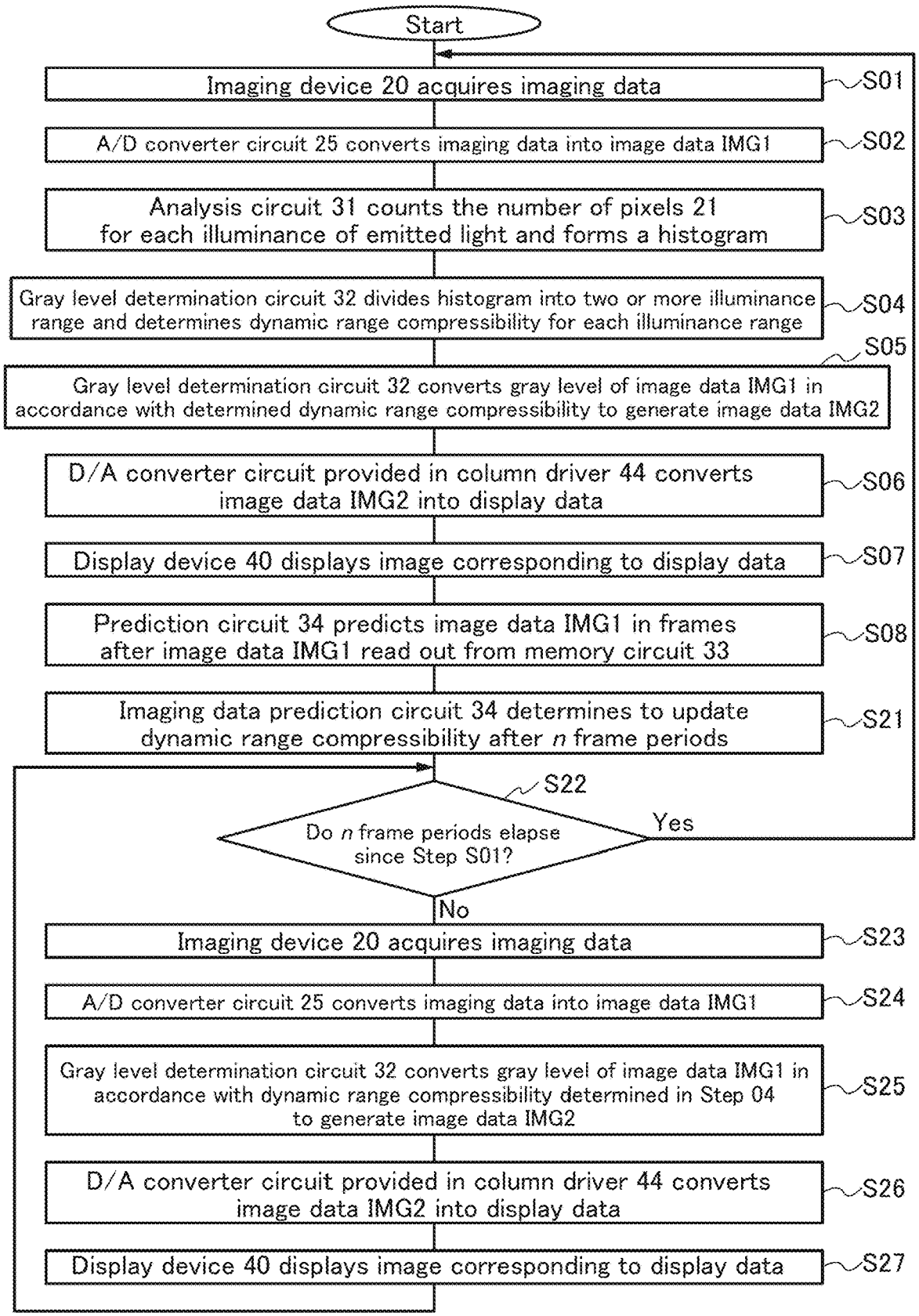
FIG. 7 A flow chart illustrating an example of an operation method of a display system.

FIG. 7 shows a modification example of the operation method shown in FIG. 6, and an example of an operation method in which the dynamic range compressibility is updated when n frame periods elapse after the gray level determination circuit 32 determines the dynamic range compressibility (n is an integer of 1 or larger).

In FIG. 7, Step S01 to Step S08 are the same as those in FIG. 6. After Step S08, the prediction circuit 34 determines the value of n on the basis of the predicted image data IMG1 or the like (Step S21). For example, n is made large in the case where a change in illuminance of the image data IMG1 is predicted to be small, and n is made small in the case where a change in illuminance of the image data IMG2 is predicted to be large.

Next, whether n frame periods elapse since Step S01 is determined (Step S22). In the case where n frame periods elapse, it is determined that updating of the dynamic range compressibility is necessary and the operation returns to Step S01.

In the case where n frame periods do not elapse, first, the imaging device 20 acquires imaging data (Step S23) in a manner similar to that in Step S01. Next, the A/D converter circuit 25 converts the imaging data acquired in Step S23 into the image data IMG1 (Step S24) in a manner similar to that in Step S02. Then, the image data IMG1 is transmitted to circuits included in the control device 30.

Next, the gray level determination circuit 32 reads out the dynamic range compressibility determined in Step S04 from the memory circuit 33, and converts the gray levels of the image data IMG1 in accordance with the dynamic range compressibility. Thus, the image data IMG2 is generated (Step S25).

Next, in a manner similar to that in Step S06, the D/A converter circuit provided in the column driver 46 included in the display device 40 converts the digital image data IMG2 into analog display data (Step S26). After that, in a manner similar to that in Step S07, the column driver 46 writes the display data to the pixels 41, and thus the display device 40 displays an image corresponding to the display data (Step S27).

Then, the operation returns to Step S22, and whether n frame periods elapse since Step S01 is determined again. The above is an example of the operation method of the display system 10 illustrated in FIG. 5.

Note that information on the determination result in Step S22 is transmitted from the prediction circuit 34 to, for example, the analysis circuit 31 and the gray level determination circuit 32. The information on the determination result can be transmitted by, for example, transmitting a signal which indicates the value of n to the analysis circuit 31, the gray level determination circuit 32, and the like. The signal can be a signal of two or more bits.

By operating the display system 10 by the method shown in FIG. 6 or FIG. 7, it is unnecessary to update the dynamic range compressibility for every frame period, for example, and the display system 10 can be operated at a higher speed. Furthermore, the dynamic range compressibility can be updated at an appropriate timing; thus, the visibility of an image displayed by the display device 40 can be prevented from decreasing while the frequency of updating the dynamic range compressibility can be decreased.

Note that Step S03 is not performed in the case where updating of the dynamic range compressibility is not performed, as shown in FIG. 6 and FIG. 7. For this reason, the analysis circuit 31 is brought into a standby state, so that power consumption of the analysis circuit 31 can be reduced. Furthermore, since Step S04 is not performed, calculation of the dynamic range compressibility is not performed. Consequently, the operation load of the gray level determination circuit 32 can be reduced, so that power consumption of the gray level determination circuit 32 can be reduced.

Structural Example of Imaging Device

Next, an example of a detailed structure of the imaging device 20 will be described with reference to FIG. 8 to FIG. 14.

[Configuration Example and Operation Method Example of Pixel Circuit]

Figure 8A:
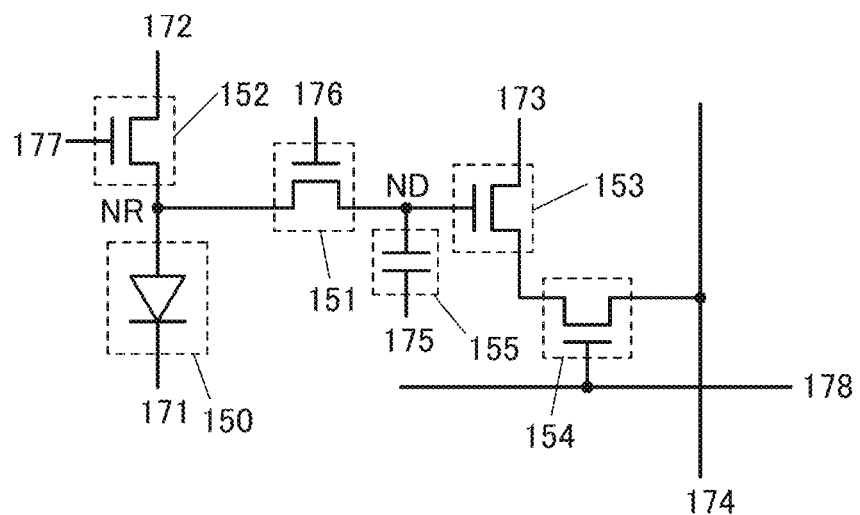
FIGS. 8A and 8B A diagram illustrating a configuration example of a pixel circuit and a timing chart showing an example of an imaging operation method.

FIG. 8(A) is a diagram illustrating an example of a circuit configuration of the pixel 21. In other words, FIG. 8(A) is a diagram illustrating an example of a configuration of a pixel circuit included in the imaging device 20. The pixel 21 with a configuration illustrated in FIG. 8(A) includes a photoelectric conversion element 150, a transistor 151, a transistor 152, a transistor 153, a transistor 154, and a capacitor 155.

One electrode of the photoelectric conversion element 150 is electrically connected to one of a source and a drain of the transistor 151. The one of the source and the drain of the transistor 151 is electrically connected to one of a source and a drain of the transistor 152. The other of the source and the drain of the transistor 151 is electrically connected to a gate of the transistor 153. The gate of the transistor 153 is electrically connected to one electrode of the capacitor 155. One of a source and a drain of the transistor 153 is electrically connected to one of the source and the drain of the transistor 154. Note that the capacitor 155 is not necessarily provided.

The other electrode of the photoelectric conversion element 150 is electrically connected to a wiring 171. A gate of the transistor 151 is electrically connected to a wiring 176. A gate of the transistor 152 is electrically connected to a wiring 177. The other of the source and the drain of the transistor 152 is electrically connected to a wiring 172. The other of the source and the drain of the transistor 153 is electrically connected to a wiring 173. The other of the source and the drain of the transistor 154 is electrically connected to a wiring 174. A gate of the transistor 154 is electrically connected to a wiring 178. The other electrode of the capacitor 155 is electrically connected to a wiring 175.

The wiring 171, the wiring 172, the wiring 173, and the wiring 175 each have a function of a power supply line. For example, the wiring 171 and the wiring 173 can serve as high potential power supply lines, and the wiring 172 and the wiring 175 can serve as low potential power supply lines. The wiring 176, the wiring 177, and the wiring 178 each have a function of a signal line for controlling conduction of the transistor. The wiring 174 has a function of an output line that outputs a signal from the pixel 21.

Note that a wiring connected to the one electrode of the photoelectric conversion element 150, one of a source and a drain of the transistor 151, and the one of a source and a drain of the transistor 152 is a charge accumulation portion NR. A wiring connected to the other of the source and the drain of the transistor 151, the gate of the transistor 153, and the one electrode of the capacitor 155 is the charge detection portion ND.

The transistor 151 has a function of transferring the potential of the charge accumulation portion NR that changes in response to the operation of the photoelectric conversion element 150 to a charge detection portion (ND). The transistor 152 has a function of initializing the potentials of the charge accumulation portion NR and the charge detection portion ND. The transistor 153 has a function of outputting a signal corresponding to the potential of the charge detection portion (ND). The transistor 154 has a function of selecting a pixel 21 from which a signal is read.

An avalanche photodiode may be used as the photoelectric conversion element 150 in order to increase the photodetection sensitivity. In the case of using an avalanche photodiode, a relatively high potential needs to be supplied to the wiring 171.

At this time, as the transistor connected to the photoelectric conversion element 150, a transistor which can withstand high voltage is preferably used because high voltage can be applied. As this transistor, an OS transistor, which is a transistor using a metal oxide in a channel formation region, can be used, for example. Specifically, OS transistors are preferably used as the transistor 151 and the transistor 152.

The use of OS transistors as the transistors 151 and 152 can make a period during which charge can be held in the charge detection portion ND and the charge accumulation portion NR extremely long owing to their low off-state current characteristics. Therefore, a global shutter system in which a charge accumulation operation is performed in all the pixels at the same time and reading operation is sequentially performed can be employed without complicating the circuit configuration and operation method.

The transistor 153 is desired to have excellent amplifying characteristics; thus, a transistor with high on-state current is preferably used. Therefore, a transistor using silicon in a channel formation region (hereinafter referred to as a Si transistor) is preferably applied to the transistor 153 and the transistor 154.

When an avalanche photodiode is used as the photoelectric conversion element 150 and the transistor 151 and the transistor 154 have the above structures, it is possible to fabricate an imaging device that has high light detection sensitivity in low illuminance and can output a signal with little noise. Owing to the high light detection sensitivity, light capturing time can be shortened and imaging can be performed at high speed.

Note that the photoelectric conversion element 150 is not limited to the aforementioned structure, and may be an element without avalanche multiplication. Alternatively, a potential with which avalanche multiplication does not occur may be applied to the avalanche photodiode.

OS transistors may be used as the transistor 153 and the transistor 154. Alternatively, Si transistors may be used as the transistor 151 and the transistor 152. The pixel 21 can be operated in either case.

Figure 8B:
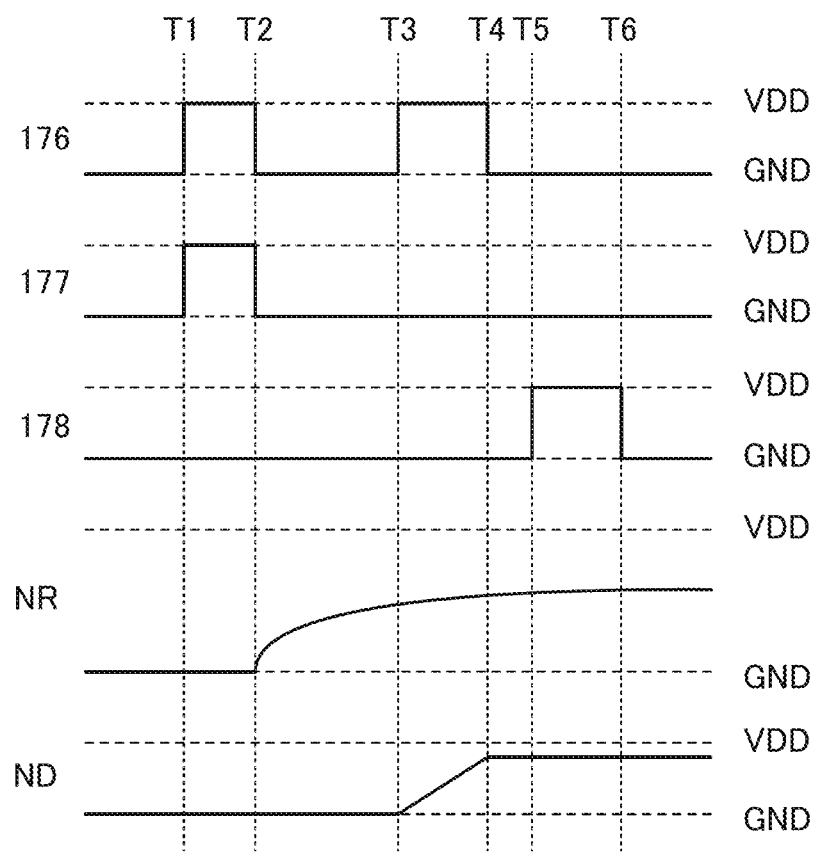

Next, an example of an operation method of the pixel 21 will be described with reference to a timing chart in FIG. 8(B). Note that in operation described below as an example, potentials supplied to the wirings are as follows. The wiring 176, the wiring 177, and the wiring 178 are supplied with VDD as a high potential and GND as a low potential. The wiring 171 and the wiring 173 are supplied with the potential VDD. The wiring 172 and the wiring 175 are supplied with the potential GND. Note that a potential other than the aforementioned potentials may be supplied to the wirings; for example, a potential HVDD that is higher than VDD may be supplied to the wiring 171.

In Time T1, the wiring 176 is set at a high potential and the wiring 177 is set at a high potential, and the potentials of the charge accumulation portion NR and the charge detection portion ND are each set to a reset potential (GND) (reset operation).

In Time T2, the wiring 176 is set at a low potential and the wiring 177 is set at a low potential, whereby the potential of the charge accumulation portion NR changes (accumulation operation). The potential of the charge accumulation portion NR is changed from the vicinity of GND up to the vicinity of VDD depending on the intensity of light that enters the photoelectric conversion element 150.

At Time T3, the wiring 176 is set at a high potential, the wiring 177 is at a low potential, and thus charge in the charge accumulation portion NR is transferred to the charge detection portion ND (transfer operation).

At Time T4, the wiring 176 is set at a low potential, the wiring 177 is at a low potential, and thus transfer operation is terminated. At this time, the potential of the charge detection portion ND is determined.

In a period from Times T5 to T6, the wiring 176 is set at a low potential, the wiring 177 is set at a low potential, and the wiring 178 is set at a high potential, and a signal corresponding to the potential of the charge detection portion ND is output to the wiring 174. In other words, an output signal corresponding to the intensity of light that enters the photoelectric conversion element 150 in the accumulation operation can be obtained.

Pixel Configuration Example

Figure 9A:
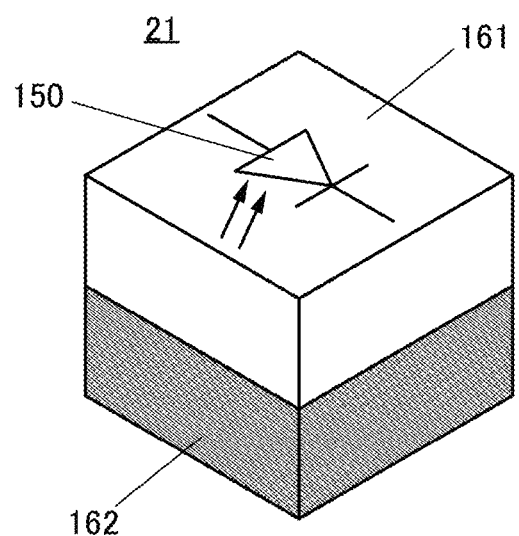
FIGS. 9A to 9D Diagrams illustrating configuration examples of a pixel of an imaging device.

FIG. 9(A) illustrates a configuration example of the pixel 21 including the above-described pixel circuit. The pixel illustrated in FIG. 9(A) is an example of a stacked-layer structure of a layer 161 and a layer 162.

The layer 161 includes the photoelectric conversion element 150. The photoelectric conversion element 150 can have a stacked-layer structure of a layer 165a, a layer 165b, and a layer 165c as shown in FIG. 9(C).

Figure 9B:
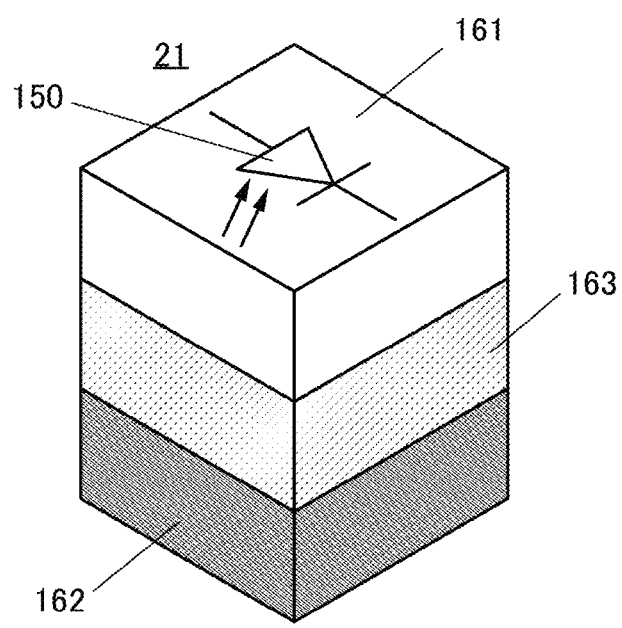
Figure 9C:
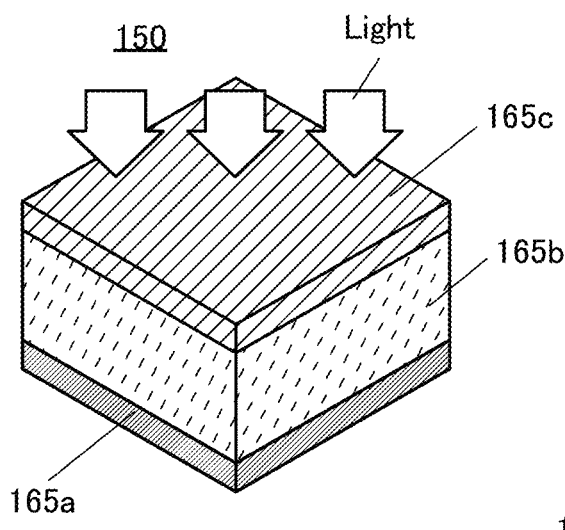

The photoelectric conversion element 150 shown in FIG. 9(C) is a pn-junction photodiode; for example, a p$^+$-type semiconductor can be used for the layer 165a, an n-type semiconductor can be used for the layer 165b, and an n$^+$-type semiconductor can be used for the layer 165c. Alternatively, an n$^+$-type semiconductor may be used for the layer 165a, a p-type semiconductor may be used for the layer 165b, and a p$^+$-type semiconductor may be used for the layer 165c. Alternatively, a pin-junction photodiode in which the layer 165b is an i-type semiconductor may be used.

The pn-junction photodiode or the pin-junction photodiode can be formed using single crystal silicon. The pin-junction photodiode can also be formed using a thin film of amorphous silicon, microcrystalline silicon, polycrystalline silicon, or the like.

Figure 9D:
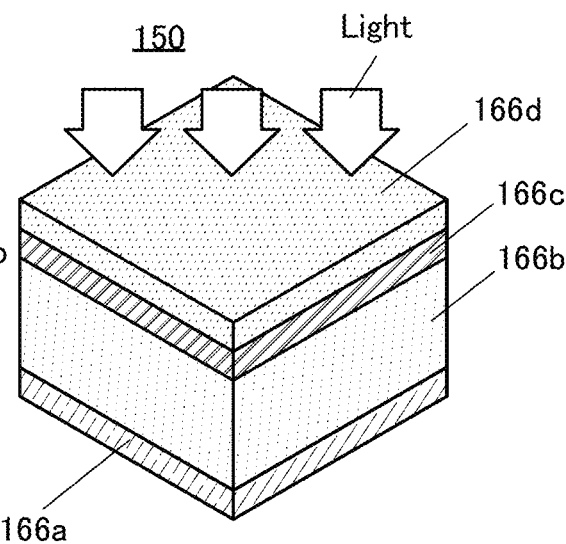

The photoelectric conversion element 150 included in the layer 161 may be a stacked layer of a layer 166a, a layer 166b, a layer 166c, and a layer 166d, as shown in FIG. 9(D). The photoelectric conversion element 150 shown in FIG. 9(D) is an example of an avalanche photodiode, and the layer 166a and the layer 166d correspond to electrodes and the layers 166b and 166c correspond to a photoelectric conversion portion.

The layer 166a is preferably a low-resistance metal layer or the like. For example, aluminum, titanium, tungsten, tantalum, silver, or a stacked layer thereof can be used.

A conductive layer having a high light-transmitting property with respect to visible light is preferably used for the layer 166d. For example, an indium oxide, a tin oxide, a zinc oxide, an indium tin oxide, a gallium zinc oxide, an indium gallium zinc oxide, graphene, or the like can be used. Note that a structure in which the layer 166d is omitted can be also employed.

A structure of a pn-junction photodiode containing a selenium-based material in a photoelectric conversion layer can be used for the layers 166b and 166c of the photoelectric conversion portion, for example. A selenium-based material, which is a p-type semiconductor, is preferably used for the layer 166b, and a gallium oxide or the like, which is an n-type semiconductor, is preferably used for the layer 166c.

A photoelectric conversion element containing a selenium-based material has characteristics of high external quantum efficiency with respect to visible light. In the photoelectric conversion element, carriers are greatly amplified with respect to the amount of incident light by utilizing the avalanche multiplication. A selenium-based material has a high light-absorption coefficient and thus has advantages in production; for example, a photoelectric conversion layer can be formed using a thin film. A thin film of a selenium-based material can be formed by a vacuum evaporation method, a sputtering method, or the like.

As a selenium-based material, crystalline selenium such as single crystal selenium or polycrystalline selenium, amorphous selenium, a compound of copper, indium, and selenium (CIS), a compound of copper, indium, gallium, and selenium (CIGS), or the like can be used.

An n-type semiconductor is preferably formed using a material with a wide band gap and a light-transmitting property with respect to visible light. For example, a zinc oxide, a gallium oxide, an indium oxide, a tin oxide, or a mixed oxide thereof can be used. In addition, these materials have a function of a hole-injection blocking layer, so that a dark current can be decreased.

As the layer 162 illustrated in FIG. 9(A), a silicon substrate can be used, for example. A Si transistor and the like are provided over the silicon substrate, and in addition to the above-described pixel circuit, a circuit for driving the pixel circuit, a circuit for reading an image signal, an image processing circuit, and the like can be provided.

Furthermore, the pixel may have a stacked-layer structure of the layer 161, a layer 163, and the layer 162 as illustrated in FIG. 9(B).

The layer 163 can include OS transistors (for example, the transistors 151 and the transistor 152 of the pixel circuit). In that case, the layer 162 preferably includes Si transistors (for example, the transistor 153 and the transistor 154 of the pixel circuit).

With such a structure, components of the pixel circuit can be dispersed in a plurality of layers and the components can be provided to overlap with each other, whereby the area of the imaging device can be reduced. Note that in the structure of FIG. 9(B), the layer 162 may be a support substrate, and the pixel circuit may be provided in the layer 161 and the layer 163.

Figure 10A:
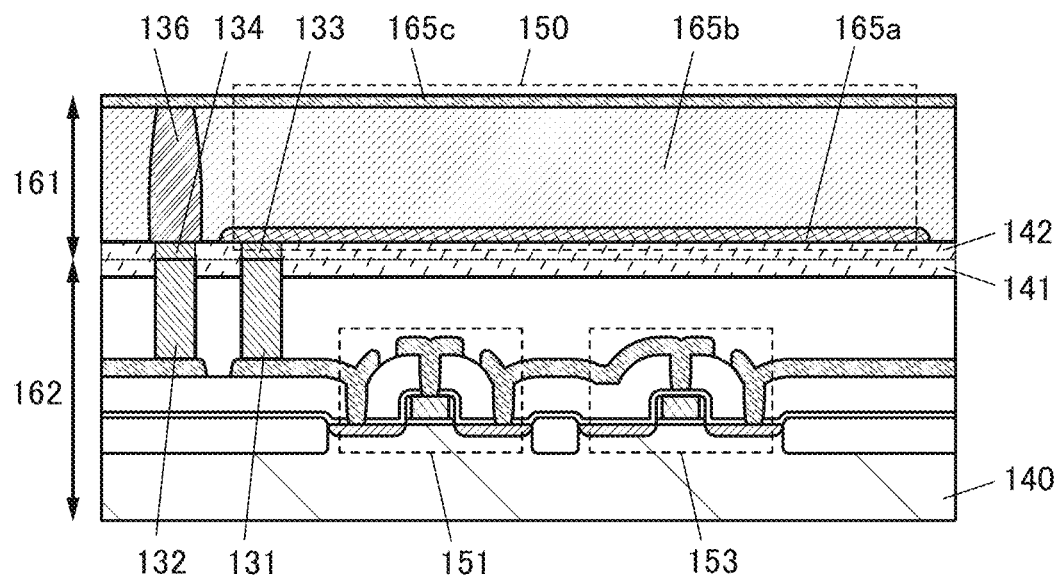
FIGS. 10A and 10B Diagrams illustrating configuration examples of a pixel of an imaging device.

FIG. 10(A) is a diagram illustrating an example of a cross section of the pixel illustrated in FIG. 9(A). The layer 161 includes a pn-junction photodiode with silicon for a photoelectric conversion layer, as the photoelectric conversion element 150. The layer 162 includes a Si transistor and the like included in the pixel circuit.

In the photoelectric conversion element 150, the layer 165a can be a p$^+$-type region, the layer 165b can be an n-type region, and the layer 165c can be an n$^+$-type region. The layer 165b is provided with a region 136 for connecting a power supply line to the layer 165c. For example, the region 136 can be a p$^+$-type region.

Figure 12A:
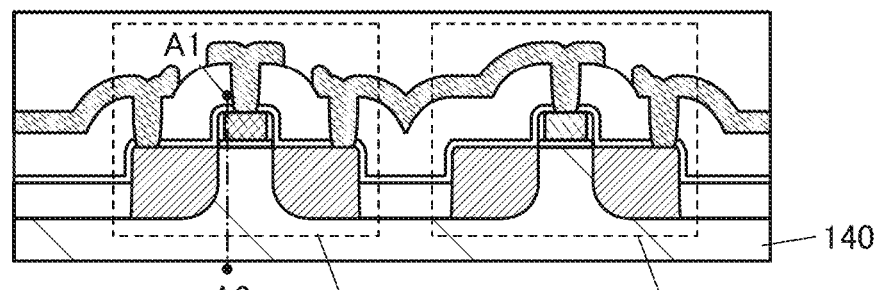
FIGS. 12A to 12E Diagrams illustrating configuration examples of a pixel of an imaging device.
Figure 12B:
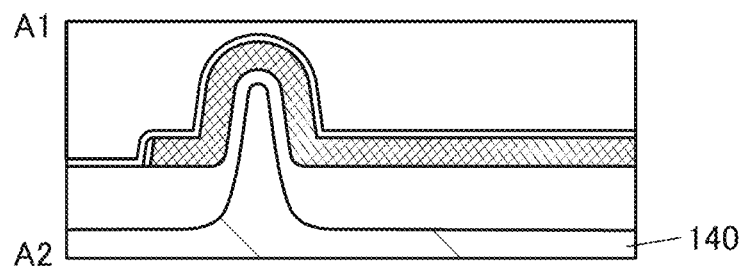

Although the Si transistor shown in FIG. 10(A) is of a planar type including a channel formation region in the silicon substrate 140, the Si transistor may include a fin semiconductor layer in the silicon substrate 140 as shown in FIGS. 12(A) and 12(B). FIG. 12(A) corresponds to a cross section in the channel length direction, and FIG. 12(B) corresponds to a cross section in the channel width direction.

Figure 12C:
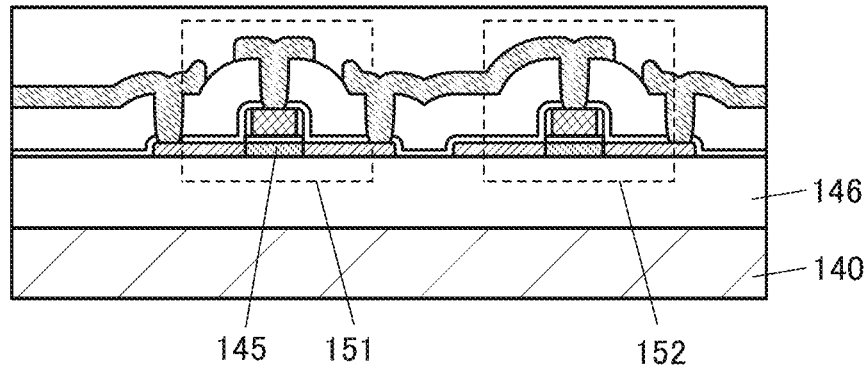

Alternatively, as shown in FIG. 12(C), a transistor including a semiconductor layer 145 of a silicon thin film may be used. The semiconductor layer 145 can be single crystal silicon (SOI (Silicon on Insulator) formed on an insulating layer 146 on the silicon substrate 140, for example.

Here, FIG. 10(A) shows an example of a structure in which electrical connection between components included in the layer 161 and components included in the layer 162 is obtained by a bonding technique.

An insulating layer 142, a conductive layer 133, and a conductive layer 134 are provided in the layer 161. The conductive layer 133 and the conductive layer 134 each include a region embedded in the insulating layer 142. The conductive layer 133 is electrically connected to the layer 165a. The conductive layer 134 is electrically connected to the region 136. Furthermore, the surfaces of the insulating layer 142, the conductive layer 133, and the conductive layer 134 are planarized to have the same level.

An insulating layer 141, a conductive layer 131, and a conductive layer 132 are provided in the layer 162. The conductive layer 131 and the conductive layer 132 each include a region embedded in the insulating layer 141. The conductive layer 132 is electrically connected to a power supply line. The conductive layer 131 is electrically connected to the source or the drain of the transistor 151. Furthermore, the surfaces of the insulating layer 141, the conductive layer 131, and the conductive layer 132 are planarized to have the same level.

Here, a main component of the conductive layer 131 and a main component of the conductive layer 133 are preferably the same metal element. A main component of the conductive layer 132 and a main component of the conductive layer 134 are preferably the same metal element. Furthermore, it is preferable that the insulating layer 141 and the insulating layer 142 be formed of the same component.

For example, for the conductive layers 131, 132, 133, and 134, Cu, Al, Sn, Zn, W, Ag, Pt, Au, or the like can be used. Preferably, Cu, Al, W, or Au is used for easy bonding. In addition, for the insulating layers 141 and 142, silicon oxide, silicon oxynitride, silicon nitride oxide, silicon nitride, titanium nitride, or the like can be used.

That is, the same metal material selected from the above-described metal elements is preferably used for the combination of the conductive layer 131 and the conductive layer 133, and the same metal material selected from the above-described metal elements is preferably used for the combination of the conductive layer 132 and the conductive layer 134. Furthermore, the same insulating material selected from the above-described insulating materials is preferably used for the insulating layer 141 and the insulating layer 142. With this structure, bonding where a boundary between the layer 161 and the layer 162 is a bonding position can be performed.

This bonding enables an electric connection between the conductive layer 131 and the conductive layer 133 and between the conductive layer 132 and the conductive layer 134. In addition, connection between the insulating layer 141 and the insulating layer 142 with mechanical strength can be obtained.

For bonding the metal layers to each other, a surface activated bonding method in which an oxide film, a layer adsorbing impurities, and the like on the surface are removed by sputtering or the like and the cleaned and activated surfaces are brought into contact to be bonded to each other can be used. Alternatively, a diffusion bonding method in which the surfaces of the metal layers are bonded to each other by using temperature and pressure together can be used, for example. Both methods cause bonding at an atomic level, and therefore not only electrically but also mechanically excellent bonding can be obtained.

Furthermore, for bonding the insulating layers to each other, a hydrophilic bonding method or the like can be used; in the method, after high planarity is obtained by polishing or the like, the surfaces of the insulating layers subject to hydrophilicity treatment with oxygen plasma or the like are arranged in contact with and bonded to each other temporarily, and then dehydrated by heat treatment to perform final bonding. The hydrophilic bonding method can also cause bonding at an atomic level; thus, mechanically excellent bonding can be obtained.

When the layer 161 and the layer 162 are bonded to each other, the insulating layers and the metal layers coexist on their bonding surfaces; therefore, the surface activated bonding method and the hydrophilic bonding method are performed in combination, for example.

For example, the following method can be used: the surfaces are made clean after polishing, the surfaces of the metal layers are subject to antioxidant treatment and hydrophilicity treatment, and then bonding is performed. Furthermore, hydrophilicity treatment may be performed on the surfaces of the metal layers being hardly oxidizable metal such as Au. Note that a bonding method other than the above-mentioned methods may be used.

Figure 10B:
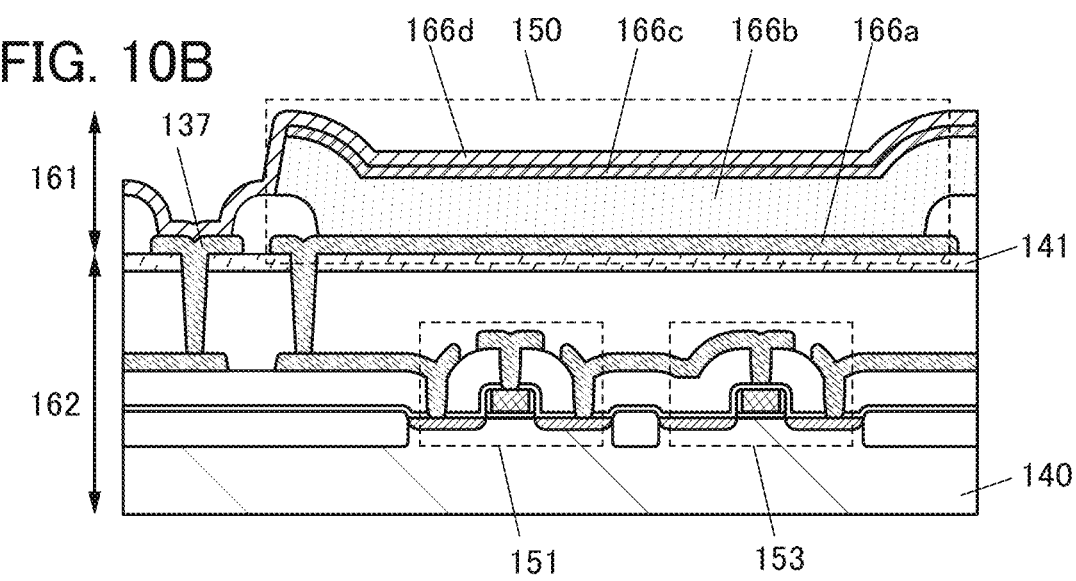

FIG. 10(B) is a cross-sectional view in the case where a pn-junction photodiode in which a selenium-based material is used for a photoelectric conversion layer is used for the layer 161 of the pixel shown in FIG. 9(A). A layer 166a is included as one electrode, layers 166b and 166c are included as a photoelectric conversion layer, and a layer 166d is included as the other electrode.

In that case, the layer 161 can be directly formed on the layer 162. The layer 166a is electrically connected to the source or the drain of the transistor 151. The layer 166d is electrically connected to the power supply line through the conductive layer 137.

Figure 11A:
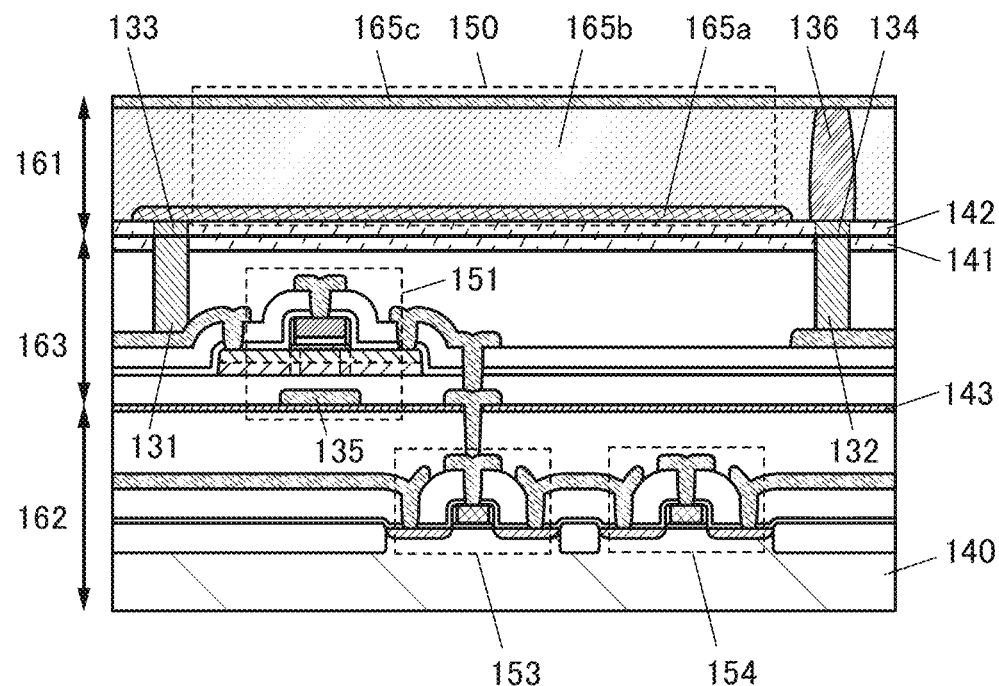
FIGS. 11A and 11B Diagrams illustrating configuration examples of a pixel of an imaging device.

FIG. 11(A) is a diagram illustrating an example of a cross section of the pixel illustrated in FIG. 9(B). The layer 161 includes a pn-junction photodiode with silicon for a photoelectric conversion layer, as the photoelectric conversion element 150. The layer 162 includes a Si transistor and the like. The layer 163 includes an OS transistor and the like. A structure example is illustrated in which electrical connection between the layer 161 and the layer 163 is obtained by bonding.

Figure 12D:
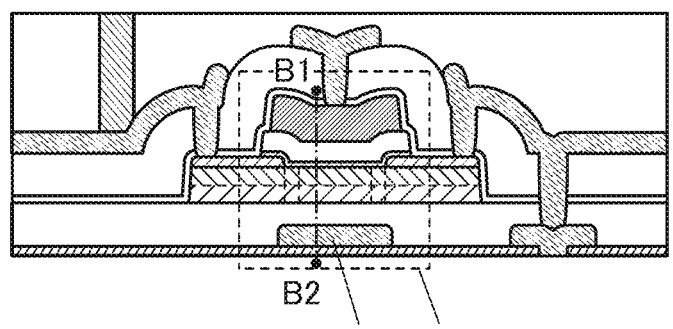

Although the OS transistors having a self-aligned structure are shown in FIG. 11(A), top-gate transistors having a non-self-aligned structure may be employed as shown in FIG. 12(D).

Figure 12E:
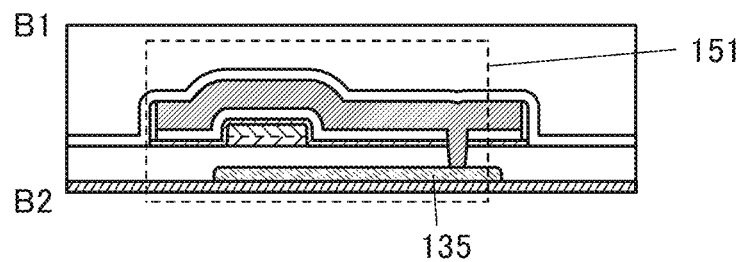

Although a structure in which the transistor 151 includes a back gate 135 is shown, a structure without a back gate may be employed. As shown in FIG. 12(E), the back gate 135 might be electrically connected to a front gate of the transistor, which is provided to face the back gate. Alternatively, different fixed potentials may be supplied to the back gate 135 and the front gate.

An insulating layer 143 that has a function of inhibiting diffusion of hydrogen is provided between a region where an OS transistor is formed and a region where a Si transistor is formed. Hydrogen in the insulating layer provided in the vicinity of the channel formation region of each of the transistor 153 and the transistor 154 terminates a dangling bond of silicon. Meanwhile, hydrogen in the insulating layer provided in the vicinity of the channel formation region of the transistor 151 is a factor of generating a carrier in the oxide semiconductor layer.

Hydrogen is confined in one layer using the insulating layer 143, whereby the reliability of the transistor 153 and the transistor 154 can be improved. Furthermore, diffusion of hydrogen from the one layer to the other layer is inhibited, so that the reliability of the transistor 151 can also be improved.

For the insulating layer 143, aluminum oxide, aluminum oxynitride, gallium oxide, gallium oxynitride, yttrium oxide, yttrium oxynitride, hafnium oxide, hafnium oxynitride, yttria-stabilized zirconia (YSZ), or the like can be used, for example.

Figure 11B:
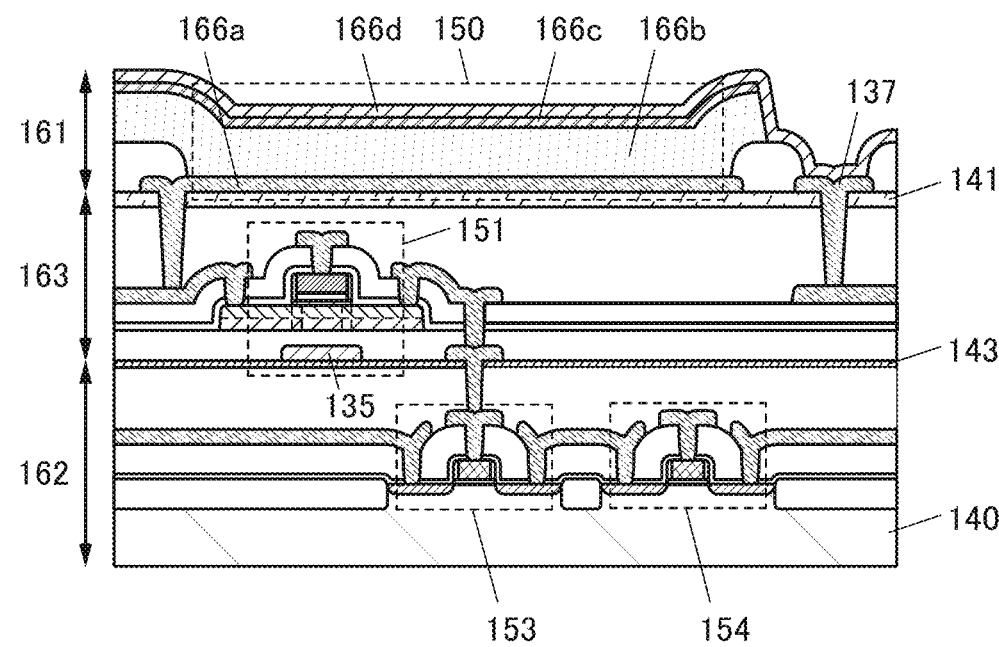

FIG. 11(B) is a cross-sectional view of the case where a pn-junction photodiode with a selenium-based material for a photoelectric conversion layer is used for the layer 161 of the pixel illustrated in FIG. 9(B). The layer 161 can be directly formed on the layer 163. The above description can be referred to for the details of the layer 161, the layer 162, and the layer 163.

[Other Components of Pixel]

Figure 13A:
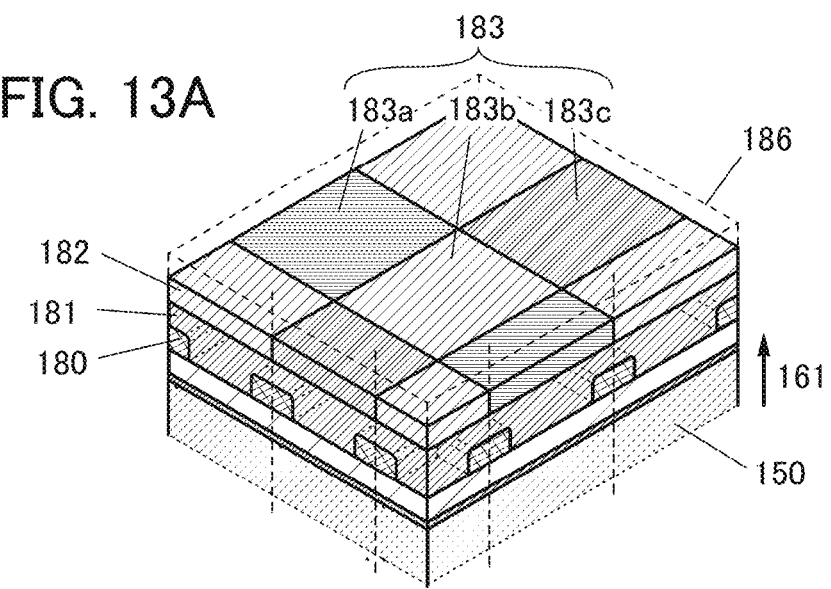
FIGS. 13A to 13C Diagrams illustrating configuration examples of a pixel of an imaging device.

FIG. 13(A) is a perspective view showing an example in which a color filter and the like are added to a pixel of the imaging device of one embodiment of the present invention. The perspective view also shows cross sections of a plurality of pixels. An insulating layer 180 is formed over the layer 161 where the photoelectric conversion element 150 is formed. As the insulating layer 180, a silicon oxide film with a high light-transmitting property with respect to visible light can be used. In addition, a silicon nitride film may be stacked as a passivation layer. A dielectric film of hafnium oxide or the like may be stacked as an anti-reflection layer.

A light-blocking layer 181 may be formed over the insulating layer 180. The light-blocking layer 181 has a function of inhibiting color mixing of light passing through the upper color filter. As the light-blocking layer 181, a metal layer of aluminum, tungsten, or the like can be used. The metal film and a dielectric film having a function of an anti-reflection layer may be stacked.

An organic resin layer 182 can be provided as a planarization film over the insulating layer 180 and the light-blocking layer 181. A color filter 183 (color filters 183a, 183b, and 183c) is formed in each pixel. Color images can be obtained, for example, when colors of R (red), G (green), B (blue), Y (yellow), C (cyan), M (magenta), and the like are assigned to the color filters 183a, 183b, and 183c.

An insulating layer 186 having a light-transmitting property with respect to visible light can be provided over the color filter 183, for example.

Figure 13B:
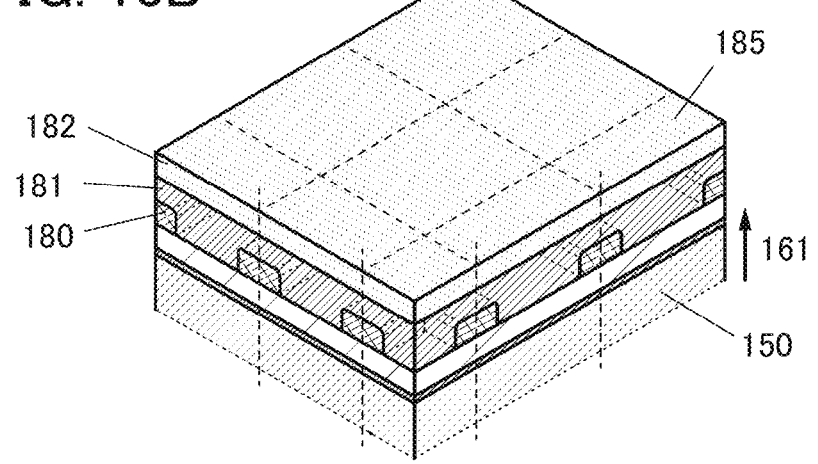

As shown in FIG. 13(B), an optical conversion layer 185 may be used instead of the color filter 183. Such a structure enables the imaging device to obtain images in various wavelength regions.

For example, when a filter that blocks light having a wavelength shorter than or equal to that of visible light is used as the optical conversion layer 185, an infrared imaging device can be obtained. When a filter that blocks light having a wavelength shorter than or equal to that of near infrared light is used as the optical conversion layer 185, a far-infrared imaging device can be obtained. When a filter that blocks light having a wavelength longer than or equal to that of visible light is used as the optical conversion layer 185, an ultraviolet imaging device can be obtained. Alternatively, a color filter for visible light and a filter for infrared rays or ultraviolet rays may be combined.

Furthermore, when a scintillator is used as the optical conversion layer 185, an imaging device that obtains an image visualizing the intensity of radiation, which is used for an X-ray imaging device or the like, can be obtained. Radiation such as X-rays passes through an object and enters the scintillator, and then is converted into light (fluorescence) such as visible light or ultraviolet light owing to a photoluminescence phenomenon. Then, the photoelectric conversion element 150 detects the light to obtain image data. Furthermore, the imaging device having this structure may be used in a radiation detector or the like.

A scintillator contains a substance that, when irradiated with radiation such as X-rays or gamma-rays, absorbs energy of the radiation to emit visible light or ultraviolet light. For example, a resin or ceramics in which $Gd_2O_2S$:Tb, $Gd_2O_2S$:Pr, $Gd_2O_2S$:Eu, $BaFCl$:Eu, NaI, CsI, $CaF_2$, $BaF_2$, $CeF_3$, LiF, LiI, ZnO, or the like is dispersed can be used.

In the photoelectric conversion element 150 containing a selenium-based material, radiation such as X-rays can be directly converted into charge; thus, a structure that does not require a scintillator can be employed.

Figure 13C:
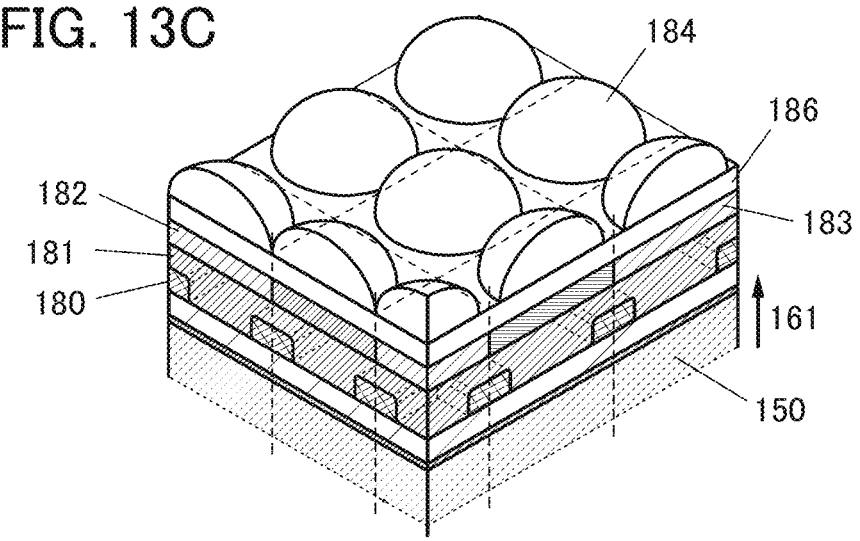

As shown in FIG. 13(C), a microlens array 184 may be provided over the color filter 183. Light penetrating lenses included in the microlens array 184 goes through the color filter 183 positioned thereunder to irradiate the photoelectric conversion element 150. The microlens array 184 may be provided over the optical conversion layer 185 shown in FIG. 13(B).

Structure Examples of Package and Module

Examples of a package and a camera module in each of which an image sensor chip is placed will be described below. For the image sensor chip, the structure of the above imaging device can be used.

FIG. 14(A1) is an external perspective view of the top surface side of a package in which an image sensor chip is placed. The package includes a package substrate 410 to which an image sensor chip 450 is fixed, a cover glass 420, an adhesive 430 for bonding them, and the like.

FIG. 14(A2) is an external perspective view of the bottom surface side of the package. A BGA (Ball grid array) in which solder balls are used as bumps 440 on the bottom surface of the package is employed. Note that, without being limited to the BGA, an LGA (Land grid array), a PGA (Pin Grid Array), or the like may be employed.

FIG. 14(A3) is a perspective view of the package, in which parts of the cover glass 420 and the adhesive 430 are not illustrated. Electrode pads 460 are formed over the package substrate 410, and the electrode pads 460 and the bumps 440 are electrically connected to each other via through-holes. The electrode pads 460 are electrically connected to the image sensor chip 450 through wires 470.

FIG. 14(B1) is an external perspective view of the top surface side of a camera module in which an image sensor chip is placed in a package with a built-in lens. The camera module includes a package substrate 411 to which an image sensor chip 451 is fixed, a lens cover 421, a lens 435, and the like. Furthermore, an IC chip 490 having a function of a driver circuit, a signal conversion circuit, or the like of an imaging device is provided between the package substrate 411 and the image sensor chip 451; thus, the structure as an SiP (System in package) is formed.

FIG. 14(B2) is an external perspective view of the bottom surface side of the camera module. A QFN (Quad flat no-lead package) structure in which lands 441 for mounting are provided on the bottom surface and side surfaces of the package substrate 411 is employed. Note that this structure is only an example, and a QFP (Quad flat package) or the above-mentioned BGA may also be provided.

FIG. 14(B3) is a perspective view of the module, in which parts of the lens cover 421 and the lens 435 are not illustrated. The lands 441 are electrically connected to electrode pads 461, and the electrode pads 461 are electrically connected to the image sensor chip 451 or the IC chip 490 through wires 471.

The image sensor chip placed in a package having the above form can be easily mounted on a printed substrate or the like, and the image sensor chip can be incorporated into a variety of semiconductor devices and electronic devices.

<Configuration Example of Display Device>

Next, a configuration example of the display device 40 will be described with reference to FIG. 15 to FIG. 17.

[Configuration Example of Pixel Circuit]

Figure 15A:
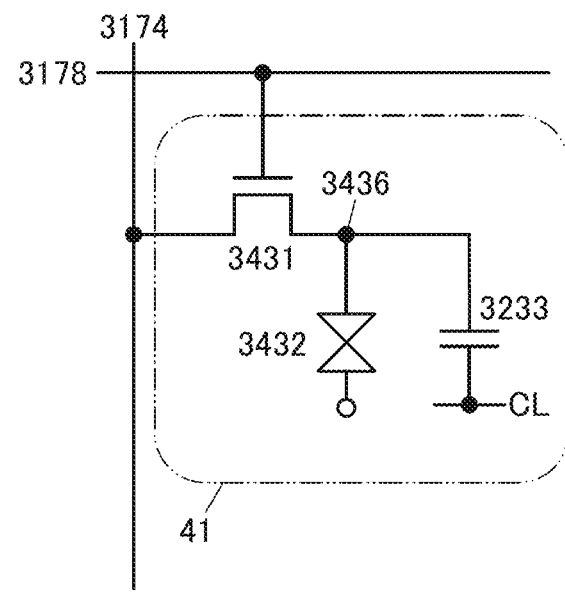
FIGS. 15A and 15B Circuit diagrams illustrating configuration examples of a display device.

FIG. 15(A) is a diagram illustrating an example of a circuit configuration of the pixel 41. In other words, FIG. 15(A) is a diagram illustrating an example of a configuration of a pixel circuit included in the display device 40. The pixel 41 with a configuration illustrated in FIG. 15(A) includes a transistor 3431, a capacitor 3233, and a liquid crystal element 3432.

One of a source and a drain of the transistor 3431 is electrically connected to the wiring 3174. A gate of the transistor 3431 is electrically connected to the wiring 3178.

One electrode of the capacitor 3233 is electrically connected to a capacitor line CL. The other electrode of the capacitor 3233 is electrically connected to the other of the source and the drain of the transistor 3431. A constant potential can be applied to the capacitor line CL, for example.

A common potential is applied to one electrode of the liquid crystal element 3432. The other electrode of the liquid crystal element 3432 is electrically connected to the other of the source and the drain of the transistor 3431.

Note that a node to which the other of the source and the drain of the transistor 3431, the other electrode of the capacitor 3233, and the other electrode of the liquid crystal element 3432 are electrically connected is referred to as a node 3436.

The transistor 3431 has a function of controlling the writing of a data signal to the node 3436. The capacitor 3233 has a function of retaining data written to the node 3436. The alignment state of liquid crystals included in the liquid crystal element 3432 is determined by the potential written to the node 3436.

Here, as a mode for the liquid crystal element 3432, for example, a TN mode, an STN mode, a VA mode, an ASM (Axially Symmetric Aligned Micro-cell) mode, an OCB (Optically Compensated Birefringence) mode, an FLC (Ferroelectric Liquid Crystal) mode, an AFLC (AntiFerroelectric Liquid Crystal) mode, an MVA mode, a PVA (Patterned Vertical Alignment) mode, an IPS mode, an FFS mode, a TBA (Transverse Bend Alignment) mode, or the like may be used. Other examples include an ECB (Electrically Controlled Birefringence) mode, a PDLC (Polymer Dispersed Liquid Crystal) mode, a PNLC (Polymer Network Liquid Crystal) mode, a guest-host mode, and the like. However, the mode is not limited thereto, and a variety of modes can be used.

Figure 15B:
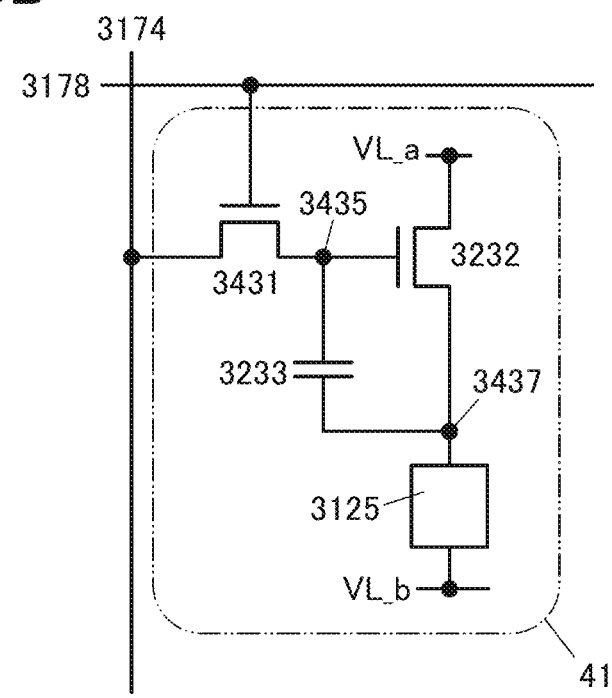

FIG. 15(B) is a diagram illustrating an example of a circuit configuration of the pixel 41 which is different from the pixel circuit illustrated in FIG. 15(A). The pixel 41 with a configuration illustrated in FIG. 15(B) includes the transistor 3431, a transistor 3232, the capacitor 3233, and a light-emitting element 3125.

One of the source and the drain of the transistor 3431 is electrically connected to the wiring 3174. The other of the source and the drain of the transistor 3431 is electrically connected to the one electrode of the capacitor 3233 and a gate of the transistor 3232. The gate of the transistor 3431 is electrically connected to the wiring 3178.

One of the source and the drain of the transistor 3232 is electrically connected to a wiring VL_a.

One electrode of the light-emitting element 3125 is electrically connected to a wiring VL_b. The other electrode of the light-emitting element 3125 is electrically connected to the other of the source and the drain of the transistor 3232 and the other electrode of the capacitor 3233.

The wiring VL_a can serve as a high potential power supply line. The wiring VL_b can serve as a low potential power supply line. Note that the wiring VL_b may serve as a high potential power supply line and the wiring VL_a may serve as a low potential power supply line.

Note that a node to which the other of the source and the drain of the transistor 3431, the gate of the transistor 3232, and the one electrode of the capacitor 3233 are connected is referred to as a node 3435. A node to which the other of the source and the drain of the transistor 3232, the other electrode of the capacitor 3233, and the other electrode of the light-emitting element 3125 are connected is referred to as a node 3437.

The transistor 3431 has a function of controlling the writing of the data signal to the node 3435. The transistor 3232 has a function of controlling current flowing through the light-emitting element 3125. The capacitor 3233 has a function of a storage capacitor that retains data written to the node 3435.

As the light-emitting element 3125, an organic EL element or the like can be used, for example. However, the light-emitting element 3125 is not limited thereto, and an inorganic EL element formed of an inorganic material may be used, for example.

Pixel Configuration Example

Figure 17A:
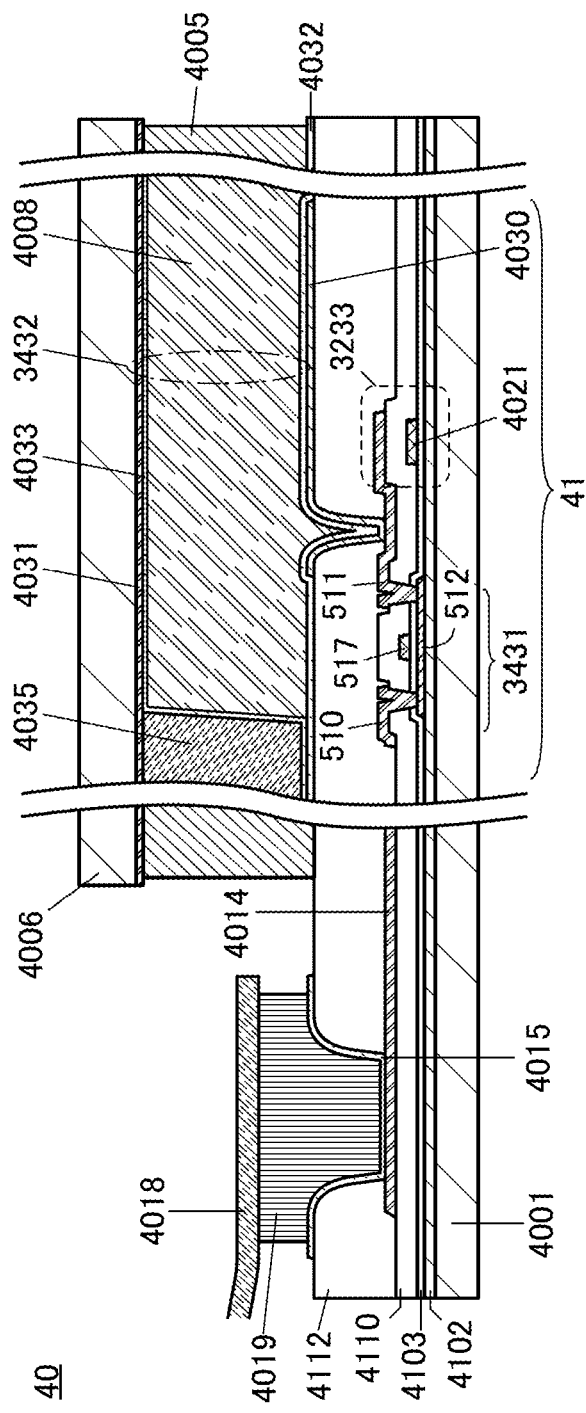
FIGS. 17A and 17B Diagrams illustrating configuration examples of a display device.
Figure 17B:
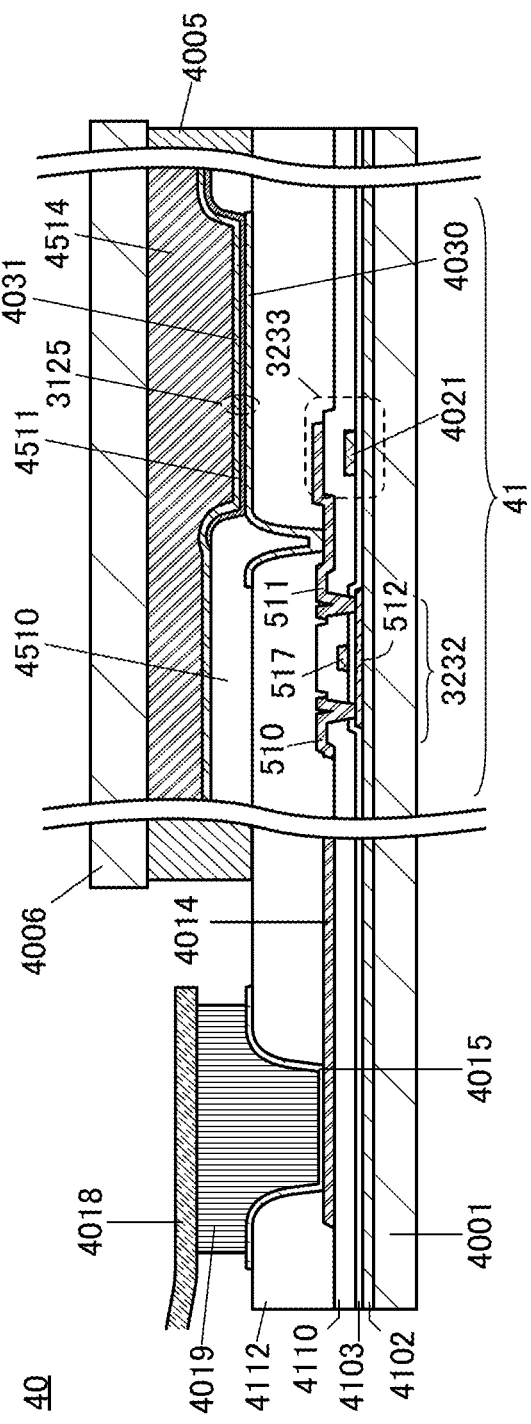

FIG. 16(A) and FIG. 17(A) illustrate structural examples of the pixel 41 including the pixel circuit illustrated in FIG. 15(A). FIG. 16(B) and FIG. 17(B) illustrate structural examples of the pixel 41 including the pixel circuit illustrated in FIG. 15(B).

The display device 40 illustrated in FIGS. 16(A) and 16(B) includes a conductive layer 4015, and the conductive layer 4015 is electrically connected to a terminal included in an FPC 4018 through an anisotropic conductive layer 4019. The conductive layer 4015 is electrically connected to a wiring 4014 in an opening formed in an insulating layer 4112, an insulating layer 4111, and an insulating layer 4110. The conductive layer 4015 is formed using the same conductive layer as a conductive layer 4030.

The pixel 41 provided over a first substrate 4001 includes a transistor; FIG. 16(A) exemplifies the transistor 3431 included in the pixel 41 and FIG. 16(B) exemplifies the transistor 3232 included in the pixel 41. As the substrate 4001, a silicon substrate can be used, for example.

The transistors 3431 and 3232 are provided over an insulating layer 4102. The transistors 3431 and 3232 each include a conductive layer 517 formed over the insulating layer 4102, and an insulating layer 4103 is formed over the conductive layer 517. A semiconductor layer 512 is formed over the insulating layer 4103. A conductive layer 510 and a conductive layer 511 are formed over the semiconductor layer 512, the insulating layer 4110 and the insulating layer 4111 are formed over the conductive layer 510 and the conductive layer 511, and a conductive layer 516 is formed over the insulating layer 4110 and the insulating layer 4111. The conductive layer 510 and the conductive layer 511 are formed using the same conductive layer as the wiring 4014.

In the transistors 3431 and 3232, the conductive layer 517 has a function of a gate, the conductive layer 510 has a function of one of a source and a drain, the conductive layer 511 has a function of the other of the source and the drain, and the conductive layer 516 has a function of a back gate.

Since the transistors 3431 and 3232 each have a bottom gate structure and include a back gate, the on-state current of the transistors can be increased. Moreover, the threshold voltage of the transistors can be controlled. Note that the conductive layer 516 may be omitted in some cases to simplify the manufacturing process.

In the transistors 3431 and 3232, the semiconductor layer 512 has a function of a channel formation region. For the semiconductor layer 512, crystalline silicon, polycrystalline silicon, amorphous silicon, a metal oxide, an organic semiconductor, or the like is used. In addition, if necessary, impurities may be introduced to the semiconductor layer 512 to increase the conductivity of the semiconductor layer 512 or control the threshold voltage of the transistors.

In the case where a metal oxide is used for the semiconductor layer 512, the semiconductor layer 512 preferably contains indium (In). When a metal oxide containing indium is used for the semiconductor layer 512, the carrier mobility (electron mobility) of the semiconductor layer 512 becomes high. The semiconductor layer 512 is preferably a metal oxide containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a plurality of the above-described elements may be used in combination as the element M in some cases. The element M is an element having high bonding energy with oxygen, for example. For example, the element M is an element whose bonding energy with oxygen is higher than that of indium. The semiconductor layer 512 is preferably a metal oxide containing zinc (Zn). The metal oxide containing zinc is easily crystallized in some cases.

The semiconductor layer 512 is not limited to the metal oxide containing indium. The semiconductor layer 512 may be a metal oxide that does not contain indium and contains zinc, a metal oxide that contains gallium, or a metal oxide that contains tin; for example, a zinc tin oxide or a gallium tin oxide.

Alternatively, in the case where a material including silicon, such as crystalline silicon, polycrystalline silicon, or amorphous silicon, is used for the semiconductor layer 512, the conductivity of the semiconductor layer 512 can be increased. Thus, the on-state current of the transistor 3431 and the transistor 3232 can be increased, so that the operation speed of the pixel 41 can be increased.

The display device 40 illustrated in FIGS. 16(A) and 16(B) includes the capacitor 3233. The capacitor 3233 has a region where the conductive layer 511 overlaps with a conductive layer 4021 with the insulating layer 4103 positioned therebetween. The conductive layer 4021 is formed using the same conductive layer as the conductive layer 517.

FIG. 16(A) illustrates an example of a liquid crystal display device using a liquid crystal element as a display element. In FIG. 16(A), the liquid crystal element 3432 that is a display element includes the conductive layer 4030, a conductive layer 4031, and a liquid crystal layer 4008. An insulating layer 4032 and an insulating layer 4033 which function as alignment films are provided such that the liquid crystal layer 4008 is interposed therebetween. The conductive layer 4031 is provided on a substrate 4006 side, and the conductive layer 4030 and the conductive layer 4031 overlap with each other with the liquid crystal layer 4008 positioned therebetween. Note that a silicon substrate, for example, can be used as the substrate 4006, like the substrate 4001.

A spacer 4035 is a columnar spacer obtained by selective etching of an insulating layer and is provided to adjust a distance (a cell gap) between the conductive layer 4030 and the conductive layer 4031. Note that a spherical spacer can also be used.

In the case where a liquid crystal element is used as a display element, a thermotropic liquid crystal, a low-molecular liquid crystal, a high-molecular liquid crystal, a polymer-dispersed liquid crystal, a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

The specific resistance of a liquid crystal material is greater than or equal to $1 \times 10^9$ $\Omega \cdot cm$, preferably greater than or equal to $1 \times 10^{11}$ $\Omega \cdot cm$, more preferably greater than or equal to $1 \times 10^{12}$ $\Omega \cdot cm$. Note that a value of the specific resistivity in this specification and the like is a value measured at 20° C.

In the case where an OS transistor is used as the transistor 3431, the transistor 3431 can have a low off-state current. Accordingly, the retention time of an electrical signal such as an image signal can be made long, and a writing interval can be set long in an on state. Therefore, the frequency of refresh operations can be reduced, resulting in an effect of reducing power consumption.

In the display device, a black matrix (a light-blocking layer), an optical member (an optical substrate) such as a polarizing member, a retardation member, or an anti-reflection member, and the like may be provided as appropriate. For example, circular polarization may be employed by using a polarizing substrate and a retardation substrate. In addition, a backlight, a side light, or the like may be used as a light source.

FIG. 16(B) illustrates an example of a display device using a light-emitting element such as an EL element as a display element. EL elements are classified into organic EL elements and inorganic EL elements.

In an organic EL element, by voltage application, electrons are injected from one electrode and holes are injected from the other electrode to an EL layer. Note that the one electrode is one of the conductive layer 4030 and the conductive layer 4031, and the other electrode is the other of the conductive layer 4030 and the conductive layer 4031. The carriers (electrons and holes) are recombined, a light-emitting organic compound forms an excited state, and light is emitted when the excited state returns to a ground state. Owing to such a mechanism, this light-emitting element is referred to as a current-excitation light-emitting element. Besides the light-emitting compound, the EL layer may also include a substance with a high hole-injection property, a substance with a high hole-transport property, a hole-blocking material, a substance with a high electron-transport property, a substance with a high electron-injection property, a substance with a bipolar property (a substance with a high electron-transport property and a high hole-transport property), and the like. The EL layer can be formed by a method such as an evaporation method (including a vacuum evaporation method), a transfer method, a printing method, an inkjet method, or a coating method.

The inorganic EL elements are classified according to their element structures into a dispersion-type inorganic EL element and a thin-film inorganic EL element. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure in which a light-emitting layer is interposed between dielectric layers, which are further interposed between electrodes, and its light emission mechanism is localized type light emission that utilizes inner-shell electron transition of metal ions.

FIG. 16(B) illustrates an example in which an organic EL element is used as the light-emitting element 3125.

In FIG. 16(B), the light-emitting element 3125 is electrically connected to the transistor 3232 provided in the pixel 41. The structure of the light-emitting element 3125 is a stacked-layer structure of the conductive layer 4030, a light-emitting layer 4511, and the conductive layer 4031; but the structure is not limited thereto. The structure of the light-emitting element 3125 can be changed as appropriate in accordance with the direction in which light is extracted from the light-emitting element 3125.

A partition wall 4510 is formed using an organic insulating material or an inorganic insulating material. It is particularly preferable that, using a photosensitive resin material, an opening portion be formed over the conductive layer 4030 so that a side surface of the opening portion is formed to be an inclined surface having continuous curvature.

The light-emitting layer 4511 may be formed using a single layer or a plurality of layers stacked.

A protective layer may be formed over the conductive layer 4031 and the partition wall 4510 in order to prevent entry of oxygen, hydrogen, moisture, carbon dioxide, and the like into the light-emitting element 3125. For the protective layer, silicon nitride, silicon nitride oxide, aluminum oxide, aluminum nitride, aluminum oxynitride, aluminum nitride oxide, DLC (Diamond Like Carbon), or the like can be used. In a space that is sealed by the substrate 4001, the substrate 4006, and a sealant 4005, a filler 4514 is provided for sealing. In this manner, it is preferable that packaging (sealing) be performed with a protective film (such as a laminate film or an ultraviolet curable resin film) or a cover material with high air-tightness and little degasification to prevent exposure to outside air.

As the filler 4514, besides an inert gas such as nitrogen or argon, an ultraviolet curable resin or a thermosetting resin can be used; and PVC (polyvinyl chloride), an acrylic resin, polyimide, an epoxy resin, a silicone resin, PVB (polyvinyl butyral), EVA (ethylene vinyl acetate), or the like can be used. In addition, a drying agent may be contained in the filler 4514.

For the sealant 4005, a glass material such as a glass frit or a curable resin that is cured at room temperature such as a two-component-mixture-type resin, a light curable resin, or a thermosetting resin can be used. In addition, a drying agent may be contained in the sealant 4005.

In addition, if necessary, an optical film such as a polarizing plate, a circularly polarizing plate (including an elliptically polarizing plate), a retardation plate (λ/4 plate or λ/2 wave plate), or a color filter may be provided as appropriate on a light-emitting surface of the light-emitting element. Furthermore, the polarizing plate or the circularly polarizing plate may be provided with an anti-reflection film. For example, anti-glare treatment that can reduce glare by diffusing reflected light with projections and depressions on a surface can be performed.

When the light-emitting element has a microcavity structure, light with high color purity can be extracted. Furthermore, when a microcavity structure and a color filter are used in combination, glare can be reduced and visibility of a displayed image can be increased.

For the conductive layer 4030 and the conductive layer 4031, a light-transmitting conductive material such as an indium oxide containing tungsten oxide, an indium zinc oxide containing tungsten oxide, an indium oxide containing titanium oxide, an indium tin oxide, an indium tin oxide containing titanium oxide, an indium zinc oxide, or an indium tin oxide to which silicon oxide is added can be used.

The conductive layer 4030 and the conductive layer 4031 can be formed using one or more kinds of metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The conductive layer 4030 and the conductive layer 4031 can be formed using a conductive composition including a conductive high molecule (also referred to as a conductive polymer). As the conductive high molecule, a so-called π-electron conjugated conductive high molecule can be used. For example, polyaniline or a derivative thereof, polypyrrole or a derivative thereof, polythiophene or a derivative thereof, a copolymer of two or more kinds of aniline, pyrrole, and thiophene or a derivative thereof, and the like can be given.

In order to extract light from the light-emitting element 3125 to the outside, at least one of the conductive layer 4030 and the conductive layer 4031 is transparent. In accordance with the method to extract light, the structures of the display devices are classified into a top emission structure, a bottom emission structure, and a dual emission structure. In the top emission structure, light is extracted through the substrate 4006. In the bottom emission structure, light is extracted through the substrate 4001. In the dual emission structure, light is extracted through both the substrate 4006 and the substrate 4001. For example, in the case of the top emission structure, the conductive layer 4031 is transparent. For example, in the case of the bottom emission structure, the conductive layer 4030 is transparent. For example, in the case of the dual emission structure, the conductive layer 4030 and the conductive layer 4031 are transparent.

FIG. 17(A) illustrates a cross-sectional view of the case where a top-gate transistor is provided as the transistor 3431 illustrated in FIG. 16(A). Similarly, FIG. 17(B) illustrates a cross-sectional view of the case where a top-gate transistor is provided as the transistor 3232 illustrated in FIG. 16(B).

In each of the transistors 3431 and 3232 in FIGS. 17(A) and 17(B), the conductive layer 517 has a function of a gate, the conductive layer 510 has a function of one of a source and a drain, and the conductive layer 511 has a function of the other of the source and the drain.

<Configuration Example of Memory Circuit>

Figure 18:
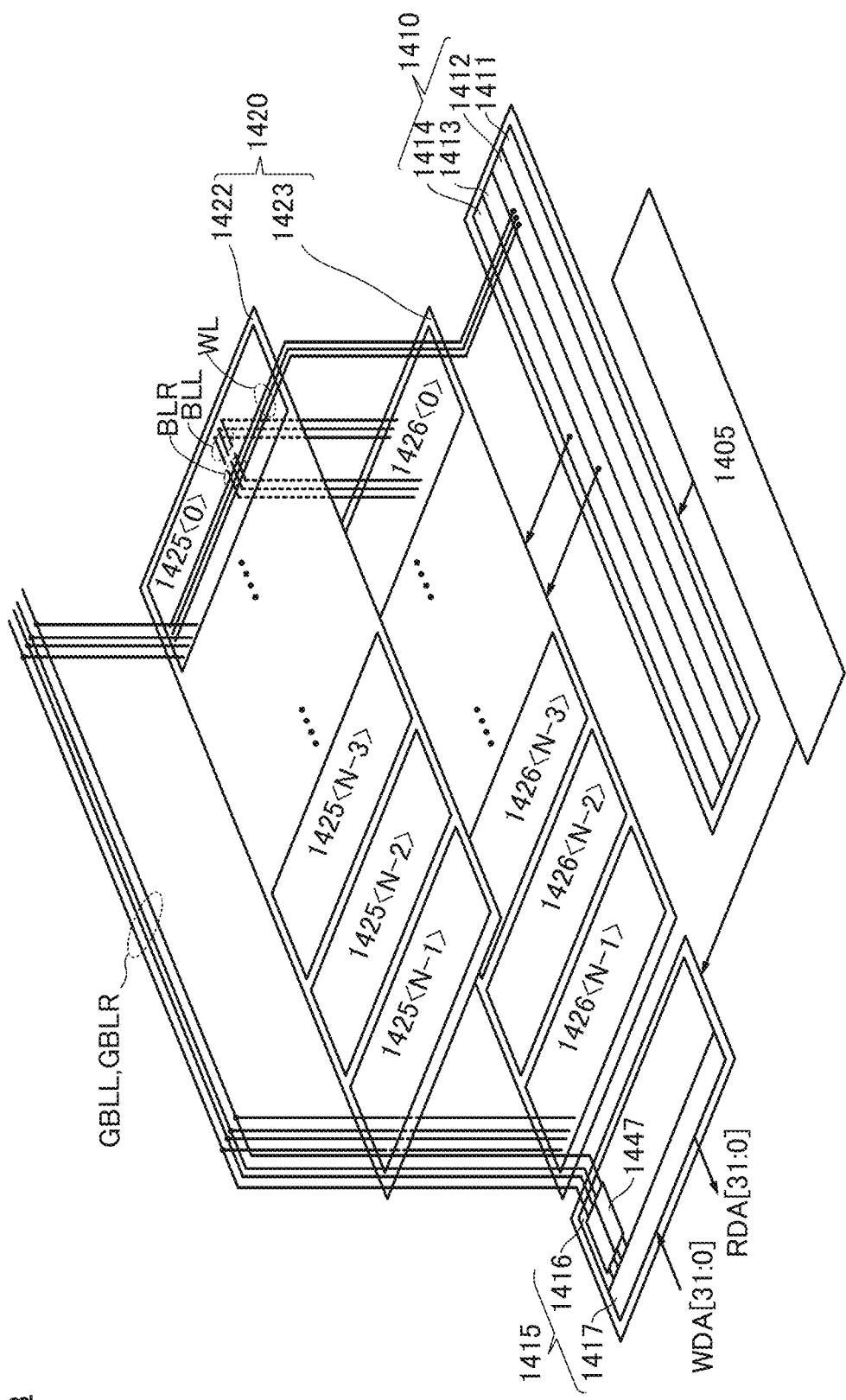
FIG. 18 A block diagram illustrating a configuration example of a memory circuit.

Next, an example of a detailed configuration of the memory circuit 33 illustrated in FIG. 5 will be described with reference to FIG. 18 and FIG. 19. FIG. 18 is a block diagram showing a configuration example of the memory circuit 33. As illustrated in FIG. 18, the memory circuit 33 includes a controller 1405, a row circuit 1410, a column circuit 1415, and a memory cell and sense amplifier array 1420 (hereinafter referred to as an "MC-SA array 1420").

The row circuit 1410 includes a decoder 1411, a word line driver circuit 1412, a column selector 1413, and a sense amplifier driver circuit 1414. The column circuit 1415 includes a global sense amplifier array 1416 and an input/output circuit 1417. The global sense amplifier array 1416 includes a plurality of global sense amplifiers 1447. The MC-SA array 1420 includes a memory cell array 1422, a sense amplifier array 1423, and global bit lines GBLL and GBLR.

[MC-SA array 1420]

The MC-SA array 1420 has a stacked-layer structure where the memory cell array 1422 is stacked over the sense amplifier array 1423. The global bit lines GBLL and GBLR are stacked over the memory cell array 1422. The memory circuit 33 adopts, as the bit-line structure, a hierarchical bit line structure hierarchized with local bit lines and global bit lines.

Figure 19A:
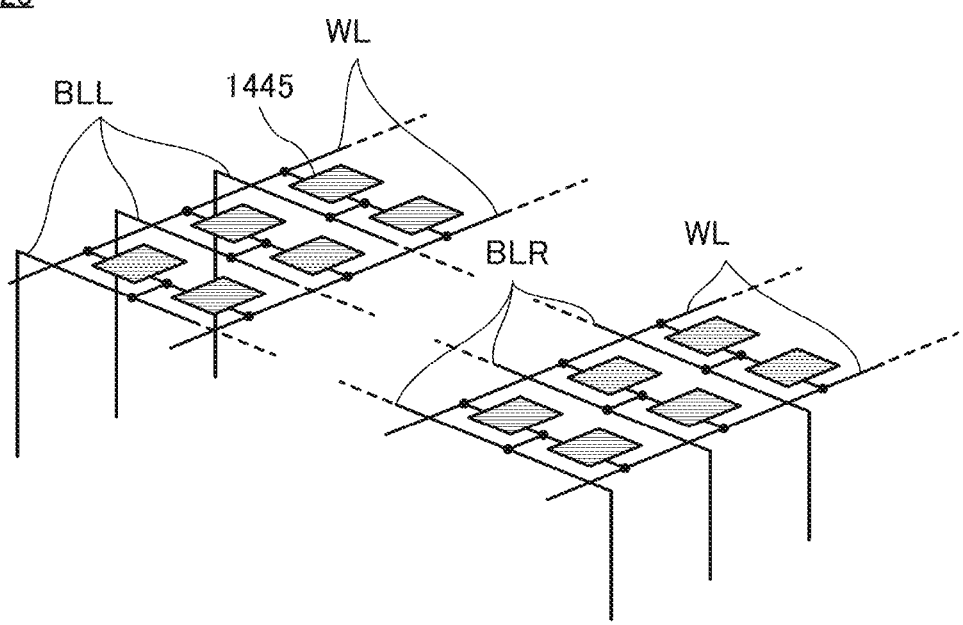
FIGS. 19A and 19B Diagrams illustrating configuration examples of a memory circuit.

The memory cell array 1422 includes N local memory cell arrays 1425<0> to 1425<N−1> (N is an integer greater than or equal to 2). The memory cell array 1423 includes N local memory cell arrays 1426<0> to 1426<N−1>. FIG. 19(A) illustrates a configuration example of the local memory cell array 1425. The local memory cell array 1425 includes a plurality of memory cells 1445, a plurality of word lines WL, and a plurality of bit lines BLL and a plurality of bit lines BLR. In the example in FIG. 19(A), the local memory cell array 1425 has an open bit-line architecture but may have a folded bit-line architecture.

Figure 19B:
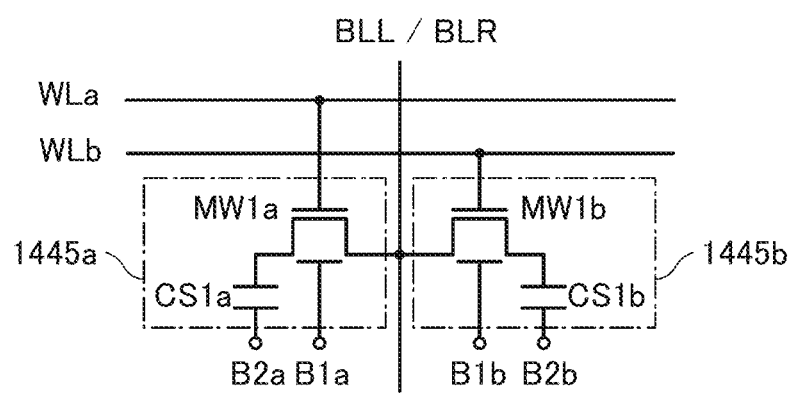

FIG. 19(B) illustrates a circuit configuration example of a pair of a memory cell 1445a and a memory cell 1445b connected to the same bit line BLL (BLR). The memory cell 1445a includes a transistor MW1a, a capacitor CS1a, a terminal B1a, and a terminal B2a, and is connected to a word line WLa and the bit line BLL (BLR). The memory cell 1445b includes a transistor MW1b, a capacitor CS1b, a terminal B1b, and a terminal B2b, and is connected to a word line WLb and the bit line BLL (BLR). Hereinafter, in the case where the description is not limited to the memory cell 1445a or the memory cell 1445b, the memory cell 1445 and its components are described without using the letter "a" or "b", in some cases.

The transistor MW1a has a function of controlling charge and discharge of the capacitor CS1a, and the transistor MW has a function of controlling charge and discharge of the capacitor CS1b. A gate of the transistor MW1a is electrically connected to the word line WLa, one of a source and a drain thereof is electrically connected to the bit line BLL (BLR), and the other of the source and the drain thereof is electrically connected to one electrode of the capacitor CS1a. A gate of the transistor MW1b is electrically connected to the word line WLb, one of a source and a drain thereof is electrically connected to the bit line BLL (BLR), and the other of the source and the drain thereof is electrically connected to one electrode of the capacitor CS1b. In this manner, the bit line BLL (BLR) is used in common between one of the source and the drain of the transistor MW and one of the source and the drain of the transistor MW1b.

The transistor MW1 has a function of controlling charge and discharge of the capacitor CS1. The other electrode of the capacitor CS1 is electrically connected to the terminal B2. A constant potential (e.g., a low power supply potential) is input to the terminal B2.

OS transistors are preferably used as the transistor MW1a and the transistor MW1b. As described above, OS transistors have a low off-state current. Thus, electric charges can be held in the capacitor CS1a and capacitor CS1b for a long time, so that the frequency of refresh operation can be reduced. In this way, the power consumption of the display system 10 can be reduced. Note that as the transistor MW1a and the transistor MW1b, transistors other than OS transistors, for example, Si transistors or the like may be used.

The transistor MW1 includes a back gate, and the back gate is electrically connected to the terminal B1. This makes it possible to change the threshold voltage of the transistor MW1 with a potential of the terminal B1. For example, the voltage of the terminal B1 may be a fixed potential (e.g., a negative constant potential); alternatively, the potential of the terminal B1 may be changed in response to the operation of the memory circuit 33.

A back gate of the transistor MW1 may be electrically connected to the gate, the source, or the drain of the transistor MW1. Alternatively, the back gate is not necessarily provided in the transistor MW1.

This embodiment can be combined with the description of the other embodiments as appropriate.

(Embodiment 2)

In this embodiment, a configuration example of the semiconductor device described in the above embodiment, which can be used in a neural network, will be described.

Figure 20A:
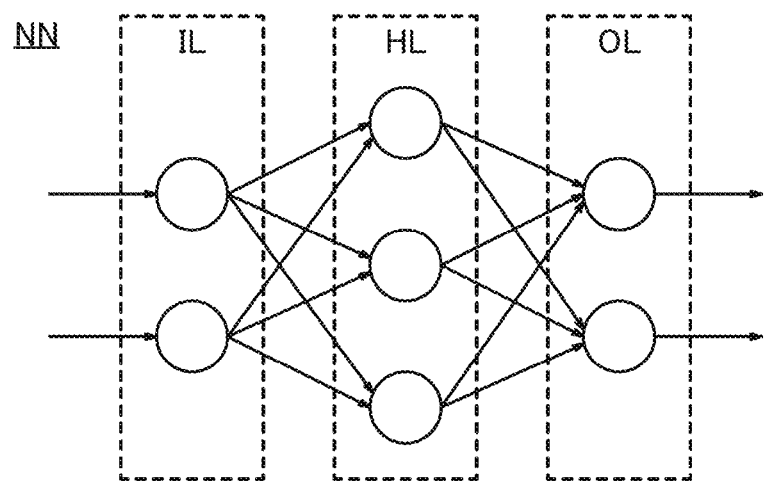
FIGS. 20A and 20B Diagrams illustrating structure examples of a neural network.

As shown in FIG. 20(A), a neural network NN can be formed of an input layer IL, an output layer OL, and a middle layer (hidden layer) HL. The input layer IL, the output layer OL, and the middle layer HL each include one or more neurons (units). Note that the middle layer HL may be composed of one layer or two or more layers. A neural network including two or more middle layers HL can also be referred to as DNN (a deep neural network), and learning using a deep neural network can also be referred to as deep learning.

Input data are input to neurons of the input layer IL, output signals of neurons in the previous layer or the subsequent layer are input to neurons of the middle layer HL, and output signals of neurons in the previous layer are input to neurons of the output layer OL. Note that each neuron may be connected to all the neurons in the previous and subsequent layers (full connection), or may be connected to some of the neurons.

Figure 20B:
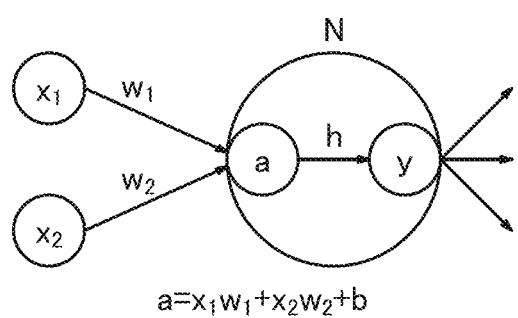

FIG. 20(B) shows an example of an operation with the neurons. Here, a neuron N and two neurons in the previous layer which output signals to the neuron N are shown. An output $x_1$ of a neuron in the previous layer and an output $x_2$ of a neuron in the previous layer are input to the neuron N. Then, in the neuron N, a total sum $x_1w_1+x_2w_2$ of a multiplication result ($x_1w_1$) of the output $x_1$ and a weight $w_1$ and a multiplication result ($x_2w_2$) of the output $x_2$ and a weight $w_2$ is calculated, and then a bias b is added as necessary, so that the value $a=x_1w_1+x_2w_2+b$ is obtained. Then, the value a is converted with an activation function h, and an output signal $y=h(a)$ is output from the neuron N.

In this manner, the operation with the neurons includes the operation that sums the products of the outputs and the weights of the neurons in the previous layer, that is, the product-sum operation ($x_1w_1+x_2w_2$ described above). This product-sum operation may be performed using a program on software or using hardware. In the case where the product-sum operation is performed by hardware, a product-sum arithmetic circuit can be used. Either a digital circuit or an analog circuit can be used as this product-sum arithmetic circuit. In the case where an analog circuit is used as the product-sum arithmetic circuit, the circuit scale of the product-sum arithmetic circuit can be reduced, or higher processing speed and lower power consumption can be achieved by reduced frequency of access to a memory.

The product-sum arithmetic circuit may be formed using a Si transistor or an OS transistor. An OS transistor is particularly preferably used as a transistor included in a memory of the product-sum arithmetic circuit because of its extremely low off-state current. Note that the product-sum arithmetic circuit may include both a Si transistor and an OS transistor. A configuration example of a semiconductor device serving as the product-sum arithmetic circuit will be described below.

<Configuration Example of Semiconductor Device>

Figure 21:
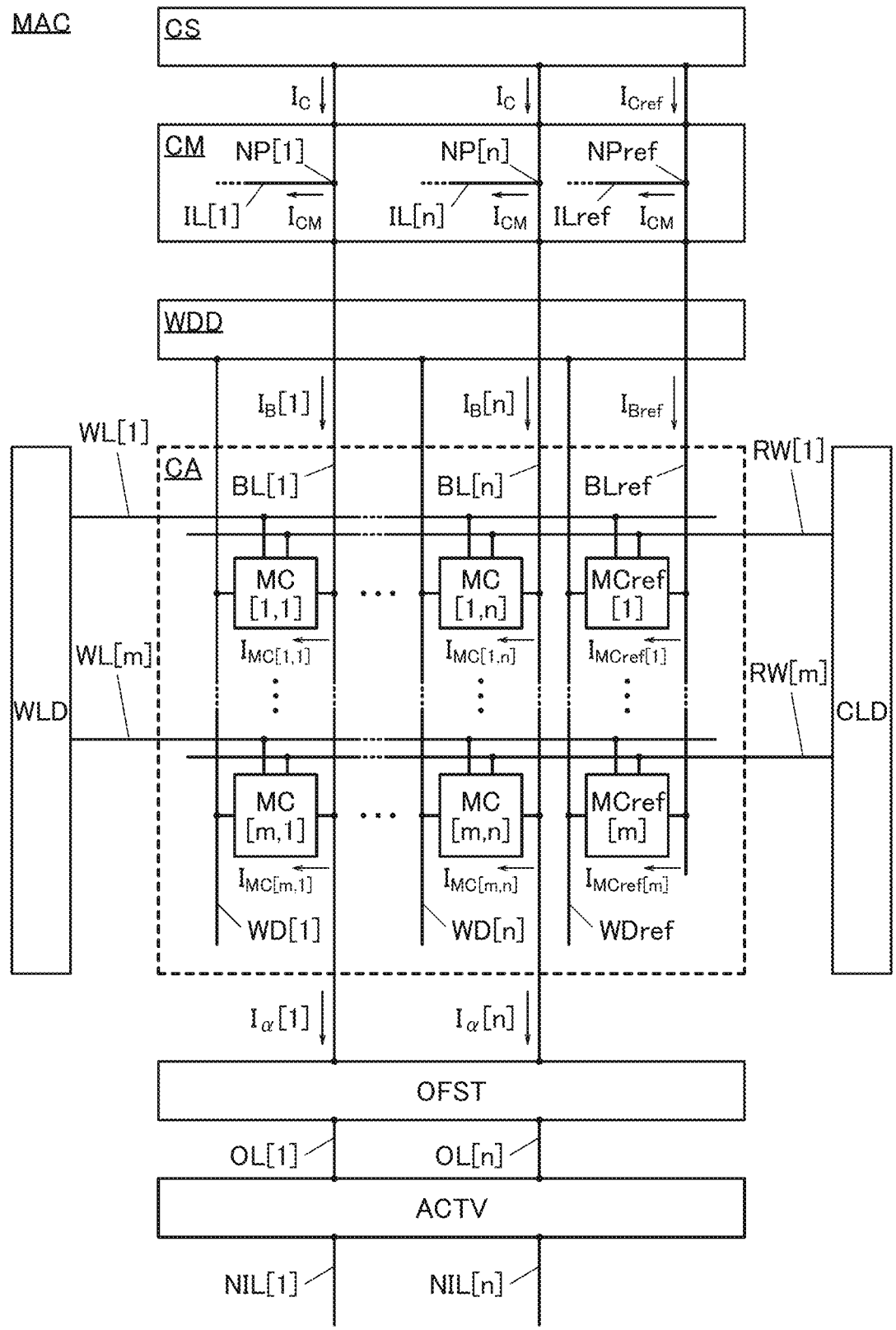
FIG. 21 A diagram illustrating a configuration example of a semiconductor device.

FIG. 21 illustrates a configuration example of a semiconductor device MAC configured to perform an operation of a neural network. The semiconductor device MAC is configured to perform a product-sum operation of first data corresponding to the connection strength (weight) between the neurons and second data corresponding to input data. Note that the first data and the second data can each be analog data or multilevel digital data (discrete data). The semiconductor device MAC is also configured to convert data obtained by the product-sum operation with the activation function.

The semiconductor device MAC includes a cell array CA, a current source circuit CS, a current mirror circuit CM, a circuit WDD, a circuit WLD, a circuit CLD, an offset circuit OFST, and an activation function circuit ACTV.

The cell array CA includes a plurality of memory cells MC and a plurality of memory cells MCref. In the configuration example shown in FIG. 21, the cell array CA includes the memory cells MC in m rows and n columns (memory cells MC[1, 1] to MC[m, n]) and the m memory cells MCref (memory cells MCref[1] to MCref[m]) (m and n are integers greater than or equal to 1). The memory cells MC are configured to store the first data. In addition, the memory cells MCref are configured to store reference data used for the product-sum operation. Note that the reference data can be analog data or multilevel digital data.

The memory cell MC [i,j] is connected to a wiring WL[i], a wiring RW[i], a wiring WD[j], and a wiring BL[j] (i is an integer greater than or equal to 1 and less than or equal to m, and j is an integer greater than or equal to 1 and less than or equal to n). In addition, the memory cell MCref[i] is connected to the wiring WL[i], the wiring RW[i], a wiring WDref, and a wiring BLref. Here, a current flowing between the memory cell MC[i,j] and the wiring BL[j] is denoted by $I_{MC[i,j]}$, and a current flowing between the memory cell MCref[i] and the wiring BLref is denoted by $I_{MCref[i]}$.

Figure 22:
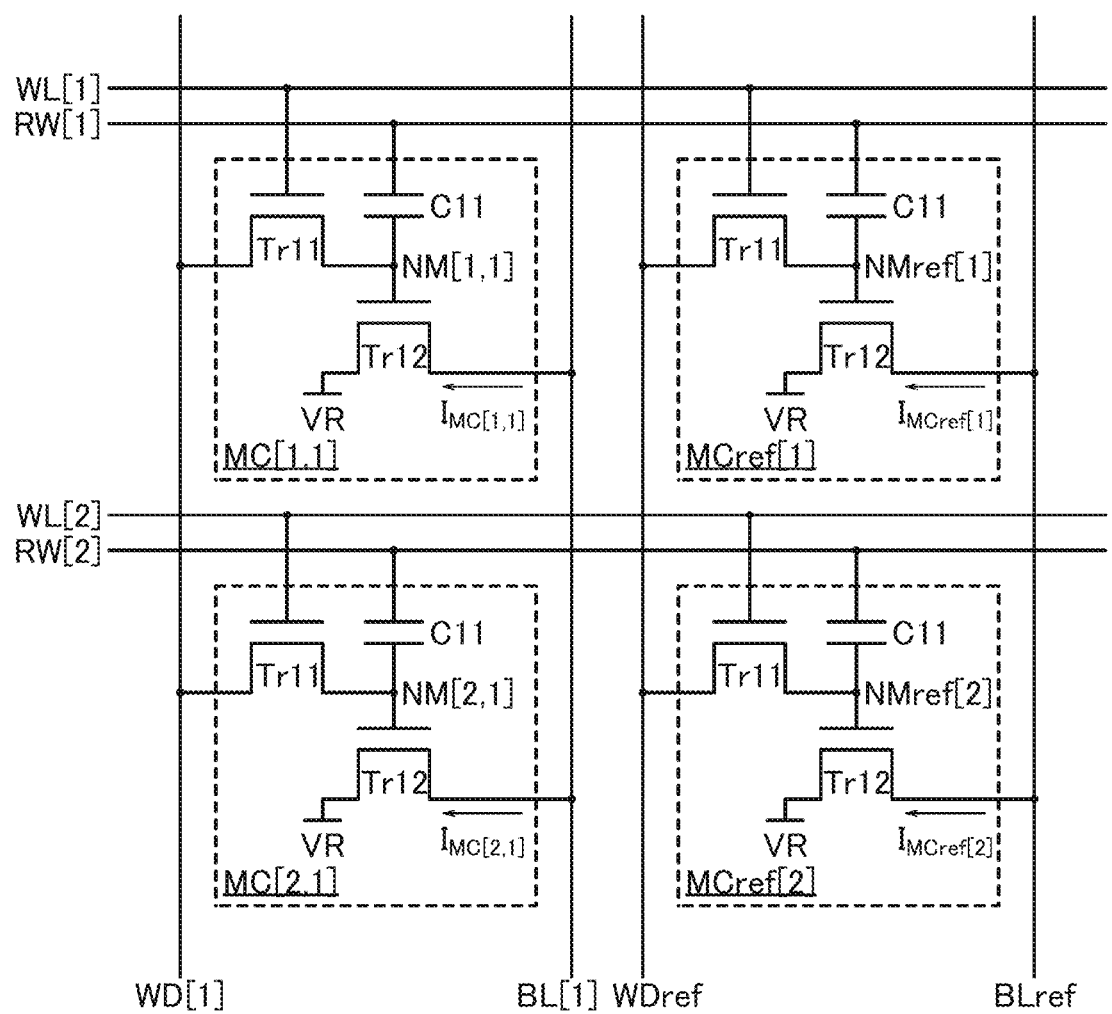
FIG. 22 A diagram illustrating a configuration example of a memory cell.

FIG. 22 shows a specific configuration example of the memory cells MC and the memory cells MCref. Although the memory cells MC[1, 1] and MC[2, 1] and the memory cells MCref[1] and MCref[2] are given as typical examples in FIG. 22, similar configurations can also be used for other memory cells MC and other memory cells MCref. The memory cells MC and the memory cells MCref each include a transistor Tr11, a transistor Tr12, and a capacitor C11. Here, the case where the transistors Tr11 and Tr12 are n-channel transistors will be described.

In the memory cell MC, a gate of the transistor Tr11 is connected to the wiring WL, one of a source and a drain of the transistor Tr11 is connected to a gate of the transistor Tr12 and a first electrode of the capacitor C11, and the other of the source and the drain of the transistor Tr11 is connected to the wiring WD. One of a source and a drain of the transistor Tr12 is connected to the wiring BL, and the other of the source and the drain of the transistor Tr12 is connected to a wiring VR. A second electrode of the capacitor C11 is connected to the wiring RW. The wiring VR is configured to supply a predetermined potential. Here, the case where a low power supply potential (e.g., a ground potential) is supplied from the wiring VR is described as an example.

A node connected to the one of the source and the drain of the transistor Tr11, the gate of the transistor Tr12, and the first electrode of the capacitor C11 is referred to as a node NM. The nodes NM included in the memory cells MC[1, 1] and MC[2, 1] are referred to as nodes NM[1, 1] and NM[2, 1], respectively.

The memory cells MCref have a configuration similar to that of the memory cell MC. However, the memory cells MCref are connected to the wiring WDref instead of the wiring WD and connected to a wiring BLref instead of the wiring BL. Each of a node NMref[1] in the memory cell MCref[1] and a node NMref[2] in the memory cell MCref[2] refers to a node connected to the one of the source and the drain of the transistor Tr11, the gate of the transistor Tr12, and the first electrode of the capacitor C11.

The node NM and the node NMref function as holding nodes of the memory cell MC and the memory cell MCref, respectively. The first data is held in the node NM and the reference data is held in the node NMref. Currents $I_{MC[1, 1]}$, and $I_{MC[1, 2]}$, from the wiring BL[1] flow to the transistors Tr12 of the memory cells MC[1, 1] and MC[2, 1], respectively. Currents $I_{MCref[1]}$ and $I_{MCref[2]}$ from the wiring BLref flow to the transistors Tr12 of the memory cells MCref[1] and MCref[2], respectively.

Since the transistor Tr11 is configured to hold the potential of the node NM or the node NMref, the off-state current of the transistor Tr11 is preferably low. Thus, it is preferable to use an OS transistor, which has extremely low off-state current, as the transistor Tr11. This suppresses a change in the potential of the node NM or the node NMref, so that the operation accuracy can be increased. Furthermore, operations of refreshing the potential of the node NM or the node NMref can be performed less frequently, which leads to a reduction in power consumption.

There is no particular limitation on the transistor Tr12, and for example, a Si transistor, an OS transistor, or the like can be used. In the case where an OS transistor is used as the transistor Tr12, the transistor Tr12 can be manufactured with the same manufacturing apparatus as the transistor Tr11, and accordingly manufacturing cost can be reduced. Note that the transistor Tr12 may be an n-channel transistor or a p-channel transistor.

The current source circuit CS is connected to the wirings BL[1] to BL[n] and the wiring BLref. The current source circuit CS is configured to supply currents to the wirings BL[1] to BL[n] and the wiring BLref. Note that the value of the current supplied to the wirings BL[1] to BL[n] may be different from the value of the current supplied to the wiring BLref. Here, the current supplied from the current source circuit CS to the wirings BL[1] to BL[n] is denoted by $I_C$, and the current supplied from the current source circuit CS to the wiring BLref is denoted by $I_{Cref}$.

The current mirror circuit CM includes wirings IL[1] to IL[n] and a wiring ILref. The wirings IL[1] to IL[n] are connected to the wirings BL[1] to BL[n], respectively, and the wiring ILref is connected to the wiring BLref. Here, a connection portion between the wirings IL[1] and BL[1] to a connection portion between the wirings IL[n] and BL[n] are referred to as nodes NP[1] to NP[n], respectively. Furthermore, a connection portion between the wiring ILref and the wiring BLref is referred to as a node NPref.

The current mirror circuit CM is configured to supply a current $I_{CM}$ corresponding to the potential of the node NPref to the wiring ILref and supply this current $I_{CM}$ also to the wirings IL[1] to IL[n]. In the example shown in FIG. 21, the current $I_{CM}$ is discharged from the wiring BLref to the wiring ILref, and the current $I_{CM}$ is discharged from the wirings BL[1] to BL[n] to the wirings IL[1] to IL[n]. Furthermore, currents flowing from the current mirror circuit CM to the cell array CA through the wirings BL[1] to BL[n] are denoted by $I_B[1]$ to $I_B[n]$, respectively. Furthermore, a current flowing from the current mirror circuit CM to the cell array CA through the wiring BLref is denoted by $I_{Bref}$.

The circuit WDD is connected to the wirings WD[1] to WD[n] and the wiring WDref. The circuit WDD is configured to supply a potential corresponding to the first data stored in the memory cells MC to the wirings WD[1] to WD[n]. The circuit WDD is also configured to supply a potential corresponding to the reference data stored in the memory cell MCref to the wiring WDref. The circuit WLD is connected to wirings WL[1] to WL[m]. The circuit WLD is configured to supply a signal for selecting the memory cell MC or MCref to which data is to be written, to any of the wirings WL[1] to WL[m]. The circuit CLD is connected to the wirings RW[1] to RW[m]. The circuit CLD is configured to supply a potential corresponding to the second data to the wirings RW[1] to RW[m].

The offset circuit OFST is connected to the wirings BL[1] to BL[n] and wirings OL[1] to OL[n]. The offset circuit OFST is configured to determine the amount of currents flowing from the wirings BL[1] to BL[n] to the offset circuit OFST and/or the amount of change in the currents flowing from the wirings BL[1] to BL[n] to the offset circuit OFST. The offset circuit OFST is also configured to output determination results to the wirings OL[1] to OL[n]. Note that the offset circuit OFST may output currents corresponding to the determination results to the wirings OL, or may convert the currents corresponding to the determination results into voltages to output the voltages to the wirings OL. The currents flowing between the cell array CA and the offset circuit OFST are denoted by $I_\alpha[1]$ to $I_\alpha[n]$.

Figure 23:
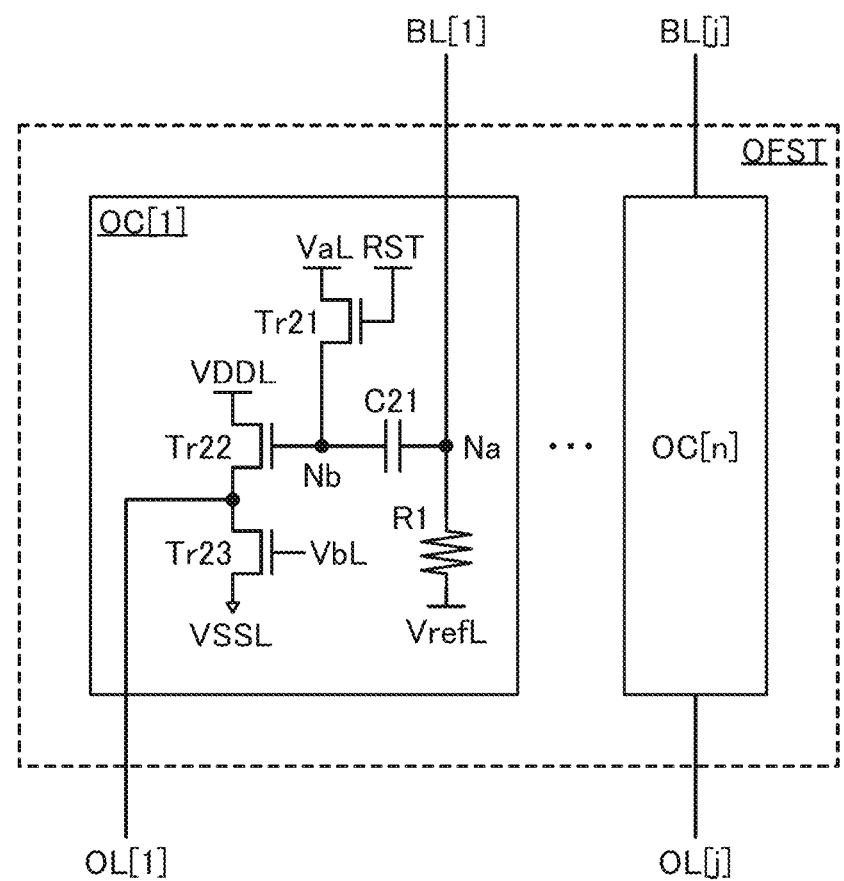
FIG. 23 A diagram illustrating a configuration example of an offset circuit.

FIG. 23 shows a configuration example of the offset circuit OFST. The offset circuit OFST shown in FIG. 23 includes circuits OC[1] to OC[n]. The circuits OC[1] to OC[n] each include a transistor Tr21, a transistor Tr22, a transistor Tr23, a capacitor C21, and a resistor R1. Connection relations of the elements are shown in FIG. 23. Note that a node connected to a first electrode of the capacitor C21 and a first terminal of the resistor R1 is referred to as a node Na. In addition, a node connected to a second electrode of the capacitor C21, one of a source and a drain of the transistor Tr21, and a gate of the transistor Tr22 is referred to as a node Nb.

A wiring VrefL is configured to supply a potential Vref, a wiring VaL is configured to supply a potential Va, and a wiring VbL is configured to supply a potential Vb. Furthermore, a wiring VDDL is configured to supply a potential VDD, and a wiring VSSL is configured to supply a potential VSS. Here, the case where the potential VDD is a high power supply potential and the potential VSS is a low power supply potential is described. A wiring RST is configured to supply a potential for controlling the on/off state of the transistor Tr21. The transistor Tr22, the transistor Tr23, the wiring VDDL, the wiring VSSL, and the wiring VbL form a source follower circuit.

Next, an operation example of the circuits OC[1] to OC[n] will be described. Note that although an operation example of the circuit OC[1] is described here as a typical example, the circuits OC[2] to OC[n] can be operated in a manner similar to that of the circuit OC[1]. First, when a first current flows to the wiring BL[1], the potential of the node Na becomes a potential corresponding to the first current and the resistance value of the resistor R1. At this time, the transistor Tr21 is on, and thus the potential Va is supplied to the node Nb. Then, the transistor Tr21 is turned off.

Next, when a second current flows to the wiring BL[1], the potential of the node Na becomes a potential corresponding to the second current and the resistance value of the resistor R1. At this time, since the transistor Tr21 is off and the node Nb is in a floating state, the potential of the node Nb is changed owing to capacitive coupling, following the change in the potential of the node Na. Here, when the amount of change in the potential of the node Na is $\Delta V_{Na}$ and the capacitive coupling coefficient is 1, the potential of the node Nb is Va+$\Delta V_{Na}$. In addition, when the threshold voltage of the transistor Tr22 is $V_{th}$, a potential of Va+$\Delta V_{Na}$−$V_{th}$ is output from the wiring OL[1]. Here, when Va=$V_{th}$, the potential $\Delta V_{Na}$ can be output from the wiring OL[1].

The potential $\Delta V_{Na}$ is determined by the amount of change from the first current to the second current, the resistor R1, and the potential Vref Here, since the resistor R1 and the potential Vref are known, the amount of change in the current flowing to the wiring BL can be found from the potential $\Delta V_{Na}$.

A signal corresponding to the amount of current and/or the amount of change in the current that are/is determined by the offset circuit OFST as described above is input to the activation function circuit ACTV through the wirings OL[1] to OL[n].

The activation function circuit ACTV is connected to the wirings OL[1] to OL[n] and wirings NIL[1] to NIL[n]. The activation function circuit ACTV is configured to perform an operation for converting the signal input from the offset circuit OFST in accordance with the predefined activation function. As the activation function, for example, a sigmoid function, a tan h function, a softmax function, a ReLU function, a threshold function, or the like can be used. The signal converted by the activation function circuit ACTV is output as output data to the wirings NIL[1] to NIL[n].

Operation Example of Semiconductor Device

With the above semiconductor device MAC, the product-sum operation of the first data and the second data can be performed. An operation example of the semiconductor device MAC at the time of performing the product-sum operation will be described below.

Figure 24:
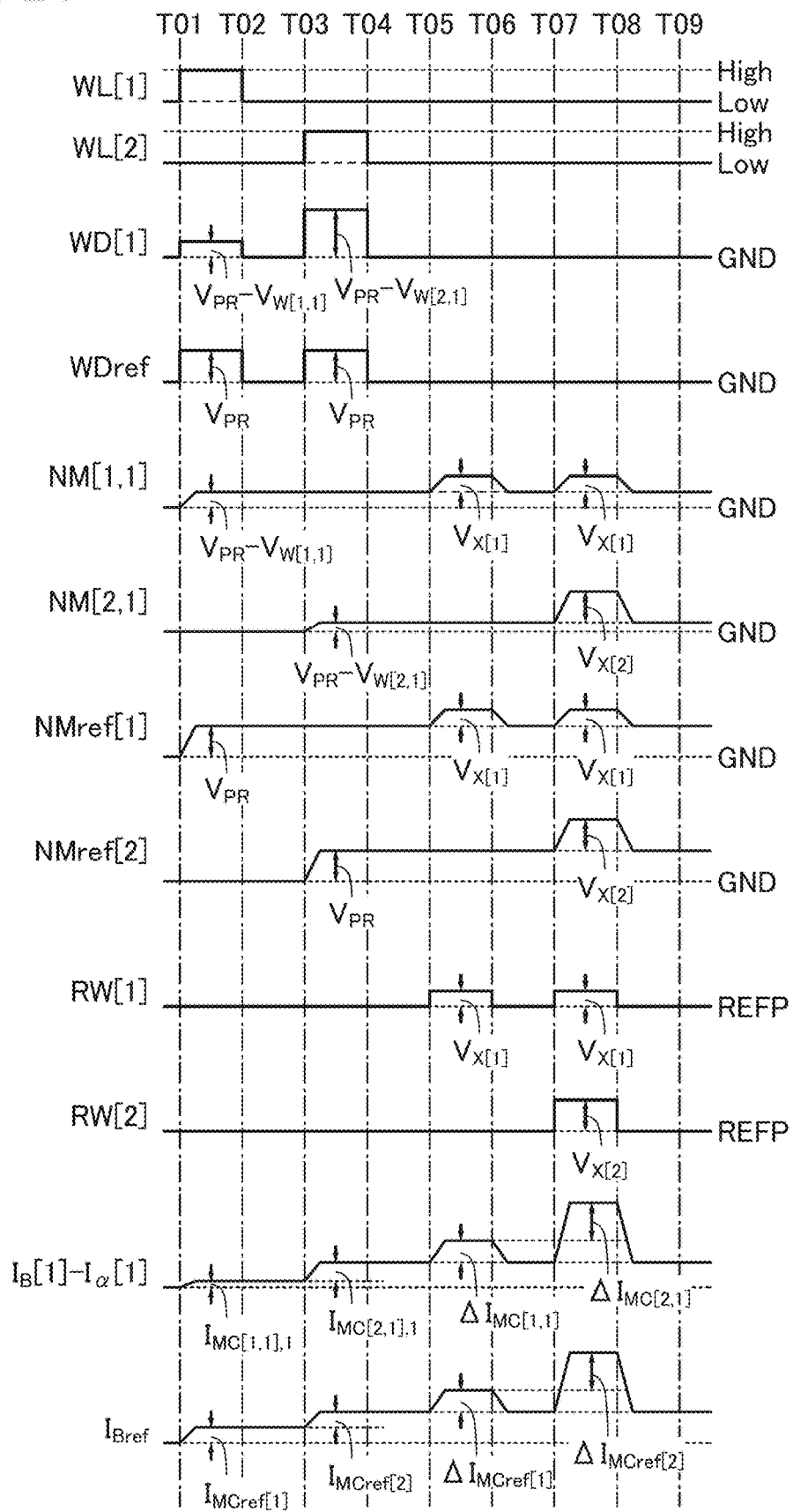
FIG. 24 A timing chart illustrating an example of an operation method of a semiconductor device.

FIG. 24 shows a timing chart of the operation example of the semiconductor device MAC. FIG. 24 shows changes in the potentials of the wirings WL[1], WL[2], WD[1], and WDref, the nodes NM[1, 1], NM[2, 1], NMref[1], and NMref[2], and the wirings RW[1] and RW[2] in FIG. 22 and changes in the values of the currents $I_B[1]$−$I_\alpha[1]$ and $I_{Bref}$. The current $I_B[1]$−$I_\alpha[1]$ corresponds to the sum total of the currents flowing from the wiring BL[1] to the memory cells MC[1, 1] and MC[2, 1].

Although an operation of the memory cells MC[1, 1], MC[2, 1], MCref[1], and MCref[2] shown in FIG. 22 is described as a typical example, the other memory cells MC and MCref can also be operated in a similar manner.

[Storage of First Data]

First, during a period from Time T01 to Time T02, the potential of the wiring WL[1] becomes high, the potential of the wiring WD[1] becomes a potential greater than a ground potential (GND) by $V_{PR}$−$V_{W[1, 1]}$, and the potential of the wiring WDref becomes a potential greater than the ground potential by $V_{PR}$. The potentials of the wirings RW[1] and RW[2] are reference potentials (REFP). Note that the potential $VW_{[1, 1]}$ is the potential corresponding to the first data stored in the memory cell MC[1, 1]. The potential $V_{PR}$ is the potential corresponding to the reference data. Thus, the transistors Tr11 included in the memory cells MC[1, 1] and MCref[1] are turned on, and the potential of the node NM[1, 1] becomes $V_{PR}-V_{W[1, 1]}$ and the potential of the node NMref[1] becomes $V_{PR}$.

In this case, a current $I_{MC[1, 1], 0}$ flowing from the wiring BL[1] to the transistor Tr12 in the memory cell MC[1, 1] can be expressed by a formula shown below. Here, k is a constant determined by the channel length, the channel width, the mobility, the capacitance of a gate insulating film, and the like of the transistor Tr12. In addition, $V_{th}$ is the threshold voltage of the transistor Tr12.

$$I_{MC[1,1],0}=k(V_{PR}-V_{W[1,1]}-V_{th})^2 \quad (E1)$$

A current $I_{MCref[1],0}$ flowing from the wiring BLref to the transistor Tr12 in the memory cell MCref[1] can be expressed by a formula shown below.

$$I_{MCref[1],0}=k(V_{PR}-V_{th})^2 \quad (E2)$$

Next, during a period from Time T02 to Time T03, the potential of the wiring WL[1] becomes low. Consequently, the transistors Tr11 included in the memory cells MC[1, 1] and MCref[1] are turned off, and the potentials of the nodes NM[1, 1] and NMref[1] are held.

As described above, an OS transistor is preferably used as the transistor Tr11. This can suppress the leakage current of the transistor Tr11, so that the potentials of the nodes NM[1, 1] and NMref[1] can be accurately held.

Next, during a period from Time T03 to Time T04, the potential of the wiring WL[2] becomes high, the potential of the wiring WD[1] becomes a potential greater than the ground potential by $V_{PR}-V_{W[2,1]}$ and the potential of the wiring WDref becomes a potential greater than the ground potential by $V_{PR}$. Note that the potential $V_{W[2,1]}$ is a potential corresponding to the first data stored in the memory cell MC[2, 1]. Thus, the transistors Tr11 included in the memory cells MC[2, 1] and MCref[2] are turned on, and the potential of the node NM[1, 1] becomes $V_{PR}-V_{W[2,1]}$ and the potential of the node NMref[1] becomes $V_{PR}$.

Here, a current $I_{MC[2, 1],0}$ flowing from the wiring BL[1] to the transistor Tr12 in the memory cell MC[2, 1] can be expressed by a formula shown below.

$$I_{MC[2,1],0}=k(V_{PR}-V_{W[2,1]}-V_{th})^2 \quad (E3)$$

Furthermore, a current $I_{MCref[2], 0}$ flowing from the wiring BLref to the transistor Tr12 in the memory cell MCref[2] can be expressed by a formula shown below.

$$I_{MCref[2],0}=k(V_{PR}-V_{th})^2 \quad (E4)$$

Next, during a period from Time T04 to Time T05, the potential of the wiring WL[2] becomes low. Consequently, the transistors Tr11 included in the memory cells MC[2, 1] and MCref[2] are turned off, and the potentials of the nodes NM[2, 1] and NMref[2] are held.

Through the above operation, the first data is stored in the memory cells MC[1, 1] and MC[2, 1], and the reference data is stored in the memory cells MCref[1] and MCref[2].

Here, currents flowing to the wirings BL[1] and BLref during the period from Time T04 to Time T05 are considered. The current is supplied from the current source circuit CS to the wiring BLref. The current flowing through the wiring BLref is discharged to the current mirror circuit CM and the memory cells MCref[1] and MCref[2]. A formula shown below holds, where $I_{Cref}$ is the current supplied from the current source circuit CS to the wiring BLref and $I_{CM, 0}$ is the current discharged from the wiring BLref to the current mirror circuit CM.

$$I_{Cref}-I_{CM,0}=I_{MCref[1],0}+I_{MCref[2],0} \quad (E5)$$

The current from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds, where $I_{C, 0}$ is the current supplied from the current source circuit CS to the wiring BL[1] and $I_{\alpha, 0}$ is the current flowing from the wiring BL[1] to the offset circuit OFST.

$$I_C-I_{CM,0}=I_{MC[1,1],0}+I_{MC[2,1],0}+I_{\alpha,0} \quad (E6)$$

[Product-Sum Operation of First Data and Second Data]

Next, during a period from Time T05 to Time T06, the potential of the wiring RW[1] becomes a potential greater than the reference potential by $V_{X[1]}$. At this time, the potential $V_{X[1]}$ is supplied to the capacitors C11 in the memory cells MC[1, 1] and MCref[1], so that the potentials of the gates of the transistors Tr12 increase owing to capacitive coupling. Note that the potential $V_{x[1]}$ is the potential corresponding to the second data supplied to the memory cells MC[1, 1] and MCref[1].

The amount of change in the potential of the gate of the transistor Tr12 corresponds to the value obtained by multiplying the amount of change in the potential of the wiring RW by a capacitive coupling coefficient determined by the memory cell configuration. The capacitive coupling coefficient is calculated on the basis of the capacitance of the capacitor C11, the gate capacitance of the transistor Tr12, the parasitic capacitance, and the like. In the following description, for convenience, the amount of change in the potential of the wiring RW is equal to the amount of change in the potential of the gate of the transistor Tr12, that is, the capacitive coupling coefficient is set to 1. In practice, the potential $V_x$ can be determined in consideration of the capacitive coupling coefficient.

When the potential $V_{X[1]}$ is supplied to the capacitors C11 in the memory cells MC[1, 1] and MCref[1], the potentials of the nodes NM[1, 1] and NMref[1] each increase by $V_{X[1]}$.

Here, a current $I_{MC[1, 1], 1}$ flowing from the wiring BL[1] to the transistor Tr12 in the memory cell MC[1, 1] during the period from Time T05 to Time T06 can be expressed by a formula shown below.

$$I_{MC[1,1],1}=k(V_{PR}-V_{W[1,1]}+V_{X[1]}-V_{th})^2 \quad (E7)$$

Thus, when the potential $V_{X[1]}$ is supplied to the wiring RW[1], the current flowing from the wiring BL[1] to the transistor Tr12 in the memory cell MC[1, 1] increases by $\Delta I_{MC[1, 1]}=I_{MC[1, 1], 1}-I_{MC[1, 1],0}$.

Here, a current $I_{MCref[1], 1}$ flowing from the wiring BLref to the transistor Tr12 in the memory cell MCref[1] during the period from Time T05 to Time T06 can be expressed by a formula shown below.

$$I_{MCref[1],1}=k(V_{PR}+V_{X[1]}-V_{th})^2 \quad (E8)$$

Thus, when the potential $V_{X[1]}$ is supplied to the wiring RW[1], the current flowing from the wiring BLref to the transistor Tr12 in the memory cell MCref[1] increases by $\Delta I_{MCref}[1]=I_{MCref[1], 1}-I_{MCref[1], 0}$.

Furthermore, currents flowing to the wirings BL[1] and BLref are considered. A current $I_{Cref}$ is supplied from the current source circuit CS to the wiring BLref. The current flowing through the wiring BLref is discharged to the current mirror circuit CM and the memory cells MCref[1] and MCref[2]. A formula shown below holds, where $I_{CM, 1}$ is the current discharged from the wiring BLref to the current mirror circuit CM.

$$I_{Cref}-I_{CM,1}=I_{MCref[1],1}+I_{MCref[2],0} \quad (E9)$$

The current $I_C$ is supplied from the current source circuit CS to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds, where $I_{\alpha,1}$ is the current flowing from the wiring BL[1] to the offset circuit OFST.

$$I_C - I_{CM,1} = I_{MC[1,1],1} + I_{MC[2,1],1} + I_{\alpha,1} \quad (E10)$$

In addition, from Formulae (E1) to (E10), a difference between the current $I_{\alpha,0}$ and the current $I_{\alpha,1}$ (differential current $\Delta I_\alpha$) can be expressed by a formula shown below.

$$\Delta I_\alpha = I_{\alpha,0} - I_{\alpha,1} = 2kV_{W[1,1]}V_{X[1]} \quad (E11)$$

Thus, the differential current $\Delta I_\alpha$ is a value corresponding to the product of the potentials $V_{W[1,1]}$ and $V_{X[1]}$.

After that, during a period from Time T06 to Time T07, the potential of the wiring RW[1] becomes the ground potential, and the potentials of the nodes NM[1, 1] and NMref[1] become the same as the potentials thereof during the period from Time T04 to Time T05.

Next, during a period from Time T07 to Time T08, the potential of the wiring RW[1] becomes the potential greater than the reference potential by $V_{X[1]}$, and the potential of the wiring RW[2] becomes a potential greater than the reference potential by $V_{X[2]}$. Accordingly, the potential $V_{X[1]}$ is supplied to the capacitors C11 in the memory cells MC[1, 1] and MCref[1], and the potentials of the nodes NM[1, 1] and NMref[1] each increase by $V_{X[1]}$ owing to capacitive coupling. Furthermore, the potential $V_{X[2]}$ is supplied to the capacitors C11 in the memory cells MC[2, 1] and MCref[2], and the potentials of the nodes NM[2, 1] and NMref[2] each increase by $V_{X[2]}$ owing to capacitive coupling.

Here, the current $I_{MC[2,1],1}$ flowing from the wiring BL[1] to the transistor Tr12 in the memory cell MC[2, 1] during the period from Time T07 to Time T08 can be expressed by a formula shown below.

$$I_{MC[2,1],1} = k(V_{PR} - V_{W[2,1]} + V_{X[2]} - V_{th})^2 \quad (E12)$$

Thus, when the potential $V_{X[2]}$ is supplied to the wiring RW[2], the current flowing from the wiring BL[1] to the transistor Tr12 in the memory cell MC[2, 1] increases by $\Delta I_{MC[2,1]} = I_{MC[2,1],1} - I_{MC[2,1],0}$.

Here, a current $I_{MCref[2],1}$ flowing from the wiring BLref to the transistor Tr12 in the memory cell MCref[2] during the period from Time T05 to Time T06 can be expressed by a formula shown below.

$$I_{MCref[2],1} = k(V_{PR} + V_{X[2]} - V_{th})^2 \quad (E13)$$

Thus, when the potential $V_{X[2]}$ is supplied to the wiring RW[2], the current flowing from the wiring BLref to the transistor Tr12 in the memory cell MCref[2] increases by $\Delta I_{MCref[2]} = I_{MCref[2],1} - I_{MCref[2],0}$.

Furthermore, currents flowing to the wirings BL[1] and BLref are considered. The current $I_{Cref}$ is supplied from the current source circuit CS to the wiring BLref. The current flowing through the wiring BLref is discharged to the current mirror circuit CM and the memory cells MCref[1] and MCref[2]. A formula shown below holds, where $I_{CM,2}$ is the current discharged from the wiring BLref to the current mirror circuit CM.

$$I_{Cref} - I_{CM,2} = I_{MCref[1],1} + I_{MCref[2],1} \quad (E14)$$

The current $I_C$ is supplied from the current source circuit CS to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds, where $I_{\alpha,2}$ is the current flowing from the wiring BL[1] to the offset circuit OFST.

$$I_C - I_{CM,2} = I_{MC[1,1],1} + I_{MC[2,1],1} + I_{\alpha,2} \quad (E15)$$

In addition, from Formulae (E1) to (E8) and (E12) to (E15), a difference between the current $I_{\alpha,0}$ and the current $I_{\alpha,2}$ (differential current $\Delta I_\alpha$) can be expressed by a formula shown below.

$$\Delta I_\alpha = I_{\alpha,0} - I_{\alpha,2} = 2k(V_{W[1,1]}V_{X[1]} + V_{W[2,1]}V_{X[2]}) \quad (E16)$$

Thus, the differential current $\Delta I_\alpha$ is a value corresponding to the sum of the product of the potentials $V_{W[1,1]}$ and $V_{X[1]}$ and the product of the potentials $V_{W[2,1]}$ and $V_{X[2]}$.

After that, during a period from Time T08 to Time T09, the potentials of the wirings RW[1] and RW[2] become the ground potential, and the potentials of the nodes NM[1, 1], NM[2, 1], NMref[1], and NMref[2] become the same as the potentials thereof during the period from Time T04 to Time T05.

As represented by Formulae (E9) and (E16), the differential current $\Delta I_\alpha$ input to the offset circuit OFST is a value corresponding to the sum of the product of the potential Vx corresponding to the first data (weight) and the potential Vw corresponding to the second data (input data). Thus, measurement of the differential current $\Delta I_\alpha$ with the offset circuit OFST gives the result of the product-sum operation of the first data and the second data.

Note that although the memory cells MC[1, 1], MC[2, 1], MCref[1], and MCref[2] are focused on in the above description, the number of the memory cells MC and MCref can be any number. In the case where the number m of rows of the memory cells MC and MCref is a given number, the differential current $\Delta I_\alpha$ can be expressed by a formula shown below.

$$\Delta i_\alpha = 2k\Sigma_i V_{W[i,1]} V_{X[i]} \quad (E17)$$

When the number n of columns of the memory cells MC and MCref is increased, the number of product-sum operations executed in parallel can be increased.

The product-sum operation of the first data and the second data can be performed using the semiconductor device MAC as described above. Note that the use of the configuration of the memory cells MC and MCref in FIG. 22 allows the product-sum arithmetic circuit to be formed using fewer transistors. Accordingly, the circuit scale of the semiconductor device MAC can be reduced.

In the case where the semiconductor device MAC is used for the operation in the neural network, the number m of rows of the memory cells MC can correspond to the number of pieces of input data supplied to one neuron and the number n of columns of the memory cells MC can correspond to the number of neurons. For example, the case where a product-sum operation using the semiconductor device MAC is performed in the middle layer HL in FIG. 20(A) is considered. In this case, the number m of rows of the memory cells MC can be set to the number of pieces of input data supplied from the input layer IL (the number of neurons in the input layer IL), and the number n of columns of the memory cells MC can be set to the number of neurons in the middle layer HL.

Note that there is no particular limitation on the configuration of the neural network for which the semiconductor device MAC is used. For example, the semiconductor device MAC can also be used for a convolutional neural network (CNN), a recurrent neural network (RNN), an autoencoder, a Boltzmann machine (including a restricted Boltzmann machine), and the like.

The product-sum operation of the neural network can be performed using the semiconductor device MAC as described above. Furthermore, when the memory cells MC and MCref shown in FIG. 22 are used for the cell array CA, it is possible to provide an IC with improved operation accuracy, lower power consumption, or a reduced circuit scale.

This embodiment can be combined with the description of the other embodiments as appropriate.

(Embodiment 3)

In this embodiment, described below is the composition of a CAC (Cloud-Aligned Composite)-OS applicable to a transistor disclosed in one embodiment of the present invention.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of, aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region is described as having higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

The CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure of two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under a condition where a substrate is not heated intentionally. In the case where the CAC-OS is formed by a sputtering method, one or more of an inert gas (typically, argon), an oxygen gas, and a nitrogen gas can be used as a deposition gas. Furthermore, the flow rate of the oxygen gas to the total flow rate of the deposition gas in deposition is preferably as low as possible, for example, the flow rate of the oxygen gas is higher than or equal to 0% and lower than 30%, preferably higher than or equal to 0% and lower than or equal to 10%.

The CAC-OS is characterized in that a clear peak is not observed when measurement is conducted using a θ/2θ scan by an out-of-plane method with an X-ray diffraction (XRD). That is, it is found by the XRD that there are no alignment in the a-b plane direction and no alignment in the c-axis direction in the measured areas.

In addition, in an electron diffraction pattern of the CAC-OS which is obtained by irradiation with an electron beam with a probe diameter of 1 nm (also referred to as a nanobeam electron beam), a ring-like high-luminance region and a plurality of bright spots in the ring region are observed. It is therefore found from the electron diffraction pattern that the crystal structure of the CAC-OS includes an nc (nanocrystal) structure with no alignment in the plan-view direction and the cross-sectional direction.

For example, energy dispersive X-ray spectroscopy (EDX) is used to obtain EDX mapping, and according to the EDX mapping, the CAC-OS of the In—Ga—Zn oxide has a composition in which the regions including $GaO_{X3}$ as a main component and the regions including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility ($\mu$) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility ($\mu$) can be achieved.

A semiconductor element including a CAC-OS has high reliability. Thus, the CAC-OS is suitably used in a variety of semiconductor devices typified by a display.

This embodiment can be combined with the description of the other embodiments as appropriate.

(Embodiment 4)

In this embodiment, an example of a moving vehicle to which the display system of one embodiment of the present invention can be applied will be described.

Figure 25A:
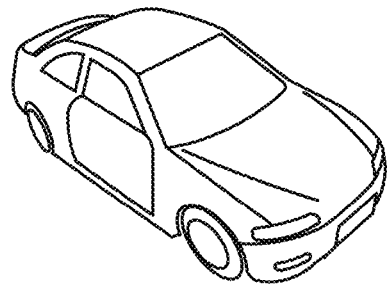
FIGS. 25A to 25D Diagrams illustrating examples of moving vehicles.

FIG. 25(A) is an automobile 301. The display system of one embodiment of the present invention can be applied to the automobile 301. For example, the imaging device included in the display system of one embodiment of the present invention can take an image of the outside state of the automobile 301 by being provided in the automobile 301. Even in the case where the imaging data obtained by the imaging device has a large difference in brightness and the dynamic range of the display device is lower than the dynamic range of the imaging device, dynamic range compression can be performed while displayed image is prevented from being unsharp.

Figure 25B:
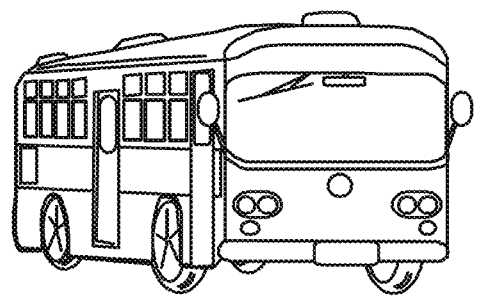

FIG. 25(B) is a bus 302. The display system of one embodiment of the present invention can be applied to the bus 302. For example, the imaging device included in the display system of one embodiment of the present invention can take an image of the outside state of the bus 302 by being provided in the bus 302. Even in the case where the imaging data obtained by the imaging device has a large difference in brightness and the dynamic range of the display device is lower than the dynamic range of the imaging device, dynamic range compression can be performed while displayed image is prevented from being unsharp.

Figure 25C:
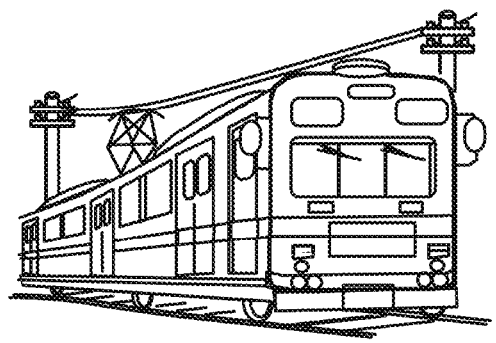

FIG. 25(C) is a train 303. The display system of one embodiment of the present invention can be applied to the train 303. For example, the imaging device included in the display system of one embodiment of the present invention can take an image of the outside state of the train 303 by being provided in the train 303. Even in the case where the imaging data obtained by the imaging device has a large difference in brightness and the dynamic range of the display device is lower than the dynamic range of the imaging device, dynamic range compression can be performed while displayed image is prevented from being unsharp.

Figure 25D:
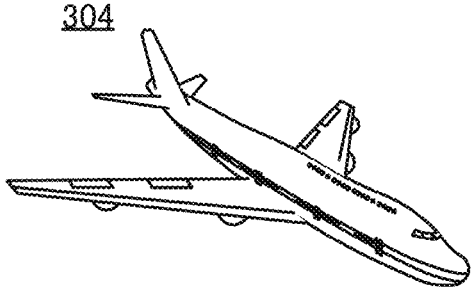

FIG. 25(D) is an airplane 304. The display system of one embodiment of the present invention can be applied to the airplane 304. For example, the imaging device included in the display system of one embodiment of the present invention can take an image of the outside state of the airplane 304 by being provided in the airplane 304. Even in the case where the imaging data obtained by the imaging device has a large difference in brightness and the dynamic range of the display device is lower than the dynamic range of the imaging device, dynamic range compression can be performed while displayed image is prevented from being unsharp.

This embodiment can be combined with the description of the other embodiments as appropriate.

REFERENCE NUMERALS

10: display system, 20: imaging device, 21: pixel, 22: pixel array, 23: row driver, 25: A/D converter circuit, 26: column driver, 30: control device, 31: analysis circuit, 32: gray level determination circuit, 33: memory circuit, 34: prediction circuit, 40: display device, 41: pixel, 42: pixel array, 43: row driver, 46: column driver, 47: gray level, 50: illuminance range, 51: network, 52: server, 53: device, 131: conductive layer, 132: conductive layer, 133: conductive layer, 134: conductive layer, 135: back gate, 136: region, 137: conductive layer, 140: silicon substrate, 141: insulating layer, 142: insulating layer, 143: insulating layer, 145: semiconductor layer, 146: insulating layer, 150: photoelectric conversion element, 151: transistor, 152: transistor, 153: transistor, 154: transistor, 155: capacitor, 161: layer, 162: layer, 163: layer, 165*a*: layer, 165*b*: layer, 165*c*: layer, 166*a*: layer, 166*b*: layer, 166*c*: layer, 166*d*: layer, 171: wiring, 172: wiring, 173: wiring, 174: wiring, 175: wiring, 176: wiring, 177: wiring, 178: wiring, 180: insulating layer, 181: light-blocking layer, 182: organic resin layer, 183: color filter, 183*a*: color filter, 183*b*: color filter, 183*c*: color filter, 184: microlens array, 185: optical conversion layer, 186: insulating layer, 301: automobile, 302: bus, 303: train, 304: airplane, 410: package substrate, 411: package substrate, 420: cover glass, 421: lens cover, 430: adhesive, 435: lens, 440: bump, 441: land, 450: image sensor chip, 451: image sensor chip, 460: electrode pad, 461: electrode pad, 470: wire, 471: wire, 490: IC chip, 510: conductive layer, 511: conductive layer, 512: semiconductor layer, 516: conductive layer, 517: conductive layer, 1405: controller, 1410: row circuit, 1411: decoder, 1412: word line driver circuit, 1413: column selector, 1414: sense amplifier driver circuit, 1415: column circuit, 1416: global sense amplifier array, 1417: input/output circuit, 1420: sense amplifier array, 1422: memory cell array, 1423: sense amplifier array, 1425: local memory cell array, 1426: local memory cell array, 1445: memory cell, 1445*a*: memory cell, 1445*b*: memory cell, 1447: global sense amplifier, 3125: light-emitting element, 3174: wiring, 3178: wiring, 3232: transistor, 3233: capacitor, 3431: transistor, 3432: liquid crystal element, 3435: node, 3436: node, 3437: node, 4001: substrate, 4005: sealing material, 4006: substrate, 4008: liquid crystal layer, 4014: wiring, 4015: conductive layer, 4018: FPC, 4019: anisotropic conductive layer, 4021: conductive layer, 4030: conductive layer, 4031: conductive layer, 4032: insulating layer, 4033: insulating layer, 4035: spacer, 4102: insulating layer, 4103: insulating layer, 4110: insulating layer, 4111: insulating layer, 4112: insulating layer, 4510: partition wall, 4511: light-emitting layer, 4514: filler.

The invention claimed is:

1. A display system comprising an imaging device, a control device, and a display device,
   wherein the imaging device comprises first pixels arranged in a matrix,
   wherein the display device comprises second pixels arranged in a matrix,
   wherein the imaging device is configured to generate first image data on the basis of the illuminance of light emitted to the first pixels,
   wherein the control device is configured to form a histogram on the basis of the first image data,
   wherein the control device is configured to divide the histogram into three or more illuminance ranges,
   wherein the control device is configured to convert gray levels, which are included in the first image data as information and correspond to the illuminance of the light emitted to the first pixels, to generate second image data obtained by performing dynamic range compression on the first image data,
   wherein the control device is configured to calculate a compressibility of the dynamic range compression for each of the illuminance ranges on the basis of a value of integral in the histogram,
   wherein the first pixels have a different structure than the second pixels,
   wherein the control device comprises a neural network,
   wherein the neural network is configured to predict, on the basis of the first image data, third image data that is to be acquired by the imaging device in a frame period after a frame period when the first image data is acquired,
   wherein the control device is configured to determine whether the compressibility is updated, on the basis of the third image data,
   wherein one of the first pixels comprises a photoelectric conversion element, a first transistor, a second transistor, a third transistor, a fourth transistor, and a first capacitor,
   wherein one of a source and a drain of the first transistor is directly connected to one electrode of the photoelectric conversion element,
   wherein one of a source and a drain of the second transistor is directly connected to the one electrode of the photoelectric conversion element,
   wherein the other of the source and the drain of the second transistor is electrically connected to a gate of the third transistor and one electrode of the first capacitor, and
   wherein one of a source and a drain of the third transistor is electrically connected to one of a source and a drain of the fourth transistor.

2. The display system according to claim 1,
   wherein the compressibility in the illuminance range in which the value of integral is large is smaller than the compressibility in the illuminance range in which the value of integral is small.

3. The display system according to claim 1,
   wherein one of the second pixels comprises a fifth transistor, a sixth transistor, a second capacitor, and a display element,
   wherein one of a source and a drain of the fifth transistor is electrically connected to a first wiring,
   wherein the other of the source and the drain of the fifth transistor is electrically connected to a gate of the sixth transistor and one electrode of the second capacitor, and
   wherein one of a source and a drain of the sixth transistor is electrically connected to the other electrode of the second capacitor and one electrode of the display element.

4. The display system according to claim 1,
   wherein the photoelectric conversion element overlaps with the second transistor and the third transistor.

5. The display system according to claim 1,
   wherein the second transistor is provided over the third transistor and the fourth transistor,
   wherein the photoelectric conversion element is provided over the second transistor,
   wherein a semiconductor layer of the third transistor comprising a channel region comprises silicon, and
   wherein a semiconductor layer of the second transistor comprising a channel region comprises an oxide semiconductor.

6. A display system comprising an imaging device, a control device, and a display device,
   wherein the imaging device comprises first pixels arranged in a matrix,
   wherein the display device comprises second pixels arranged in a matrix,
   wherein the imaging device is configured to generate first image data on the basis of the illuminance of light emitted to the first pixels,
   wherein the control device is configured to form a histogram on the basis of the first image data,
   wherein the control device is configured to divide the histogram into three or more illuminance ranges,
   wherein the control device is configured to convert gray levels, which are included in the first image data as information and correspond to the illuminance of the light emitted to the first pixels, to generate second image data obtained by performing dynamic range compression on the first image data,
   wherein the control device is configured to calculate a compressibility of the dynamic range compression for each of the illuminance ranges on the basis of a value of integral in the histogram,
   wherein one of the first pixels comprises a photoelectric conversion element, a first transistor, a second transistor, a third transistor, a fourth transistor, and a first capacitor,
   wherein one of a source and a drain of the first transistor is directly connected to one electrode of the photoelectric conversion element,
   wherein one of a source and a drain of the second transistor is directly connected to the one electrode of the photoelectric conversion element,
   wherein the other of the source and the drain of the second transistor is electrically connected to a gate of the third transistor and one electrode of the first capacitor, and
   wherein one of a source and a drain of the third transistor is electrically connected to one of a source and a drain of the fourth transistor.

7. The display system according to claim 6,
   wherein the compressibility in the illuminance range in which the value of integral is large is smaller than the compressibility in the illuminance range in which the value of integral is small.

* * * * *